United States Patent
Isono et al.

(10) Patent No.: US 6,460,944 B2
(45) Date of Patent: Oct. 8, 2002

(54) BRAKING SYSTEM WHEREIN BRAKE OPERATING FORCE IS MADE LARGER THAN A VALUE CORRESPONDING TO BOOSTER OUTPUT

(75) Inventors: Hiroshi Isono, Susono (JP); Yasuji Mizutani, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/725,044

(22) Filed: Nov. 29, 2000

(65) Prior Publication Data

US 2001/0003402 A1 Jun. 14, 2001

(30) Foreign Application Priority Data

Dec. 13, 1999 (JP) ............................................ 11-353539

(51) Int. Cl.$^7$ ................................................. B60T 8/66
(52) U.S. Cl. .............................. 303/159; 303/3; 303/15; 303/155; 303/114.1
(58) Field of Search ............................ 303/3, 15, 155, 303/159, 113.3, 114.1, 114.2

(56) References Cited

U.S. PATENT DOCUMENTS

| | | | | |
|---|---|---|---|---|
| 3,888,547 A | * | 6/1975 | Ron | 188/345 |
| 4,340,257 A | * | 7/1982 | Belart | 188/345 |
| 4,634,190 A | * | 1/1987 | Wupper | 303/114.1 |
| 4,688,858 A | * | 8/1987 | Fennel et al. | 188/358 |
| 4,746,174 A | * | 5/1988 | Buschmann | 180/197 |
| 4,941,322 A | * | 7/1990 | Nomura et al. | 303/114.1 |
| 5,232,272 A | * | 8/1993 | Berisch et al. | 303/113.3 |
| 5,267,162 A | * | 11/1993 | Ichikawa et al. | 303/156 |
| 5,496,099 A | * | 3/1996 | Resch | 303/113.4 |
| 5,779,329 A | | 7/1998 | Takeshima | |
| 5,855,420 A | * | 1/1999 | Lawrence | 188/356 |
| 5,971,502 A | * | 10/1999 | Albert et al. | 188/358 |
| 5,984,429 A | * | 11/1999 | Nell et al. | 303/113.4 |
| 6,007,160 A | * | 12/1999 | Lubbers et al. | 188/358 |
| 6,120,110 A | * | 9/2000 | Shimizu | 188/DIG. 1 |
| 6,149,249 A | * | 11/2000 | Matsuda | 303/114.1 |
| 6,161,903 A | * | 12/2000 | Dieringer | 188/358 |
| 6,189,986 B1 | * | 2/2001 | Shimizu et al. | 303/113.4 |
| 6,189,987 B1 | * | 2/2001 | Shimizu | 303/113.4 |
| 6,192,307 B1 | * | 2/2001 | Okamoto et al. | 180/244 |
| 6,199,963 B1 | * | 3/2001 | Shimizu | 303/116.2 |
| 6,217,133 B1 | * | 4/2001 | Yoshida | 188/358 |
| 6,227,629 B1 | * | 5/2001 | Yoshida et al. | 303/113.4 |
| 6,283,558 B1 | * | 9/2001 | Volz et al. | 303/113.1 |
| 6,352,316 B1 | * | 3/2002 | Oka et al. | 303/113.3 |

FOREIGN PATENT DOCUMENTS

| | | |
|---|---|---|
| EP | 0 800 976 | 10/1997 |
| EP | 0 906 859 | 4/1999 |
| JP | 8-230634 | 9/1996 |
| JP | 9-30385 | 2/1997 |

* cited by examiner

*Primary Examiner*—Douglas C. Butler
*Assistant Examiner*—Devon Kramer
(74) *Attorney, Agent, or Firm*—Oliff & Berridge, PLC

(57) ABSTRACT

A braking system for braking a wheel of an automotive vehicle, including a brake for braking the wheel and an operating device operable to produce an output corresponding to an input thereof, for activating the brake according to the output, and wherein a change of the output of the operating device is delayed with respect to a change of the input depending upon an operating condition of the braking system. The braking system includes a brake-operating-force increasing device operable on the basis of a delay of the change of the output of the operating device with respect to the change of the input, to increase an operating force of the brake to a value which is larger than a value corresponding to the output of the operating device.

24 Claims, 23 Drawing Sheets

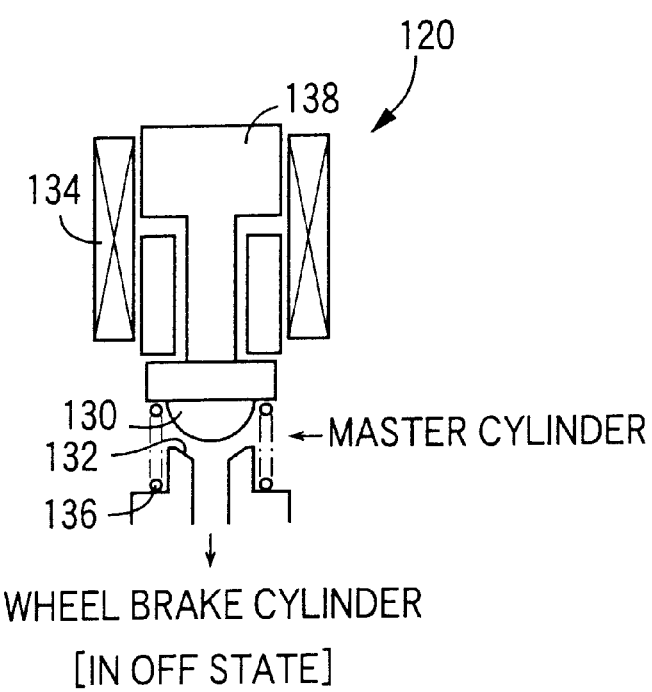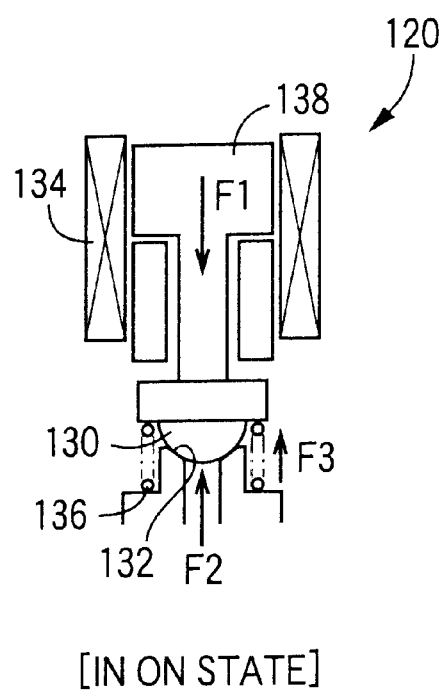
FIG. 3A [IN OFF STATE]
FIG. 3B [IN ON STATE]

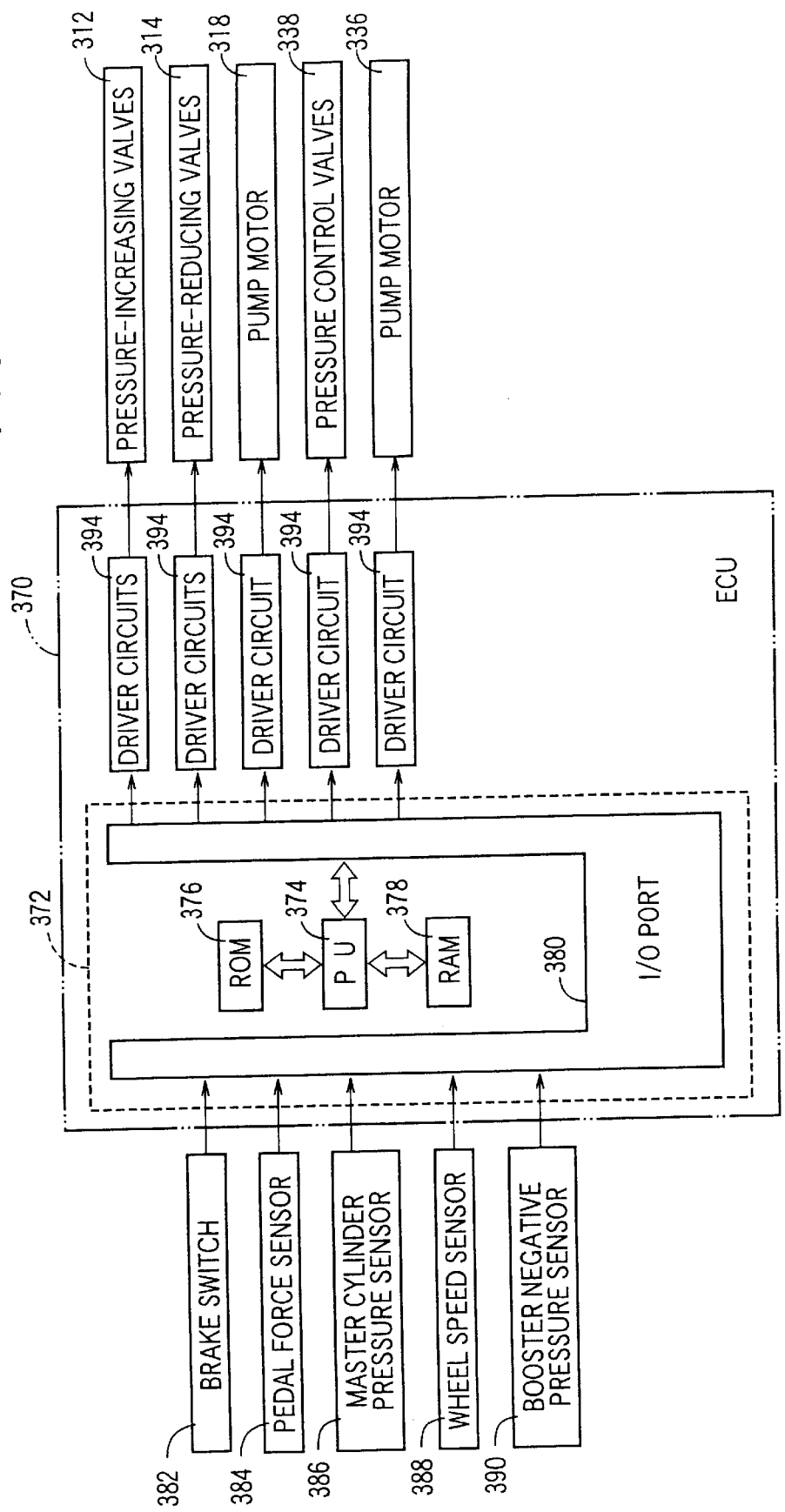

BRAKING SYSTEM WHEREIN BRAKE OPERATING FORCE IS MADE LARGER THAN A VALUE CORRESPONDING TO BOOSTER OUTPUT

This application is based on Japanese Patent Application No. 11-353539 filed Dec. 13, 1999, the contents of which are incorporated hereinto by reference.

BACKGROUND OF THE INVENTION

1. Field of the Invention

The present invention relates in general to a braking system for an automotive vehicle, and more particularly to an improvement of a braking system of a type wherein a brake is operated to produce a braking force corresponding to an output of a brake operating device.

2. Discussion of Related Art

JP-A-8-230634 discloses an example of a vehicle braking system of the type indicated above, which is provided with a brake operating device in the form of a vacuum booster, which is one type of a booster. The vacuum booster is arranged to receive an input force from a brake operating member in the form of a brake pedal upon operation of the brake pedal, and boost the received input force on the basis of a negative pressure, so that the boosted input force is transmitted as an output of the vacuum booster to a master cylinder, in order for the master cylinder to pressurize a working fluid. The pressurized fluid is delivered from the master cylinder to a brake cylinder of a wheel brake, so that the wheel brake is activated. The braking system disclosed in the above-identified publication is further adapted such that a pressurized fluid delivered by a pump is supplied to the wheel brake cylinder so that the fluid pressure in the wheel brake cylinder is made higher than that in the master cylinder, whereby the wheel brake generates a braking force larger than that based on the fluid pressure in the master cylinder. The pressurized fluid is delivered from the pump to the wheel brake cylinder when the brake operating member is rapidly operated to apply an abrupt brake to the vehicle, as well as when the wheel brake suffers from a phenomenon so-called "fade" wherein the friction coefficient of a friction member such as a friction pad or brake lining is excessively lowered. A determination that the application of an abrupt brake is required is made when the fluid pressure of the master cylinder detected by a suitable pressure sensor is higher than a predetermined value and when a rate of increase of the fluid pressure of the master cylinder has exceeded a predetermined value. When the requirement for the abrupt brake application is detected, the fluid pressurized by the pump is supplied to the wheel brake cylinder so that the braking force generated by the wheel brake when the brake pedal is abruptly operated is made larger, than when the brake pedal is normally operated.

In the braking system disclosed in the above-identified publication wherein the brake operating device such as a vacuum booster is disposed between the brake operating member and the master cylinder, there is a risk of a delay in the determination that the application of an abrupt brake is required, due to a delay in the operation of the brake operating device. For instance, the vacuum booster includes: a housing; a power piston which is axially sidably received within the housing and which cooperates with the housing to define a low-pressure chamber formed on the front side of the power piston and connected to an air intake system of an engine of the vehicle, and a variable-pressure chamber formed on the rear side of the power piston; an input member operatively connected to the brake operating member; an output member operatively connected to a pressurizing piston of the master cylinder; and a switch valve operable between a retracted position for fluid communication of the variable-pressure chamber with the low-pressure chamber, on the basis of a relative movement of the input and output members, an advanced position for fluid communication of the variable-pressure chamber with the atmosphere, and an intermediate position for inhibiting the fluid communication of the variable-pressure chamber with both of the low-pressure chamber and the atmosphere. In this case, the input force is received by the input member, and the output force is applied from the output member to the pressurizing piston of the master cylinder. The operational delay of the vacuum booster indicated above is a delay of the application of the output force to the pressurizing piston of the master cylinder with respect to the application of the input force to the input member, which delay may take place due to a delayed flow of the atmosphere into the variable-pressure chamber or a relatively low degree of vacuum in the low-pressure chamber (a relatively small difference of the pressure in the low-pressure chamber from the atmospheric pressure). The operational delay tends to increase with an increase in the operating speed of the brake operating member. Accordingly, the detection of the requirement for an abrupt brake application tends to be delayed when the brake operating member is operated at a relatively high speed. That is, a relatively rapid operation of the brake operating member tends to cause a delay in the moment at which is satisfied the above-indicated condition that the fluid pressure of the master cylinder is higher than a predetermined value and that a rate increase of the fluid pressure of he master cylinder has exceeded a predetermined value. There is a similar tendency also where a brake operating device of any other type such as a hydraulic booster is disposed between the brake operating member and the master cylinder, although there is some difference in the degree of the operational delay in the two cases indicated above.

The braking system disclosed in the above-identified publication is not provided with any means for solving the operational delay of the vacuum booster. As discussed above, the brake operating device such as the vacuum booster as the typical example may suffer from the operational delay, which prevents a delay in the increase of the master cylinder pressure concurrently with an increase in the operating force of the brake operating member (hereinafter referred to simply as "brake operating force", where appropriate). This delay in the increase of the master cylinder pressure with respect to the brake operating force necessarily results in an increase in the required brake operating force. However, the conventional braking system is not provided with any means for dealing with this drawback.

SUMMARY OF THE INVENTION

It is therefore an object of the present invention to provide a braking system for an automotive vehicle, which is less likely to suffer from a delay in the detection of a requirement for an abrupt brake application and an insufficient amount of the brake operating force, even in the presence of an operational delay of a brake operating device disposed between the brake operating member and the master cylinder.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A braking system for braking a wheel of an automotive vehicle, including a brake for braking said wheel and an operating device operable to produce an output corresponding to an input thereof, for activating the brake according to the output, and wherein the output of the operating device is delayed with respect to the input depending upon an operating condition of the braking system, the braking system comprising:

a brake-operating-force increasing device operable on the basis of a delay of the output of the operating device with respect to the input, to increase an operating force of the brake to a value which is larger than a value corresponding to the output of the operating device.

In the braking system constructed according to the above mode (1) of this invention, the brake-operating-force increasing device is operated on the basis of a delay of the output of the operating device with respect to its input, to increase the operating force of the brake to a value larger than a value corresponding to the output of the operating device. The above-indicated "value corresponding to the output of the operating device" includes a delay of the output with respect to the input (operational delay of the operating device). Since the brake-operating-force increasing device is operated on the basis of this delay, the operating force of the brake increased by the brake-operating-force increasing device can be increased to a value larger than the value corresponding to the delay output of the operating device.

The brake-operating-force increasing device may be adapted to increase the operating force of the brake to a value larger than a value corresponding to the input of the operating device, or may be adapted to eliminate or reduce an amount of insufficiency of the operating force of the brake (a shortage of an actual value of the brake operating force with respect to a nominal value as represented by the input of the operating device), as described below with respect to the following mode (2) of the invention.

Where the brake-operating-force increasing device is adapted to increase the operating force of the brake to a value higher than a value corresponding to the input of the operating device (as represented by an operating force of a brake operating member), a determination as to whether an abrupt brake application to the vehicle is required or not is effected on the basis of the operational delay of the operating device. The operational delay of the operating device such as a vacuum booster is initiated when an operation of the operating device (an operation of a brake operating member) is initiated, and increases with a speed at which the brake operating member is operated, as described above with respect to the prior art. Accordingly, the requirement for an abrupt brake application to the vehicle can be detected at a relatively early point of time, on the basis of the operational delay of the operating device. Upon detection of the requirement for an abrupt brake application to the vehicle, the brake-operating-force increasing device is activated to increase the operating force of the brake to a value larger than a value corresponding to the input of the operating device, the later value being obviously larger than a value corresponding to the output of the operating device. Accordingly, not only the operational delay of the brake is reduced, but also the brake is operated with a larger operating force than in a normal braking operation, so that the required braking distance of the vehicle can be reduced. The brake-operating-force increasing device according to this arrangement may be referred to as an abrupt braking control device.

Where the brake-operating-force increasing device is adapted to increase the operating force of the brake so as to prevent or reduce an amount of insufficiency of the operating force of the brake, the problem of insufficiency of the operating force of the brake due to the operational delay of the operating device is mitigated or eliminated. The brake-operating-force increasing device according to this arrangement may be referred to as an operational-delay reducing device. Where the operating device is a vacuum booster, an upper limit of the operational delay of the vacuum booster is determined by taking account of a flow of the atmosphere into the variable-pressure chamber, and other factors which may cause the operational delay, and the brake-operating-force increasing device (operational-delay reducing device) is activated when it is found that the amount of the operational delay is larger than the determined upper limit, so as to totally or partially eliminate the problem of insufficiency of the operating force of the brake.

Where the delay of the output of the operating device with respect to the input is continuously detected, the following points are recognized. Namely, the operational delay is initiated almost simultaneously with the initiation of an operation of the operating device, and therefore the operational delay is detected at a relatively early point of time where the upper limit is determined to be relatively small. In this case, the operational delay of the brake can be accordingly reduced. On the other hand, however, the relatively small upper limit results in a relatively high frequency of operation of the operational-delay reducing device (brake-operating-force increasing device). Where the upper limit is determined to be relatively large, on the other hand, the frequency of operation of the operational-delay reducing device is lowered, but the operational delay of the brake is increased. Therefore, it is desirable that the upper limit of the operational delay of the operating device be determined so as not to cause an excessively high frequency of operation of the operational-delay reducing device and an excessively large amount of operational delay of the brake.

The operational delay of the operating device may be detected at a predetermined opportunity or opportunities. For instance, the operational delay is detected by detecting the output of the operating device when the input has increased to a predetermined value or values, or by detecting the input when the output has increased to a predetermined value or values. This arrangement, which does not require continuously detection of the operational delay of the operating device, is effective to reduce the operating load of a computer used for the braking system.

The brake may be a hydraulically operated brake including a hydraulic cylinder operable with a pressurized fluid, or an electrically operated brake including an electrically operated actuator.

(2) A braking system according to the above mode (1), wherein the brake-operating-force increasing device includes an abrupt braking control device operable to increase the operating force of the brake to a value larger than a value corresponding to the input of the operating device.

In the braking system according to the above mode (2) wherein the operating force of the brake is increased to a value larger than a value corresponding to the input of the operating device, so that the increased operating force changes with the amount of operational delay of the operating device. Accordingly, not only the insufficiency of the operating force of the brake due to the operational delay of the operating device is at least reduced, but also the brake is operated with the operating force required to apply an abrupt brake to the vehicle.

(3) A braking system according to the above mode (2), further comprising a brake operating member manually operable with an operating force, and wherein the operating device includes a booster which receives the operating force of the brake operating member as the input and boosts the input into the output, and the abrupt braking control device is operable to increase the operating force of the brake to a value larger than a value corresponding to the operating force of the brake operating member.

(4) A braking system according to any one of the above modes (1)–(3), further comprising a brake operating member manually operable with an operating force, and wherein the operating device includes a booster which receives the operating force of the brake operating member as the input and boosts the input into the output, and the brake-operating-force increasing device includes a braking-delay reducing device operable to increase the operating force of the brake such that the operating force of the brake approaches to a value corresponding to the operating force of the brake operating member.

In the braking system according to the above mode (4) which includes the feature of the above mode (2), the brake-operating-force increasing device includes both the abrupt braking control device and the braking-delay reducing device.

(5) A braking system according to any one of the above modes (1)–(4), wherein the brake-operating-force increasing device includes an output-delay detecting portion operable to detect the delay of the operating device on the basis of actual values of the input and the output of the operating device.

The operational delay of the operating device can be detected by detecting the actual values of the input and output of the operating device.

(6) A braking system according to the above mode (5), wherein the output-delay detecting portion includes a portion operable to detect the delay of the operating device on the basis of a relationship between the input and the output of the operating device at a predetermined point of time after a moment of initiation of an operation of the operating device.

The predetermined point of time may be a point of time a predetermined time after the moment of initiation of an operation of a brake operating member by an operator of the vehicle, or a point of time at which the input or output of the operating device has increased to a predetermined value.

The operational delay of the operating device may be continuously detected after the moment of initiation of an operation of the brake operating member by the vehicle operator. To assure efficient detection of the operational delay, the detection is preferably effected at a predetermined point of time, for instance, at a point of time at which a relatively large amount of the operational delay is expected. When or immediately after the operation of the operating device, its output is unstable, and the accuracy of detection of the operational delay is therefore likely to be deteriorated. The accuracy of detection may be increased if the detection is effected at a certain point of time at which the output is expected to be stabilized.

(7) A braking system according to the above mode (5) or (6), wherein the output-delay detecting portion includes an activating device which is operable to initiate an operation of the brake-operating-force increasing device when the activating device has detected that a difference between an ideal value of the output of the operating device which corresponds to an actual value of the input according to a static ideal relationship between the input and the output and an actual value of the output corresponding to the actual value of the input is not smaller than a predetermined threshold value.

When the operating device has an operational delay, the actual value of its output is smaller than the ideal value. Therefore, the operational delay is represented by a difference between the actual and ideal values of the output of the operating device. When the difference is larger than a predetermined threshold value or upper limit, this means that amount of operational delay is larger than a predetermined upper limit. In view of this fact, the braking system according to the above mode (7) is adapted to initiate an operation of the brake-operating-force increasing device when the difference of the actual value of the operating device with respect to the ideal value is found to be equal to or larger than the predetermined threshold value. Thus, the brake-operating-force increasing device is activated only when its operation is required to increase the operating force of the brake.

Where the operating device is a booster such as a vacuum booster, the actual value of the its output per se may be detected. However, the fluid pressure of a master cylinder operatively connected to the booster may be detected in place of the output of the operating device. Usually, it is easier to detect the master cylinder pressure than the output of the booster. Accordingly, the output-delay detecting portion is available at a lower cost where the operational delay of the operating device is detected by detecting the master cylinder pressure, than by detecting the actual output of the booster. Where the input of the booster is received from a manually operable brake operating member such as a brake pedal, the actual value of the input of the booster may be detected for comparison with the actual value of its output to detect the amount of operational delay of the booster. However, the operating force acting on the brake operating member may be detected in place of the actual input of the booster per se.

(8) A braking system according to the above mode (7), wherein the operating device is a vacuum booster operable to boost an input thereof into an output thereof by utilizing a negative pressure, and the output-delay detecting portion includes a threshold determining portion for determining the threshold value of the difference such that the threshold value is larger when a difference of a negative pressure from an atmospheric pressure is relatively small than when the difference of the negative pressure from the atmospheric pressure is relatively large.

The low-pressure chamber of the vacuum booster is connected to a negative pressure source in the form of the intake pipe or manifold of an engine of the vehicle, and the negative pressure in the low-pressure chamber varies depending upon the operating condition of the engine. When the negative pressure is relatively close to the atmospheric pressure, the operational delay of the booster with respect to an operation of the brake operating member is larger than when the negative pressure is relatively close to the absolute vacuum. If the threshold value of the difference between the actual and ideal values of the output of the booster is constant irrespective of the negative pressure in the booster, the operational delay of the booster is relatively easily detected to be excessive while the difference of the negative pressure from the atmospheric pressure is relatively small. According to the above mode (8), however, the determination as to whether the operational delay of the booster is excessive or not can be adequately effected irrespective of a change in the negative pressure in the low-pressure chamber of the booster.

(9) A braking system according to any one of the above modes (1)–(8), wherein the brake-operating-force increasing device includes an assisting-force applying portion operable to apply an assisting force to the brake for increasing the operating force of the brake to a value which is larger than a value corresponding to the output of the operating device by an amount of the assisting force.

The assisting force to be added to the brake by the assisting-force applying portion may be determined as desired. Where the brake-operating-force increasing device includes the abrupt braking control device described above with respect to the above modes (2) and (3), for instance, the assisting force may be determined to increase the operating force of the brake to a value larger than a value corresponding to an operating force which acts on a brake operating member and which is transmitted to the operating device as the input of the operating device. Where the brake-operating-force increasing device includes the braking-delay reducing device described above with respect to the above mode (4), the assisting force may be determined to be substantially equal to a difference between a value corresponding to the operating force of the brake operating member and a value corresponding to the actual value of the output of the operating device.

(10) A braking system according to the above mode (9), wherein the assisting-force applying portion is operable to control the assisting force to be applied to the brake such that the assisting force is larger when a deviation of an actual relationship between actual values of the input of the operating device from an ideal relationship between the input and the output is relatively larger than when the deviation is relatively small.

In the braking system according to the above mode (10), the assisting force to be added to the brake is relatively large when the operational delay of the operating device is relatively large. For instance, the assisting force is changed in steps corresponding to respective different ranges of the amount of the deviation of the actual input-output relationship of the operating device from the ideal relationship. Alternatively, the assisting force is continuously changed with a change of the amount of the deviation. In the latter case, the assisting force may be determined by multiplying the amount of the deviation by a predetermined coefficient, which may be a fixed constant or a variable that is changed continuously or in steps with an increase in the amount of the deviation.

Where the brake-operating-force increasing device includes the braking-delay reducing device, the assisting-force applying device having the feature according to the above mode (10) is obviously essential to minimize the adverse influence of the operational delay of the operating device. Where the brake-operating-force increasing device includes the abrupt braking control device, the assisting-force applying device according to the above mode (10) is operated to apply a larger assisting force to the brake when the operational delay of the operating device is relatively large, than when the operational delay is relatively small, since the relatively large operational delay is considered to indicate that the vehicle operator desires. a more abrupt brake application to the vehicle.

(11) A braking system according to the above mode (9) or (10), wherein the operating device is a vacuum booster operable to boost an input thereof into an output thereof by utilizing a negative pressure, and the assisting-force applying portion is operable to control the assisting force to be applied to the brake such that the assisting force is larger when a difference of a negative pressure from an atmospheric pressure is relatively small than when the difference of the negative pressure from the atmospheric pressure is relatively large.

When the negative pressure in the vacuum booster is relatively close to the atmospheric pressure, the amount of operational delay of the vacuum booster is relatively large than when the negative pressure is relatively close to the absolute vacuum. Accordingly, the operating force of the brake corresponding to a give operating force of the brake operating member is relatively small when the difference of the negative pressure from the atmospheric pressure is relatively small. Where the brake-operating-force increasing device includes the abrupt braking control device, the adverse influence of the operational delay of the booster can be eliminated or reduced by increasing the assisting force to be applied to the brake, with a decrease in the difference of the negative pressure with respect to the atmospheric pressure. This also applies to the braking system wherein the brake-operating-force increasing device includes the braking delay reducing device.

(12) A braking system according to any one of the above modes (9)–(11), wherein the assisting-force applying portion is operable to apply the assisting force to the brake when an amount of decrease of the input of the operating device within a predetermined time after a moment when the input has been increased to a maximal value is not smaller than a predetermined threshold.

The maximal value of the input of the operating device has been reached when the input which has been increasing begins to decrease. This change of the input from an increase to a decrease may be caused by a vehicle operator's intentional operation of the brake operating member toward the non-operated position, or may take place contrary to the operator's intention. As described below in the DETAILED DESCRIPTION OF THE PREFERRED EMBODIMENTS, the operating device may be a vacuum booster arranged to boost an input in the form of an operating force of a brake operating member manually operated by the vehicle operator, and transmit the boosted input to a master cylinder. A change of the input of the vacuum booster from an increase to a decrease may take place, for instance, when the operating force acting on the brake operating member is reduced after the brake operating member is once depressed by the operator with a relatively large force, because the operator cannot maintain the relatively large operating force, or for any other reason, contrary to the operator's intention. In the braking system according to the above mode (12) wherein the assisting force is applied to the brake when the amount of decrease of the input of the booster is not smaller than the predetermined threshold, the amount of decrease of the operating force of the brake due to the decrease of the input of the booster can be reduced by the assisting force applied, as long as the amount of decrease of the input is not smaller than the threshold, so that the brake can be operated with a sufficiently large force, to provide a sufficiently large braking force for braking the vehicle. Where the decrease of the input of the booster larger than the threshold is caused by the operator's intended releasing action of the brake operating member, the brake operating force is larger than desired. However, this case happens only infrequently, because the amount of decrease of the input of the booster is less likely to exceed the threshold within a predetermined time after the input has begun to decrease once it has increased to the maximal value. Even if the above case happened, an excessively large operating force of the brake would not have a detrimentally adverse effect on the running condition of the vehicle.

(13) A braking system according to the above mode (12), wherein said assisting-force applying portion is operable to control the assisting force to be applied to the brake such that the assisting force is larger when the amount of decrease of the input of the operating device within the predetermined time is relatively large than when the amount of decrease is relatively small.

(14) A braking system according to any one of the above modes (5)–(13), wherein the output-delay detecting portion is operable to detect the delay of the operating device when the input of the operating device has been increased to a predetermined value.

In the braking system according to the above mode (14), a requirement for an abrupt brake application to the vehicle is detected on the basis of the operational delay of the operating device, such that the requirement can be detected at a comparatively early point of time when the brake operating member is operated at a comparatively high speed by the vehicle operator to apply a brake in a comparatively abrupt manner. The requirement for an abrupt brake application to the vehicle can be detected by detecting the operational delay of the operating device when the actual output of the operating device has been increased to a predetermined value, for instance, on the basis of a difference between the actual value of the input detected when the actual output has been increased to the predetermined value, and the corresponding ideal value of the output which would be established if the operational delay were not present. In this case, however, the requirement for an abrupt brake application cannot be detected until the actual output of the operating device which is delay with respect to the actual input has been increased to the predetermined value. On the other hand, the actual input of the operating device does not include the operational delay, and increases at a rate corresponding to the amount of the operational delay. Accordingly, the time required for the actual input to be increased to the predetermined time decreases with an increase in the operating speed of the brake operating member, namely, with an increase in the degree of requirement for the abrupt brake application. Therefore, the output-delay detecting portion according to the above mode (14) permits the detection of the requirement for the abrupt brake application at a comparatively early point of time.

(15) A braking system according to the above mode (14), wherein the predetermined value of said input includes at least a first value and a second value larger than the first value.

The manner in which the operational delay of the operating device varies with the manner in which the operating device is operated (through the brake operating member, for instance). In the operating device is operated such that its input is increased at a relatively high rate, for example, the amount of operational delay of the operating device detected when the input has been increased to the predetermined first value is relatively large. If the operating device is operated such that its input is increased at a relatively low rate, the amount of operational delay detected when the input has been increased to the predetermined first value is relatively small. If the operating device is operated at a relatively high rate after the input has been increased to the predetermined first value, the amount of operational delay detected when the input has been increased to the predetermined second value is relatively large. The amount of operational delay of the operating device may be detected at three or more predetermined values of the input including the first and second values indicated above. The arrangement according to the above mode (15) wherein the amount of operational delay is detected at least two values of the input permits an increase of the operating force of the brake, if the amount of operational delay detected when the input has been increased to the predetermined second value or another value larger than the second value is larger than the predetermined upper limit, even if the amount of operational delay detected at the predetermined first value of the input is not larger than the upper limit.

(16) A braking system according to the above mode (9), wherein the assisting-force applying portion includes an ideal assisting-force applying portion (S120, S123) operable to apply the assisting force to the brake for thereby increasing the operating force of the brake by an amount of the assisting force, so as to establish an ideal relationship between the input and the operating force of the brake, which ideal relationship corresponds to an ideal relationship between the input and the output of the operating device.

In the braking system according to the above mode (16), the operating force of the brake is controlled to a value which is to be established when the input and output of the operating device has an ideal relationship therebetween. Namely, the assisting force is applied to the brake so that the operating force of the brake is increased by an amount of the assisting force, which is equal to the amount of shortage of the brake operating force due to the operational delay of the operating device.

(17) A braking system according to any one of the above modes (9)–(16), wherein the operating device is a vacuum booster operable to boost an input thereof into an output thereof by utilizing a negative pressure, and the assisting-force applying portion includes a post-boosting-limit assisting-force applying portion operable after a boosting limit of the vacuum booster has been reached, to apply the assisting force to the brake so that the operating force of the brake has a same relationship with the input of the operating device, as that before the boosting limit has been reached.

The vacuum booster is not capable of performing its boosting function after the pressure in the variable-pressure chamber has become equal to the atmospheric level, that is, after the boosting limit of the vacuum booster has been reached. After the boosting limit has been reached, the output of the booster is reduced with respect to a value which would be established if the input were continuously boosted as if the booster did not have the boosting limit. Accordingly, the output of the booster after the boosting limit has been reached is smaller than the ideal value as if the booster had an operational delay. In the braking system according to the above mode (17), the assisting force is applied to the brake after the boosting limit has been reached so that the operating force of the brake has a same relationship with the input of the booster, as that before the boosting limit has been reached. This arrangement eliminates the shortage of the brake operating force after the boosting limit of the vacuum booster has been reached.

(18) A braking system according to any one of the above modes (1)–(17), wherein the operating device is a vacuum booster operable to boost an input thereof into an output thereof by utilizing a negative pressure, the braking system further comprising a master cylinder operable by the output of the vacuum booster to deliver a pressurized fluid to the brake for operating the brake with the operating force corresponding to a pressure of the pressurized fluid.

(19) A braking system according to the above mode (18), wherein the brake-operating-force increasing device includes an assisting-force applying device operable to apply an assisting force to the brake for increasing the operating force of the brake to a value which is larger than a value corresponding to the output of the vacuum booster by an amount corresponding to the assisting force.

(20) A braking system according to the above mode (19), wherein the brake includes a wheel brake cylinder operable with a pressurized fluid for braking the wheel, and the assisting-force applying device includes a brake-cylinder-pressure control device operable to apply an assisting pressure to the wheel brake cylinder for increasing a pressure of the pressurized fluid delivered to the wheel brake cylinder, by an amount of the assisting pressure, so that the operating force of the brake is increased by the amount of the assisting force.

(21) A braking system according to the above mode (20), wherein the master cylinder includes a pressurizing piston, and the brake-cylinder-pressure control device includes an assisting-pressure applying portion which is disposed between the vacuum booster and the master cylinder and which is operable to apply the assisting pressure to the pressurizing piston so that the pressurizing piston receives the assisting force based on the assisting pressure, in addition to the output of said vacuum booster.

By application of the assisting pressure to the pressurizing piston of the master cylinder, a force corresponding to this assisting pressure is added to the pressurizing piston, in addition to the output of the vacuum booster, so that the pressure of the wheel brake cylinder is accordingly increased, and the operating force of the brake is accordingly increased.

(22) A braking system according to the above mode (21), wherein the assisting-force applying device (340, 370) includes:

an assisting cylinder portion (160) including an assisting cylinder (230, 238), and an assisting piston (238) fluid-tightly and sidably received in the assisting cylinder and cooperating with the assisting cylinder to define an assisting chamber (258) which receives the assisting pressure so that the pressure of the pressurized fluid to be delivered from the master cylinder to the wheel brake cylinder is increased by a amount corresponding to the assisting pressure; and an assisting pressure control device (332) including a hydraulic pressure source (334, 336), and a pressure control valve (338) for controlling a pressure of a pressurized fluid delivered from the hydraulic pressure source and applying the controlled pressure to the assisting chamber as the assisting pressure so that the pressure of the pressurized fluid of the wheel brake cylinder is increased by the amount corresponding to the assisting pressure.

The assisting cylinder and the assisting piston of the assisting-cylinder portion may be formed integrally with the housing and the pressurizing piston of the master cylinder.

(23) A braking system according to the above mode (20), wherein the brake-cylinder-pressure control device is disposed between the master cylinder and the wheel brake cylinder, and is operable to increase the pressure of the wheel brake cylinder to a value higher than the pressure of the pressurized fluid delivered from the master cylinder.

In the braking system according to the above mode (23) wherein the assisting pressure is not applied to the assisting chamber, the assisting pressure is added to the pressure of the wheel brake cylinder to increase the operating force of the brake.

(24) A braking system according to claim 23, wherein the brake-cylinder-pressure control device includes:

a pump operable to deliver a pressurized fluid and connected to a fluid passage connecting the master cylinder and the wheel brake cylinder; and a pressure control valve disposed in a portion of the fluid passage between the master cylinder and a point of connection of the fluid passage to the pump, the pressure control valve being operable to control the pressure of the pressurized fluid in the other portion of the fluid passage, so that the pressure of the wheel brake cylinder is higher than the pressure of the pressurized fluid as delivered from the master cylinder by an amount corresponding to the assisting force.

Where the delivery pressure of the pump is variable, the pressure control valve may be a simple solenoid-operated shut-off valve. In this case, the pressure of the pressurized fluid to be delivered to the wheel brake cylinder can be controlled by controlling the delivery pressure of the pump. The shut-off valve is kept in the closed state even after the fluid pressure of the wheel brake cylinder is made higher than the pressure of the master cylinder by the amount of the assisting pressure. Where the delivery pressure of the pump is not variable, the pressure control valve is preferably arranged to control the pressure of the wheel brake cylinder by controlling the amount of electric current to be applied thereto. In this case, the amount of electric current to be applied to the pressure control valve is controlled such that a portion of the pressurized fluid delivered from the pump is returned to the master cylinder through the pressure control valve so that the pressure of the wheel brake cylinder is made higher than the pressure of the master cylinder by the amount of the assisting pressure. Where the delivery pressure of the pump is not variable and the pressure control valve is a simple solenoid-operated shut-off valve, a second pressure control valve may be provided in a portion of the fluid passage between the above-indicated simple solenoid shut-off valve and the wheel brake cylinder or the pump, so that the pressure of the wheel brake cylinder is controlled by controlling the amount of electric current to be applied to the second pressure control valve. In this case a portion of the pressurized fluid delivered from the pump is returned to a reservoir, rather than to the master cylinder. This reservoir may be a master reservoir from which the fluid is supplied to the master cylinder, or a pressure-reducing reservoir to which the pressurized fluid is discharged from the wheel brake cylinder when the pressure of the wheel brake cylinder is reduced. In either one of the above cases, the pump is preferably arranged to pressurize the fluid received from the master reservoir or pressure-reducing reservoir to which the fluid is discharged through the pressure control valve to control the pressure of the wheel brake cylinder. However, this arrangement is not essential.

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which:

FIGS. 3A and 3B are front elevational views in cross section showing a construction and an operation of a pressure control valve of a brake-cylinder pressure control valve in the braking system of FIG. 1;

FIG. 25 is a block diagraph schematically illustrating an electronic control device provided in the braking system of FIG. 24.

DETAILED DESCRIPTION OF THE PREFERRED EMBODIMENTS

Figure 1:
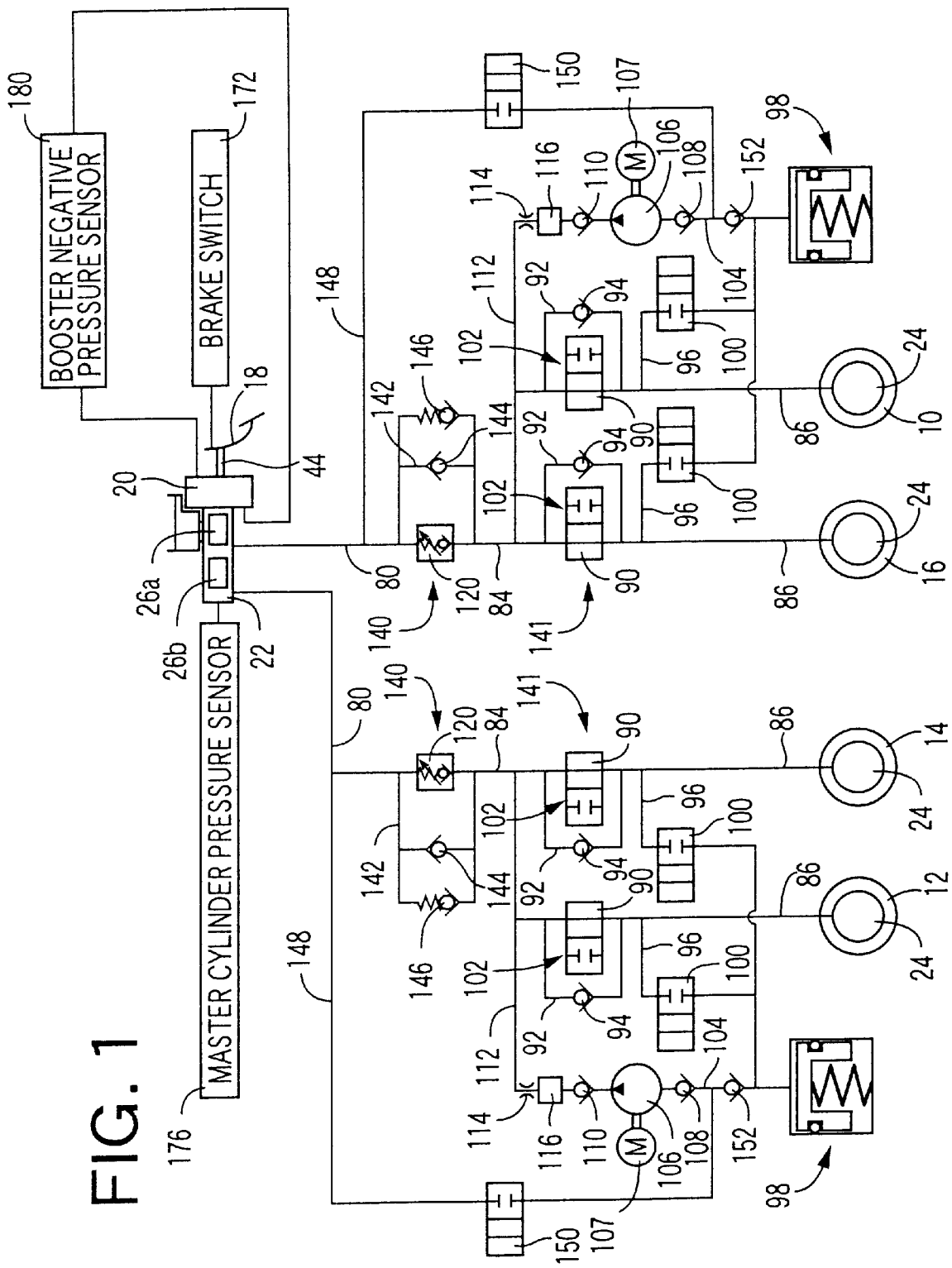
FIG. 1 is a schematic view showing a braking system for an automotive vehicle, which is constructed according to one embodiment of this invention.

Referring first to FIG. 1, there is shown a braking system for a four-wheel automotive vehicle having a front left wheel 10, a front right wheel 12, a rear left wheel 14 and a rear right wheel 16. The present braking system has a brake operating member in the form of a brake pedal 18, a vacuum booster 18 (hereinafter referred to as "booster 18"), and a hydraulic pressure source in the form of a master cylinder 22. Upon depression of the brake pedal 18, an operating force acting on the brake pedal 18 is boosted by the booster 20, so that a working fluid is pressurized by the master cylinder 22 to a pressure corresponding to the operating force of the brake pedal 18 as boosted by the booster 20. The pressurized fluid is delivered to wheel brake cylinders 24 provided for the respective front left and right, and rear left and right wheels 10, 12, 14, 16, so that the wheel brake cylinders 24 are activated for braking the respective wheels 10, 12, 14, 16.

The master cylinder 22 is of a tandem type including a housing, and two pressurizing pistons 26a, 26b which are received in series with each other and axially sidably within the housing. The two pressurizing pistons 26a, 26b cooperate with the housing to define respective two mutually independent pressurizing chambers on their front side. The operating force of the brake pedal 18, which will be referred to as "brake operating force" where appropriate, is first boosted by the booster 20, and the boosted brake operating force is transmitted to one of the two pressurizing pistons 26a, 26b of the master cylinder 26, which is located on the side of the booster 20, that is, transmitted to the pressurizing piston 26a.

Figure 2:
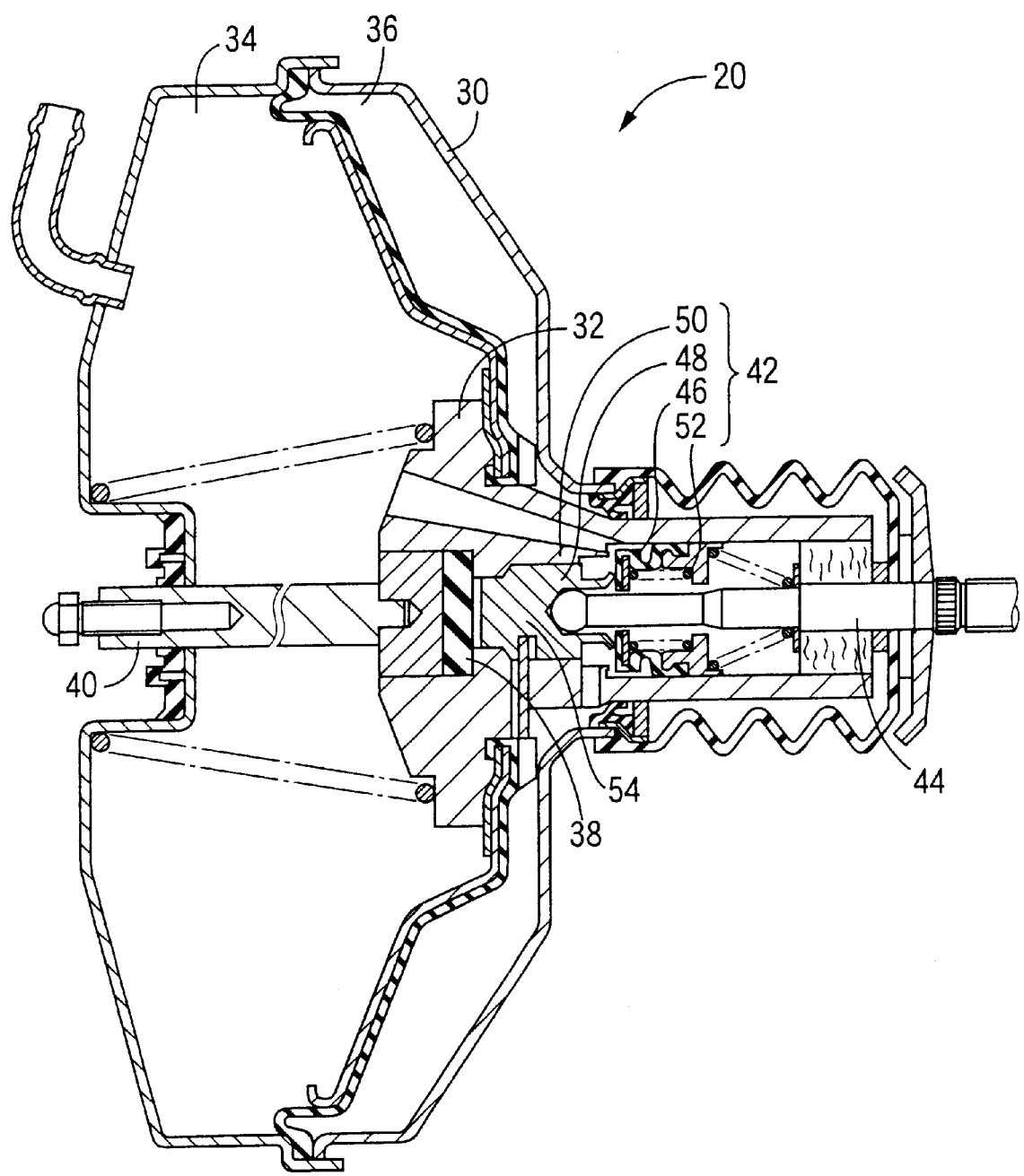
FIG. 2 is a side elevational view in cross section of a vacuum booster provided in the braking system of FIG. 1.

As shown in FIG. 2, the booster 20 includes a hollow housing 30, and a power piston 32 which is disposed in the housing 30 and which separates the interior space in the housing 30 into a low-pressure chamber 34 on the side of the master cylinder 22 and a variable-pressure chamber 36 on the side of the brake pedal 18. The low-pressure chamber 34 is connected to an intake manifold (not shown) of an engine of the vehicle, more specifically, to a portion of the intake manifold which is located between a throttle valve and a point at which the intake manifold is branched for supplying air to a plurality of intake valves. In the present embodiment, therefore, the pressure in the low-pressure chamber 34 is a negative or reduced pressure lower than the atmospheric pressure.

The power piston 32 is connected, at its axial end on the side of the master cylinder 22, to a booster piston rod 40 through a reaction disc 38 which is formed of a rubber material. The booster piston rod 40 transmits an operating force acting on the power piston 32 to the pressurizing piston 26a of the master cylinder 22.

A switch valve 42 is disposed between the low-pressure chamber 34 and the variable-pressure chamber 36. The switch valve 42 is operated according to a relative axial movement of the operating rod 44 and the power piston 32 relative to each other, and includes a control valve 45, an air valve 48, a vacuum valve 50 and a control valve spring 52. The air valve 48 cooperates with the control valve 46 to selectively permit and inhibit fluid communication of the variable-pressure chamber 36 with the atmosphere, and is associated with the operating rod 44. The operating rod 44 is pivotally connected at its one end to the brake pedal 18, and functions to transmit the operating force of the brake pedal 18 (brake operating force) to an input piston 54. The air valve 48 is formed as an integral part of the input piston 54, which is adapted to be forced by the operating rod 44 onto the reaction disc 38. The operating rod 44 is pivotally connected to the brake pedal 18 at its end remote from the air valve 48, as indicated in FIG. 1. The control valve 46 is biased by a control valve spring 52 with respect to the operating rod 44, in a direction that causes the control valve 46 is seated on the air valve 48. The vacuum valve 50 cooperates with the control valve 46 to selectively permit and inhibit fluid communication of the variable-pressure chamber with the low-pressure chamber 34, and is movable together with the power piston 32.

When the booster 20 constructed as described above is in the non-operated state, the switch valve 42 is placed in its retracted position in which the control valve 46 is seated on the air valve 48 and is spaced apart from the vacuum valve 50, so that the variable-pressure chamber 36 is held in communication with the low-pressure chamber 34, while being disconnected from the atmosphere. In this non-operated position of the switch valve 42, the pressure in the variable-pressure chamber 36 is equal to a negative pressure in the low-pressure chamber 34 (a reduced pressure lower than the atmospheric pressure). When the booster 20 is brought into an operating state upon operation of the brake pedal 18, the operating rod 44 is advanced relative to the power piston 32, and the switch valve 42 is switched to its intermediate position in which the control valve 46 is seated on the vacuum valve 50, so that the variable-pressure chamber 46 is disconnected from both of the low-pressure chamber 34 and the atmosphere. When the operating rod is advanced a further distance relative to the power piston 32, the switch valve 42 is brought to its advanced position in which the air valve 48 is spaced apart from the control valve 46, so that the variable-pressure chamber 36 is brought into communication with the atmosphere. In this state, the fluid pressure in the variable-pressure chamber 36 is increased towards the atmospheric level, and there arises a difference between the fluid pressures in the low-pressure and variable-pressure chambers 34, 36. As a result, the power piston 32 is advanced by the pressure difference toward the low-pressure chamber 34. An operating force of the power piston 32 is transmitted to the pressurizing piston 26a of the master cylinder 22 through the booster piston rod 40, and the reaction force received from the pressurizing piston 26a is distributed by the reaction disc 38 to the power piston 32 and the input piston 54. The vehicle operator is able to perceive the reaction force received by the input piston 54, through the operating rod, as the reaction force received from the master cylinder 22. It will be understood that the operating rod 44 and the input piston 54 function as an input member of the booster 20, while the booster piston rod 40 functions as an output member of the booster 20.

As shown in FIG. 1, one of the two pressurizing chambers of the master cylinder 22 is connected to a first brake-application sub-system for the front left wheel 10 and the rear right wheel 16, while the other pressurizing chamber is connected to a second brake-application sub-system for the front right wheel 12 and the rear left 14. Thus, the present braking system is of a diagonal or X-cross type, and is capable of performing an anti-lock braking pressure control, and an assisting control wherein a suitable assisting pressure is added to the fluid pressure in the appropriate wheel brake cylinder or cylinders 10, 12, 14, 16. Since the first and second brake-application sub-systems, only the first brake-application sub-system will be described by way of example, and the description of the second brake-application sub-system is dispensed with, by using the same reference signs for the second sub-system to identify the functionally corresponding elements.

In the first brake-application sub-system, the master cylinder 22 is connected through a main fluid passage 80 to the wheel brake cylinders 24 for the front left and rear right wheels 10, 16. The main fluid passage 80 consists of a common passage 84 connected at its one end to the master cylinder 22, and two branch passages 86 each of which is connected at its one end to the other end of the common passage 84 and at the other end to the corresponding wheel brake cylinder 24.

In each branch passage 86, there is provided a pressure-increasing valve 90 in the form of a solenoid-operated shut-off valve, which is normally placed in an open state permitting a flow of the fluid in a direction from the master cylinder 22 to the wheel brake cylinder 24. To each branch passage 86, there is connected a by-pass passage 92 which by-passes the pressure-increasing valve 90. In the by-pass passage 92, there is provided a check valve 94 which permits a flow of the fluid in a direction from the wheel brake cylinder 24 to the master cylinder 22. To a portion of each branch passage 92 between the pressure-increasing valve 90 and the wheel brake cylinder 24, there is connected a reservoir passage 96 connected to a reservoir 98. In the reservoir passage 96, there is provided a pressure-reducing valve 100 in the form of a solenoid-operated shut-off valve, which is normally placed in a closed state. When the pressure-reducing valve 100 is placed in an open state, it permits a flow of the fluid in a direction from the wheel brake cylinder 24 to the reservoir 98. These pressure-increasing and pressure-reducing valves 90, 100 cooperate to constitute a pressure control valve device 102, which is a solenoid-operated valve device.

The reservoir 98 is arranged to accommodate the working fluid under pressure owing to a biasing force of biasing means in the form of a spring. The reservoir 98 is connected through a pump passage 104 to a suction side of a pump 106, which is driven by an electric motor 107. In the pump passage 104, there is provided a suction valve 108 connected to the suction side of the pump 106. In an auxiliary fluid passage 112 connecting the delivery side of the pump 106 and the branch passages 92, there is provided a delivery valve 110 connected to the delivery side of the pump 106. These suction and delivery valves 108, 110 are check valves. In the auxiliary fluid passage 112, there are further provided a flow restrictor in the form of an orifice 114 and a fixed damper 116, which function to reduce a pressure pulsation of the fluid pressurized by the pump 106. When the anti-lock braking pressure control is effected, the pump 106 is operated to pump up the fluid from the reservoir 98, so that the pressurized fluid is delivered from the pump to the hydraulic circuit.

A pressure control valve 120 is connected to a portion of the main fluid passage 80 which is between the master cylinder 22 and a point of connection of the common passage 84 and the branch passages 86 (a point at which the main fluid passage 80 is connected to the auxiliary passage 112). When the pump 106 is not in operation, the pressure control valve 120 permits flows of the fluid in the opposite directions between the master cylinder 22 and the wheel brake cylinders 24. When the pump 106 is in operation, the pressure control valve 120 releases the pressurized fluid delivered from the pump 106 to the master cylinder 20, so that the fluid pressure in the wheel brake cylinders 24 is controlled to a level higher than that in the master cylinder 22, depending upon an amount of electric current to be applied to the pressure control valve 120 as well as the fluid pressure in the master cylinder 22, as described below in detail.

The construction of the pressure control valve 120 will be described in detail by reference to FIGS. 3A and 3B.

The pressure control valve 120 is arranged to electromagnetically control a relationship between the fluid pressure in the master cylinder 22 (hereinafter referred to as "master cylinder pressure" where appropriate) and the fluid pressure in the wheel brake cylinders 24 (hereinafter referred to as "wheel brake cylinder pressure" where appropriate). As shown in FIGS. 3A and 3B, the pressure control valve 120 has a housing (not shown), a valve member 130, a valve seat 132, and a solenoid including a solenoid coil 134 for controlling a relative movement of the valve member 130 and the valve seat 132 so as to control fluid flows through the main fluid passage 80 between the master cylinder 20 and the wheel brake cylinders 24.

When the solenoid coil 134 is placed in a de-energized or OFF state as indicated in FIG. 3A, the valve member 130 is held apart from the valve seat 132 under an elastic force of a spring 136, as shown in FIG. 3A, so that the pressure control valve 130 permits the fluid flows through the main fluid passage 80 in the opposite directions between the master cylinder 20 and the wheel brake cylinders 24. When the brake pedal 1 is operated in this OFF state of the solenoid coil 134, the wheel brake cylinder pressure is changed with the master cylinder pressure such that the wheel brake cylinder pressure is equal to the wheel brake cylinder pressure. The valve member 130 which is biased by the spring 136 in a direction away from the valve seat 132 is not seated on the valve seat 132 unless the solenoid coil 134 is energized, even if the master cylinder pressure is increased, that is, even if the wheel brake cylinder pressure is increased. It will thus be understood that the pressure control valve 120 is a normally open valve.

When the solenoid coil 134 is placed in an energized or ON state, on the other hand, an armature 138 is attracted toward the valve seat 132 by a magnetic force generated as a result of energization of the solenoid coil 134, so that a movable member in the form of the valve member 130 moving with the armature 138 is seated on a stationary member in the form of the valve seat 132, as shown in FIG. 3B. At this time, the valve member 130 receives a sum of a force F2 based on a difference between the wheel brake cylinder pressure and the master cylinder pressure and an elastic force F3 of the spring 136, and an attraction force F1 based on the magnetic force of the solenoid coil 134, in the opposite directions. The force F2 is a product of the pressure difference of the wheel brake cylinder 24 and the master cylinder 22 and an effective pressure-receiving surface area of the valve member 130. which receives the wheel brake cylinder pressure.

While the sum of the force F2 and the elastic force F3 is not larger than the attraction force F1, with a relatively low delivery pressure of the pump 106, namely, with a relatively low level of the wheel brake cylinder pressure, the pressure control valve 120 is held in the closed state, so that the pressurized fluid delivered from the pump 106 is prevented by the pressure control valve 120 from flowing to the master cylinder 22. As a result, the delivery pressure of the pump 106 is increased, and the wheel brake cylinder pressure is made higher than the master cylinder pressure. When the sum of the force F2 and the elastic force F1 has exceeded the attraction force F1 as a result of an increase in the delivery pressure of the pump 106, that is, as a result of an increase in the wheel brake cylinder pressure, the valve member 130 is moved away from the valve seat 132 valve, namely, the pressure control valve 120 is opened to permit the pressurized fluid delivered from the pump 106 to be partially returned to the master cylinder 22, preventing a further increase in the delivery pressure of the pump 106 and a further increase in the wheel brake cylinder pressure. If the elastic force F3 of the spring 136 is ignored, the fluid pressure in the wheel brake cylinders 24 is made higher than the master cylinder pressure by an amount corresponding to the attraction force F1 which is generated as a result of energization of the solenoid coil 134 and which acts on the valve member 130 so as to be seated on the valve seat 132. Thus, an assisting pressure is added to the master cylinder pressure to increase the wheel brake cylinder by an amount corresponding to the assisting pressure. In the present embodiment, the pump 106 cooperates with the pressure control valve 120 to constitute a major part of a brake-cylinder pressure control device 140, and cooperates with the pressure control valve device 102 to constitute a major part of an anti-lock braking-pressure control device 141. It will be understood that the pump 106 is commonly used for the brake-cylinder pressure control device 140 and the anti-lock braking-pressure control device 141. For the wheel brake cylinders 24, the application of the assisting pressure to the wheel brake cylinders 24 by the brake cylinder-pressure control device 140 may be considered to be the boosting of the operating force of the brake pedal 18.

To the common passage 84 of the main fluid passage 80, there is connected a by-pass passage 142 which by-passes the pressure control valve 120, as shown in FIG. 1. In this by-pass passage 142, there is provided a check valve 144, which permits a flow of the fluid in the direction from the master cylinder 22 to the wheel brake cylinders 24 even if the pressure control valve 120 is abnormally kept in the closed state when the brake pedal 18 is operated. A pressure relief valve 146 is also provided so as to by-pass the pressure control valve 120. This pressure relief valve 146 functions to prevent an excessively rise of the delivery pressure of the pump 106.

The pump 106 is operated during the anti-lock braking pressure control, and during an assisting pressure control for applying an assisting pressure to the wheel brake cylinders 24 as described above. During the assisting pressure control, the fluid pumped up from the reservoir 98 by the pump 106 is delivered to each wheel brake cylinder 24 to increase the fluid pressure in the wheel brake cylinder 24. When the anti-lock braking pressure control is not effected, the fluid is not usually stored in the reservoir 98. To permit the assisting pressure control, the pump 106 must be supplied with the fluid, irrespective of whether the anti-lock braking pressure control is effected or not. To this end, a fluid supply passage 148 is provided in the present embodiment, to connect the pump passage 104 to a portion of the common passage 84 between the master cylinder 22 and the pressure control valve 120.

In the fluid supply passage 148, there is provided an inflow control valve 150 which is placed in an open state when the fluid is required to be supplied from the master cylinder 22 to the pump 106 (pump passage 104), and in a closed state when the supply of the fluid from the master cylinder 22 to the pump 106 is not required. That is, the fluid supply from the master cylinder 22 to the pump passage 104 is permitted when the inflow control valve 150 is placed in the open state, and is inhibited to permit an increase in the wheel brake cylinder pressure when the inflow control valve 150 is placed in the closed state. In the present embodiment, the inflow control valve 150 is a normally closed solenoid-operated shut-off valve.

Further, a check valve 152 is provided in a portion of the pump passage 104, which portion is located between points of connection of the pump passage 104 to the fluid supply passage 147 and the reservoir passage 96. The check valve 150 permits a fluid flow in a direction from the fluid supply passage 148 to the reservoir 98, and inhibits a fluid flow in the reverse direction. In the presence of the check valve 152, the relatively high pressure of the fluid in a portion of the main fluid passage 80 between the master cylinder 22 and the pressure control valve 120 is not reduced due to fluid communication of the above-indicated portion of the main fluid passage 80 with the reservoir 98 through the fluid supply passage 148 and the pump passage 104. Accordingly, the fluid having the relatively high pressure is supplied to and pressurized by the pump 106 and supplied to the wheel brake cylinders 24 to increase the wheel brake cylinder pressure, with a relatively small amount of consumption of electric energy by the pump 106.

Figure 4:
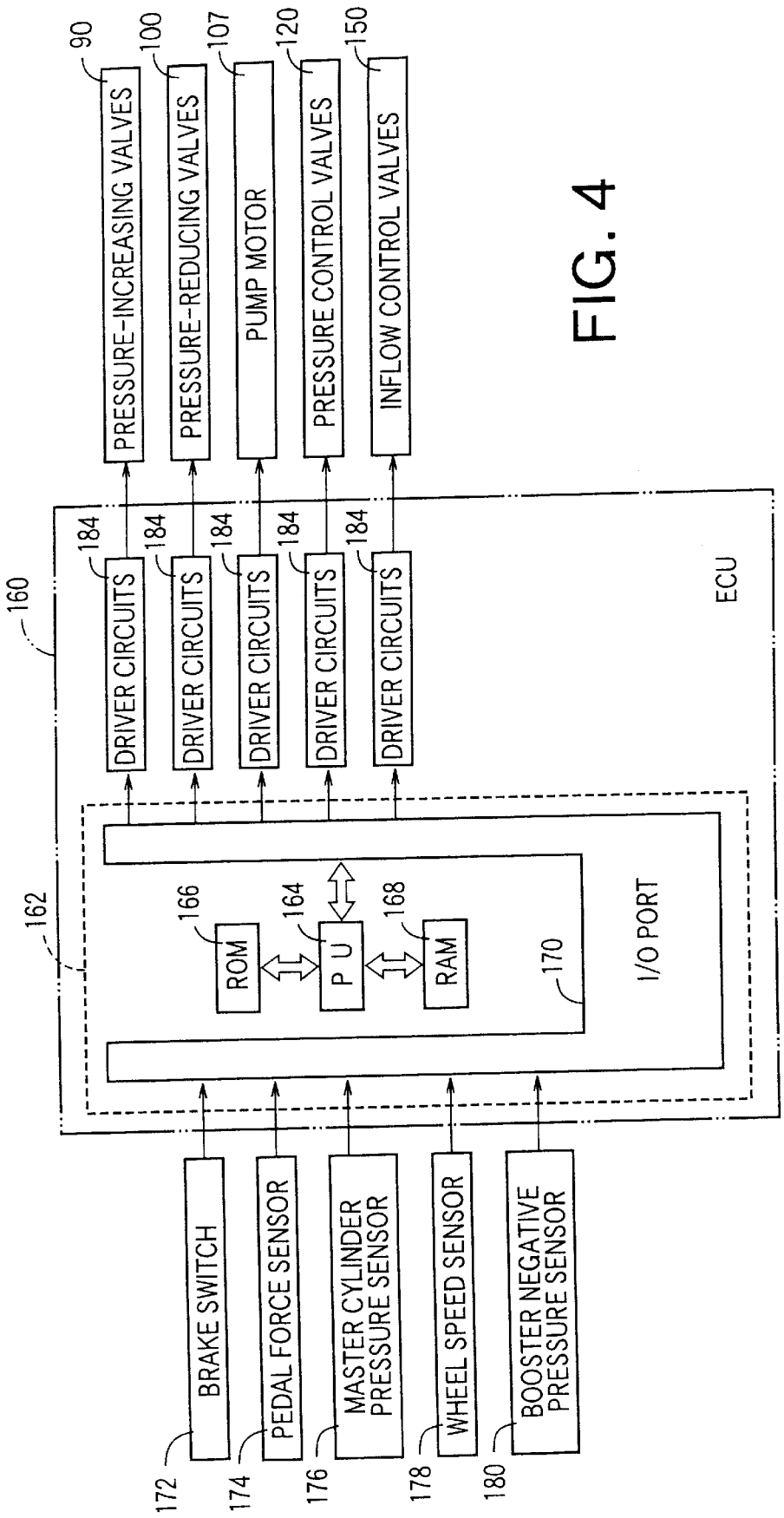
FIG. 4 is a block diagram schematically illustrating an electronic control device provided in the braking system of FIG. 1.

The present braking system is provided with an electronic control device 160 (hereinafter referred to as "ECU 160"), as shown in FIG. 4. The ECU 160 includes a computer 162, which incorporates a processing unit (PU) 164, a read-only memory (ROM) 166, a random-access memory (RAM) 168, and an input/output (I/O) port 170. To the I/O port 170, there are connected various sensors and switches such as a brake switch 172, a pedal force sensor 174, a master cylinder pressure sensor 176, wheel speed sensors 178 and a booster negative pressure sensor 180. To the I/O port 170, there are also connected various actuators such as the pump motors 107, through driver circuits 184. The driver circuits 184 and the computer 162 constitute the ECU 160.

The brake switch 172 generates a first signal indicating that the brake pedal 18 is placed in its non-operated position, and a second signal that the brake pedal 18 has been operated, namely, is placed in an operated position. When an operation of the brake pedal 18 is initiated, the output signal of the brake switch 172 is changed from the first signal to the second signal. In the present embodiment, the first signal is an OFF signal while the second signal is an ON signal. The non-operated position of the brake pedal 18 is determined by a suitable stop fixed on the vehicle body.

The pedal force sensor 174, which may be a load cell, is arranged to detect an operating force acting on the brake pedal 18, and generates an operating force signal indicative of the operating force. This operating force is a kind of a physical quantity representing the operating amount of the brake pedal 18. The master cylinder pressure sensor 176 is connected to one of the two pressurizing chambers of the master cylinder 22, and is arranged to generate a pressure signal indicative of the pressure of the fluid pressurized by the master cylinder 22. The wheel speed sensors 178 are provided for the respective front left and right and rear left and right wheels 10, 12, 14, 16, and are arranged to generate wheel speed signals indicative of the rotating speeds of the respective wheels 10, 12, 14, 16. The booster negative pressure sensor 180 is arranged to detect the negative pressure in the low-pressure chamber 34 of the booster 20, and generate a pressure signal indicative of the negative pressure in the low-pressure chamber 34.

Figure 5:
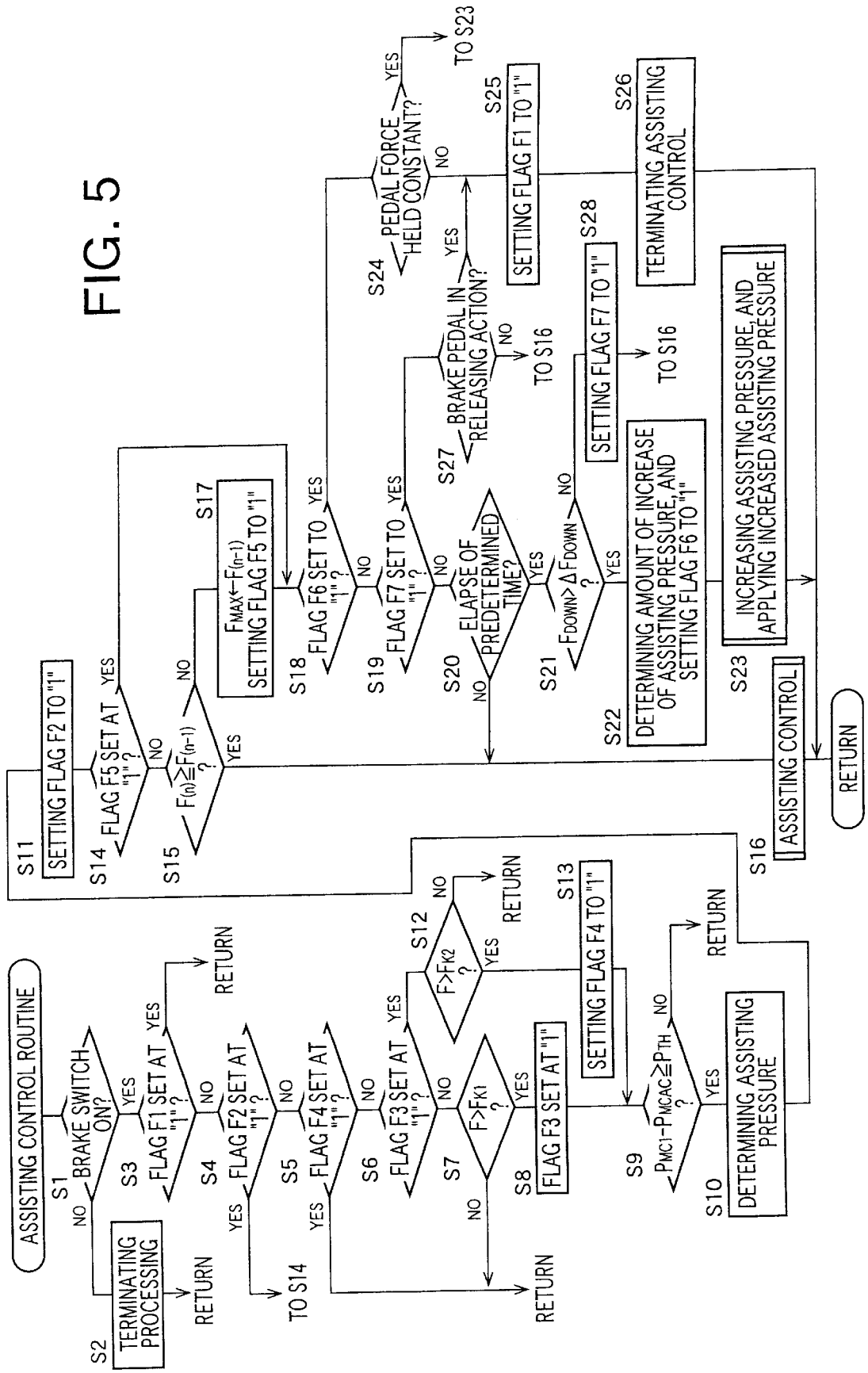
FIG. 5 is a flow chart illustrating an assisting control routine executed according to a control routine stored in a ROM of a computer of the electronic control device of FIG. 4.
Figure 6:
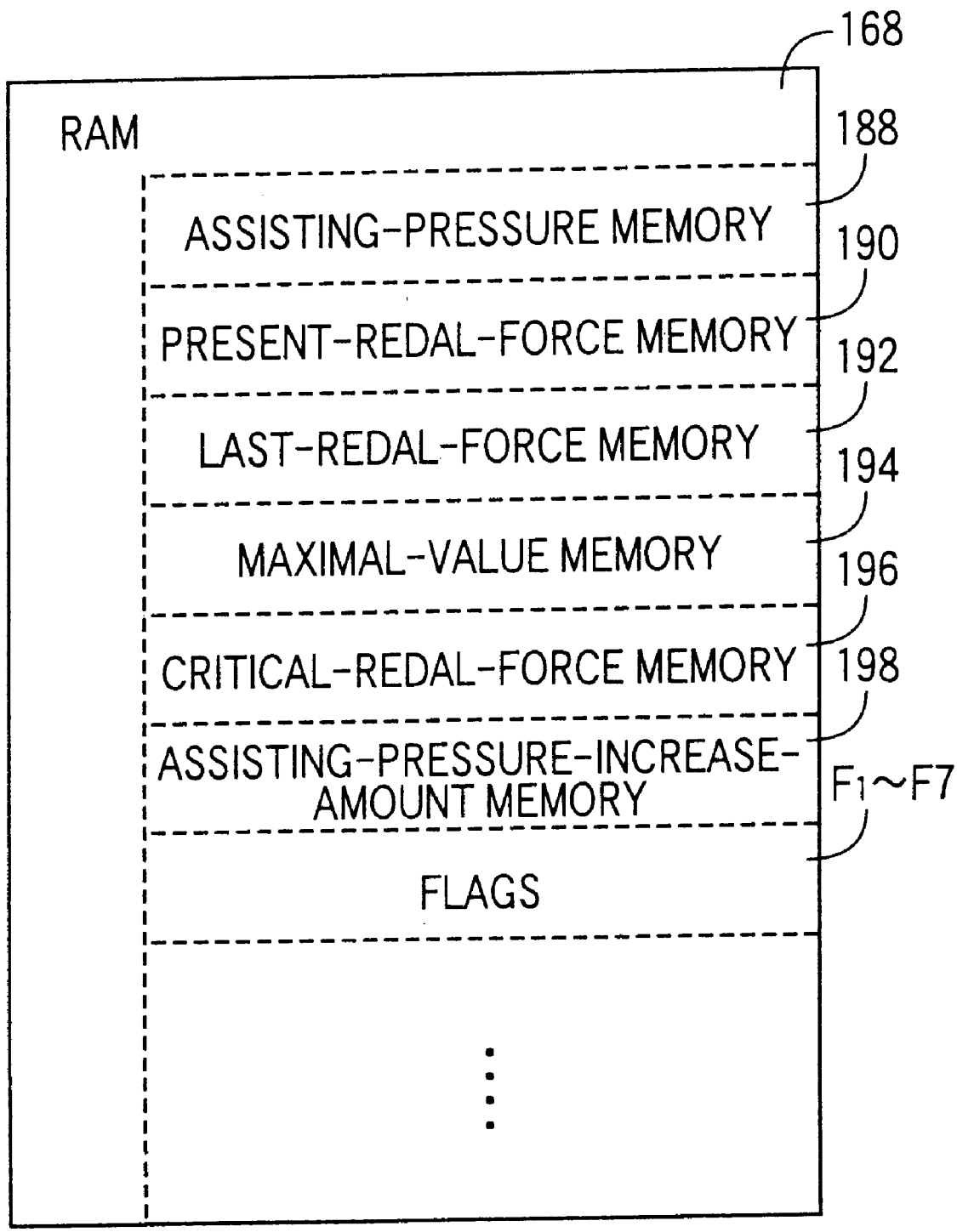
FIG. 6 is a view showing a portion of a RAM of the computer of the electronic control device of FIG. 4, which has a significant relationship with the principle of the present invention.

The ROM 166 of the computer 162 stores various control programs such as those for executing an assisting control routine illustrated in the flow chart of FIG. 5 to effect the assisting pressure control indicated above, an anti-lock braking pressure control routine to effect the anti-lock braking pressure control also indicated above, and other control routines. The RAM 168 of the computer 162 includes various memories such as an assisting-pressure memory 188, as well as a working memory. The PU 164 executes the control routines according to the control programs stored in the ROM 166, while utilizing a temporary data storage function of the RAM 168, for effecting the assisting pressure control, anti-lock braking pressure control, etc. In the anti-lock braking pressure control, the fluid pressure in each wheel brake cylinder 24 is controlled during an operation of the brake pedal 18, so as to prevent an excessive locking tendency of the wheel, by selectively placing the pressure control valve device 102 in an appropriate one of a pressure-increasing state, a pressure-holding state and a pressure-reducing state, while monitoring the locking state of the corresponding wheel 10, 12, 14, 16 on the basis of the detected speed of the wheel, and the vehicle running speed which is estimated on the basis of the detected speeds of the wheels. The pressure-increasing state is established by placing the pressure-increasing valve 90 in the open state and the pressure-reducing valve 100 in the closed state. The pressure-holding state is established by placing both of the pressure-increasing and pressure-reducing valves 90, 100 in the closed state. The pressure-reducing state is established by placing the pressure-increasing valve 90 in the closed state and the pressure-reducing valve 100 in the open state. The anti-lock braking pressure control is effected while the pump 107 is in operation by the pump motor 107, so as to pressurize the fluid received from the reservoir 98 and to deliver the pressurized fluid to the main fluid passage 104. No further explanation of the anti-lock braking pressure control is deemed necessary, since the present invention does not directly relate to the anti-lock braking pressure control.

There will be briefly described the assisting pressure control effected according to the assisting control routine. The assisting pressure control is formulated to detect that an abrupt brake application to the vehicle is required. This detection is effected on the basis of a detected amount or degree of operational delay of the booster 20, when the input force of the booster 20, that is, the operating force of the brake pedal 18 acting on the operating rod 44 of the booster 20 has exceeded a predetermined first value $F_{K1}$, and when the operating force has exceeded a predetermined second value $F_{K2}$ larger than the first value $F_{K1}$. A determination that the abrupt brake application is required is made if the detected amount of the operational delay of the booster 20 is larger than a predetermined threshold, that is, if the output of the booster 20 is delayed with respect to its input by more than a predetermined amount. In the present embodiment, the input of the booster 20 is detected on the basis of the detected operating force acting on the brake pedal 18, while the output of the booster 20 is detected on the basis of the detected master cylinder pressure. A determination as to whether the amount of operational delay of the booster 20 is larger than the predetermined threshold is effected by determining whether a master cylinder pressure difference witch is a difference between a detected actual value $P_{MCAC}$ of the master cylinder pressure (actual output value of the booster 20) and an ideal value $P_{MCI}$ of the master cylinder pressure is larger than a predetermined threshold $P_{TH}$. The ideal master cylinder pressure value $P_{MCI}$ is a theoretical value of the master cylinder pressure which corresponds to the operating force of the brake pedal 18 (brake operating force) and which is to be established according to an ideal static relationship between the brake operating force and the master cylinder pressure, in the absence of any delay of the boosting operation of the booster 20 to boost its input.

When the determination that an abrupt brake application is required is made as a result of detection of an excessive amount of operational delay of the booster 20 larger than the predetermined threshold, an assisting pressure is applied to the wheel brake cylinders 24 to increase the braking force based on the pressurized fluid in the wheel brake cylinders 24, by an amount corresponding to the assisting pressure, so that the increased braking force is larger than that determined according to the ideal static relationship between the brake operating force and the master cylinder pressure. Described in detail, the brake-cylinder pressure control device 140 is activated to increase the actual wheel brake cylinder pressure $P_{MCAC}$ by the assisting pressure, so that the braking force is increased by the amount corresponding to the assisting pressure. The assisting pressure is determined so that the wheel brake cylinder pressure is made higher than the ideal value $P_{MCI}$ corresponding to the brake operating force. The assisting pressure is increased with an increase in the difference between the actual and ideal values $P_{MCAC}$ and $P_{MCI}$ of the master cylinder pressure PMC, which difference is detected when the requirement for the abrupt brake application to the vehicle is detected.

Where the brake operating force is reduced contrary to the vehicle operator's intention, a reduction of the braking force due to the reduction of the brake operating force is reduced by increasing the assisting pressure applied by the brake-cylinder pressure control device 140. When the brake pedal 18 is released, the assisting pressure control is terminated.

The assisting control routine will be described by reference to the flow chart of FIG. 5.

Initially, an operation of the braking system when an abrupt brake application is not required will be described.

The assisting control routine of FIG. 5 is initiated with step S1 to determine whether the brake switch 172 is ON, namely, whether the brake pedal 18 has been operated. If a negative decision (NO) is obtained in step S1, the control flow goes to step S2 to effect processing operations for terminating the routine, such as resetting of flags F1–F7, clearing of the memories such as the assisting-pressure memory 188, and termination of the operation of the brake-cylinder pressure control device 140. The operation of the brake-cylinder pressure control device 140 is terminated by turning off the pump motor 107, de-energizing the solenoid coil 134 of the pressure control valve 120 to restore the valve 120 to its open state, and closing the inflow control valve 150. It is noted that the flags F1–F7 have been reset to "0" and the assisting-pressure memory 188 and other memories have been cleared, in the initializing step of a main control routine before the present assisting control routine is initiated.

While the brake pedal 18 is placed in an operated position, an affirmative decision (YES) is obtained in step S1, and the control flow goes to step S3 to determine whether the flag F1 is set at "1". The flag F1 set at "1" indicates that the assisting control is required to be terminated. If a negative decision (NO) is obtained in step S3, the control flow goes to step S4 to determine whether the flag F2 is set at "1". The flag F2 set at "1" indicates that the requirement for an abrupt brake application has been detected and that the assisting pressure control is required to be effected. If a negative decision (NO) is obtained in step S4, the control flow goes to step S5 to determine whether the flag F4 is set at "1". The flag F4 set at "1" indicates that the requirement for an abrupt brake application has been detected when the brake operating force F is larger than the predetermined second value $F_{K2}$. If a negative decision (NO) is obtained in step S5, the control flow goes to step S6 to determine whether the flag F3 is set at "1". The flag F3 set at "1" indicates that the requirement for an abrupt brake application has been detected when the brake operating force F is larger than the predetermined first value $F_{K1}$. If a negative decision (NO) is obtained in step S6, the control flow goes to step S7 to determine whether the brake operating force F is larger than the predetermined first value $F_{K1}$. If a negative decision (NO) is obtained in step S7, one cycle of execution of the present assisting control routine is terminated.

When the brake operating force F has exceeded the predetermined first value FK1, an affirmative decision (YES) is obtained in step S7, and the control flow goes to step S8 to set the flag F3 to "1", and then to step S9 to determine whether an abrupt brake application is required. The determination in step S9 is effected by determining whether the difference of the actual master cylinder pressure value $P_{MCAC}$ with respect to the ideal value $P_{MCI}$ is equal to or larger than the predetermined threshold value $P_{TH}$. The ideal value $P_{MCI}$ is the theoretical value of the master cylinder pressure which corresponds to the operating force F which is now acting on the brake pedal 18. In this case wherein step S9 is executed following step S8, this ideal value $P_{MCI}$ corresponds to the brake operating force FK1, and is determined according to the predetermined ideal relationship between the values $F_{K1}$ and $P_{MCI}$. This ideal relationship is stored in the ROM 166. On the other hand, the actual master cylinder pressure $P_{MCAC}$ is detected by the master cylinder pressure sensor 176. When the brake pedal 18 is operated to apply an abrupt brake to the vehicle, the rate of increase of the brake operating force F is comparatively high, and the rate of increase of the ideal master cylinder pressure value $P_{MCI}$ is accordingly high, so that the operational delay of the booster 20 tends to be large, resulting in a relatively large difference between the actual and ideal values $P_{MCAC}$ and $P_{MCI}$, and a consequent increase in the master cylinder pressure difference. The predetermined threshold value $P_{TH}$ of the master cylinder pressure difference is determined such that the difference is larger than the threshold value $P_{TH}$ upon an abrupt operation of the brake pedal 18 for an abrupt brake application to the vehicle, but is smaller than a threshold value which is determined for detecting a defect or abnormality of the booster 20. The defect of the booster 20 is interpreted to mean that the booster 20 is not at all capable of boosting the input force received from the brake pedal 18. For instance, the booster 20 is defective where the negative pressure cannot be applied from the negative pressure source to the low-pressure chamber 34, due to a defect of the conduit connecting the negative pressure source and the low-pressure source 34. Where the booster 20 is defective and is not capable of boosting the input force, the master cylinder pressure difference ($P_{MCI}$-$P_{MCAC}$) is larger than when the requirement for an abrupt brake application is detected while the booster 20 is normal. Thus, the difference exceeds the threshold $P_{TH}$ also when the booster 20 is defective.

Figure 8:
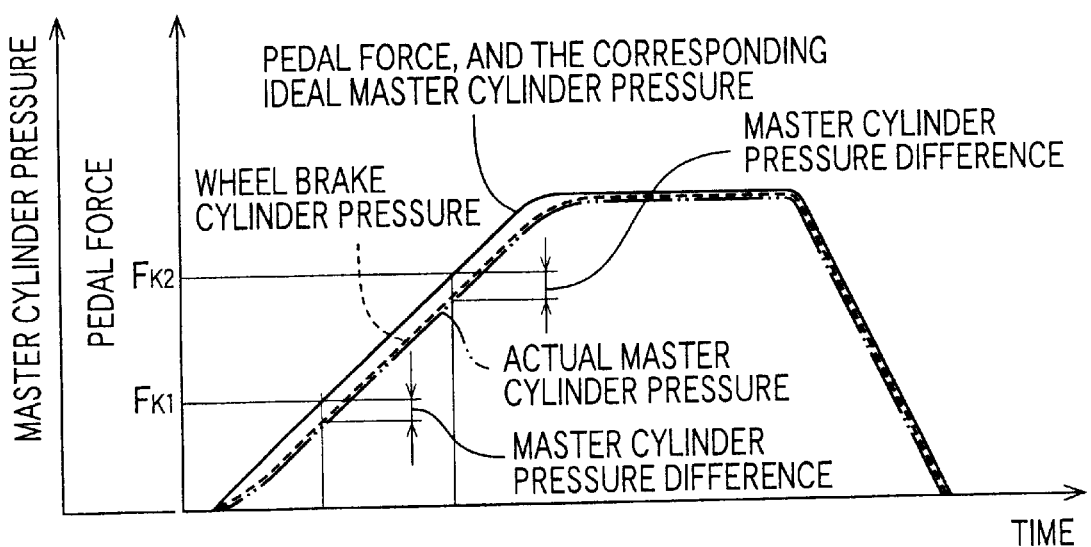
FIG. 8 is a graph indicating relationships among an actual master cylinder pressure, an ideal master cylinder pressure, a wheel brake cylinder pressure, and an operating force of a brake pedal force, when the assisting pressure control is not effected.

When the amount of operational delay of the booster 20 is small, that is, where the increase of the actual master cylinder pressure $P_{MCAC}$ is slightly delayed with respect to the ideal master cylinder pressure $P_{MCI}$, as indicated in the graph of FIG. 8, with the master cylinder pressure difference ($P_{MCI}$-$P_{MCAC}$) being smaller than the threshold $P_{TH}$, the determination that an abrupt brake application is required is not made, and a negative decision (NO) is obtained in step S9. In this case, one cycle of execution of the routine is terminated. In the graphs of FIG. 8, the brake operating force F and the master cylinder pressure $P_{MC}$ are taken along two respective vertical axes, which are calibrated such that the corresponding values of the brake operating force F and the master cylinder pressure $P_{MC}$ are represented by the same coordinate value along the vertical axes. That is, the graphs representing both the brake operating force F and the master cylinder pressure $P_{MC}$. This is true for other graphs which will be referred to. In the next cycle of execution of the routine of FIG. 5, the control flow goes to step S12, since the flag F3 is now set at "1" (was set to "1" in step S8), namely, since an affirmative decision (YES) is obtained in step S6. Step S12 is provided to determine whether the brake operating force F has exceeded the predetermined second value $F_{K2}$. When step S12 is implemented for the first time, a negative decision (NO) is obtained in this step S12, and one cycle of execution of the routine is terminated.

When the brake operating force F has exceeded the predetermined second value $F_{K2}$, an affirmative decision (YES) is obtained in step S12, and the control flow goes to step S13 to set the flag F4 to "1", and then to step S9 to determine whether an abrupt brake application is required. In this case, the ideal master cylinder pressure $P_{MCI}$ corresponds to the brake operating force $F_{K2}$, and is determined according to the stored predetermined ideal relationship between the values $F_{K2}$ and $P_{MCI}$. The actual master cylinder pressure $P_{MCAC}$ is detected by the pressure sensor 176. When an abrupt brake application is not required, and the master cylinder pressure difference is smaller than the threshold $P_{TH}$, a negative decision (NO) is obtained in step S9, and one cycle of execution of the routine is terminated. In the next cycle of execution of the routine, an affirmative decision (YES) is obtained in step S5 since the flag F4 is now set at "1" (was set to "1" in step S13), and one cycle of execution of the routine is again terminated. Thus, the step S9 to determine whether an abrupt brake application is required is not implemented once this step S9 has been implemented while the brake operating force F is larger than the second value $F_{K2}$. Thereafter, steps S1 and S3–S5 are repeatedly implemented until a negative decision (NO) is obtained in step S1 upon releasing of the brake pedal 18.

There will be described an operation of the braking system where an abrupt brake application to the vehicle is detected while the brake operating force F is larger than the predetermined first value $F_{K1}$ but is not larger than the predetermined second value $F_{K2}$.

Figure 7:
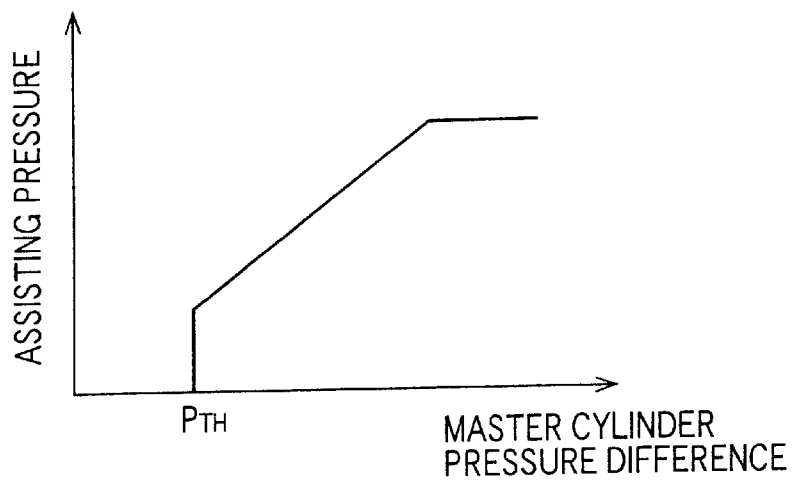
FIG. 7 is a graph indicating a relationship between a master cylinder pressure difference and an assisting pressure, which is used for an assisting pressure control according to the assisting control routine of FIG. 5.

In this case, the affirmative decision (YES) is obtained in step S9 after the affirmative decision (YES) is obtained in step S8 with the brake operating force F exceeding the predetermined first value $F_{K1}$. That is, the master cylinder pressure difference ($P_{MCI}$-$P_{MCAC}$) is equal to or larger than the threshold value $P_{TH}$, due to an excessive operational delay of the booster 20, and it is determined that an abrupt brake application is required. As a result, the control flow goes to step S10 to determine an appropriate assisting pressure to be added to the fluid pressure in the wheel brake cylinders 24 by the brake-cylinder pressure control device 140. Each time step S10 is implemented, the value of this assisting pressure to be added is determined or gradually increased so that the actual wheel brake cylinder pressure which is eventually established after the assisting pressure is continuously added is higher than the ideal value corresponding to the brake operating force F at which the brake pedal 18 is eventually kept stationary. Upon specific implementation of step S10, the value of the assisting pressure may be determined to be larger or smaller than the presently obtained master cylinder pressure difference ($P_{MCI}$-$P_{MCAC}$). The assisting pressure is determined on the basis of the master cylinder pressure difference and according to a predetermined relationship between the assisting pressure and the difference. In the present embodiment, the relationship is determined to increase the assisting pressure with an increase of the master cylinder pressure difference, as indicated in the graph of FIG. 7. This relationship is represented by a data table or map or an equation which is stored in the ROM 166 of the computer 162. The determined assisting pressure is stored in the assisting pressure-memory 188 of the RAM 168. As indicated in FIG. 7, the relationship is determined such that the assisting pressure is held at the maximum value while the master cylinder pressure difference is larger than a predetermined upper limit. Thus, the application of an excessively high assisting pressure is prevented. However, the relationship of FIG. 7 may be modified such that the assisting pressure increases with an increase of the master cylinder pressure difference, without limiting the assisting pressure to the maximum value.

Step S10 is followed by step S11 to set the flag F2 to "1", and then to step S14 to determine whether a flag F5 is set at "1". The flag F5 set at "1" indicates that the brake operating force F has reached the maximal value. If a negative decision (NO) is obtained in step S14, the control flow goes to step S15 to determine whether the input force of the booster 20 is kept constant or increasing. This determination is based on the operating force F of the brake pedal 18 detected by the pedal force sensor 174, more precisely, on the brake operating force F(n) detected in the present control cycle and the brake operating force F(n−1) detected in the last control cycle. In step S15, the brake operating force F detected by the pedal force sensor 174 in the present control cycle is stored as the present value F(n) in a present-pedal-force memory 190 of the RAM 168, and the force value which has been stored in the present-pedal-force memory 190 is stored as the last value F(n−1) in a last-pedal-force memory 192 of the RAM 168. Step 15 is further formulated to determine whether the present value F(n) is equal to or larger than the last value F(n−1). If an affirmative decision (YES) is obtained in step S15, the control flow goes to step S16 in which the application of the assisting pressure is controlled.

In the assisting control in step S16, the assisting pressure determined in step S10 is added to the actual master cylinder pressure $P_{MCAC}$. To this end, the amount of electric current to be applied to the solenoid coil 134 of the pressure control valve 120 is determined so that the fluid pressure in the wheel brake cylinders 24 is higher than the actual master cylinder pressure $P_{MCAC}$ by the determined assisting pressure. The solenoid coil 134 is energized with the determined amount of electric current through the driver circuit 184. At the same time, the pump motor 107 is turned on to start the pump 106 to deliver the pressurized fluid to the main fluid passage 80. The pressure of the pressurized fluid in the main fluid passage 80 is controlled by the pressure control valve 120, to the level determined by the amount of electric current applied to the solenoid coil 134. As a result, the wheel brake cylinder pressure is controlled to the level which is higher than the actual master cylinder pressure $P_{MCAC}$ by the assisting pressure, so that the abrupt brake is applied to the vehicle. Since the assisting pressure is increased as the master cylinder pressure difference is increased, the vehicle can be braked with the braking force which is increased at a rate corresponding to the rate of increase of the brake operating force F operated by the vehicle operator for applying an abrupt brake to the vehicle. The inflow control valve 150 is opened to supply the fluid from the master cylinder 22 to the pump 106, if necessary, for instance, where the abrupt brake application is effected while the anti-lock braking pressure control is not effected or while a sufficient amount of the fluid is not stored in the reservoir 98. In this respect, it is noted that the amount of the fluid stored in the reservoir 98 can be estimated on the basis of the cumulative time for which the pressure-reducing valve or valves 100 was/were open, and/or the cumulative operating time of the pump 106. The inflow control valve 150 may be necessarily opened when the assisting control is effected in step S16.

Figure 9:
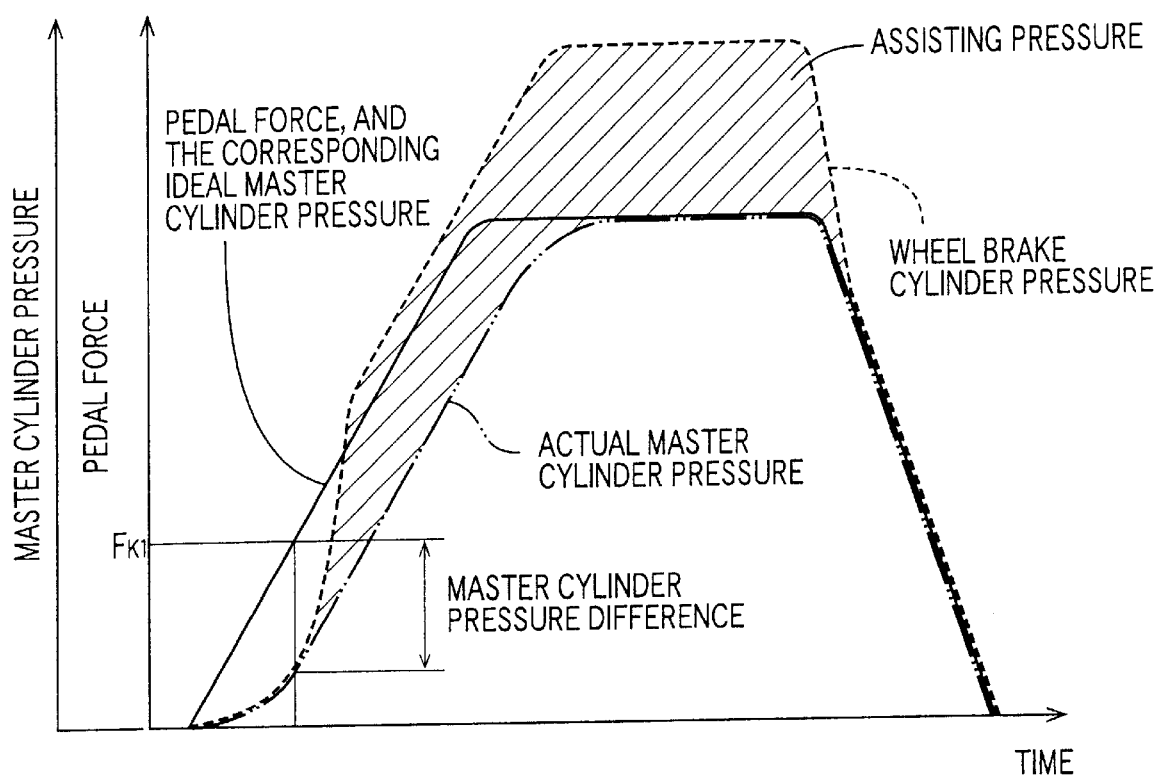
FIG. 9 is a graph for explaining one form of the assisting pressure control according to the assisting control routine.

Thus, the present braking system is arranged such that the wheel brake cylinder pressure is controlled to a level which is higher than the actual master cylinder pressure $P_{MCAC}$ by an amount corresponding to the assisting pressure (master cylinder pressure difference), as indicated by hatched lines in FIG. 9, when the operational delay of the booster 20 has become larger than the predetermined threshold after the brake operating force F has exceeded the predetermined first value $F_{K1}$, so that an abrupt brake can be applied to the vehicle as desired by the vehicle operator. In the graph of FIG. 9, a jumping characteristic of the booster 20 is ignored, for easy understanding of the relationship between the actual and ideal master cylinder pressures. This is true for the other graphs.

In the next cycle of execution of the routine of FIG. 8, an affirmative decision (YES) is obtained in step S4, since the flag F2 was set to "1" in step S11. Accordingly, the control flow goes to step S14 while skipping steps S5–S13. Thus, steps S1, S3, S4 and S14–S16 are repeated implemented as long as the input force of the booster 20 is increasing or is held constant.

When the input force of the booster 20 begins to decrease, that is, when the operating amount of the brake pedal 18 begins to decrease, the present brake operating force F(n) becomes smaller than the last brake operating force F(n–1), and a negative decision (NO) is obtained in step S15, and the control flow goes to step S17 in which the last brake operating force F(n–1) is stored as a maximal value in a maximal-value memory 294 of the RAM 168. The maximal value of the brake operating force F, which is indicated as $F_{MAX}$ in FIG. 5, is used as the maximal value of the input force of the booster 20. In step S17, the flag F5 is set to "1". Step S17 is followed by step S18 to determine whether a flat F6 is set at "1". The flag F6 set at "1" indicates that the assisting pressure is required to be increased. At this time, however, this flag F6 has not been set to "1", that is, a negative decision (NO) is obtained in step S18, and the control flow goes to step S19 determine whether a flag F7 is set at "1". This flag F7 set at "1" indicates that the assisting pressure is not to be increased. At this time, the flag F7 has not been set to "1", and a negative decision (NO) is obtained in step S19, and the control flow goes to step S20 to determine whether a predetermined time has passed after the input force of the booster 20 has reached the maximal value. When step S20 is implemented for the first time, a negative decision (NO) is obtained in step S20, and the control flow goes to step S16 again.

Figure 12:
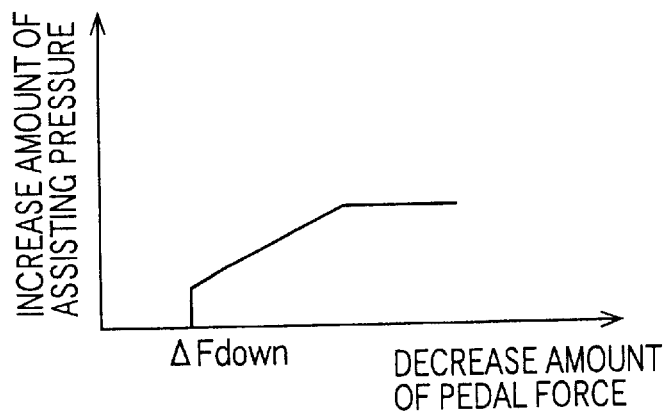
FIG. 12 is a graph indicating a relationship between an amount of increase of an assisting pressure and an amount of decrease of the brake pedal force, in the assisting control routine.

In the next cycle of execution of the routine, an affirmative decision (YES) is obtained in step S14 since the flag F5 was set to "1" in step S16, and the control flow goes to step S18 while skipping steps S15 and S17. Steps S1, S3, S4, S14, S18–S20 and S16 are repeatedly implemented after the brake operating force F has increased to the maximal value $F_{MAX}$ and until the predetermined time has passed thereafter. When the predetermined has passed, an affirmative decision (YES) is obtained in step S20, and the control flow goes to step S21 to determine whether an amount of decrease of the input force of the booster 20, that is, an amount of decrease $F_{DOWN}$ of the brake operating force F is larger than a predetermined threshold value $\Delta F_{DOWN}$. The amount of decrease $F_{DOWN}$ can be obtained by subtracting the brake operating force F detected by the pedal force sensor 174 in step S21 from the maximal value. If an affirmative decision (YES) is obtained in step S21, the control flow goes to step S22 in which the amount of increase of the assisting pressure is determined, and the determined amount of increase of the assisting pressure is stored in an assisting-pressure-increase-amount memory 198 of the RAM 168. This amount of increase is determined such that the amount of increase increases with an increase in the amount of decrease $F_{DOWN}$ of the brake operating force F, as indicated in the graph of FIG. 12. Further, the input force of the booster 20 or the brake operating force F when the amount of increase of the assisting pressure is determined is stored in a critical-pedal-force memory 196 of the RAM 168, and the flag F6 is set to "1". Step S22 is followed by step S23 in which the assisting pressure determined in step S10 is increased by the determined amount, and the increased assisting pressure is added to the actual master cylinder pressure $P_{MCAC}$ for further increasing the wheel brake cylinder pressure. Namely, the amount of electric current to be applied to the solenoid coil 134 of the pressure control valve 120 is increased by an amount corresponding to the amount of increase of the assisting pressure.

Figure 10:
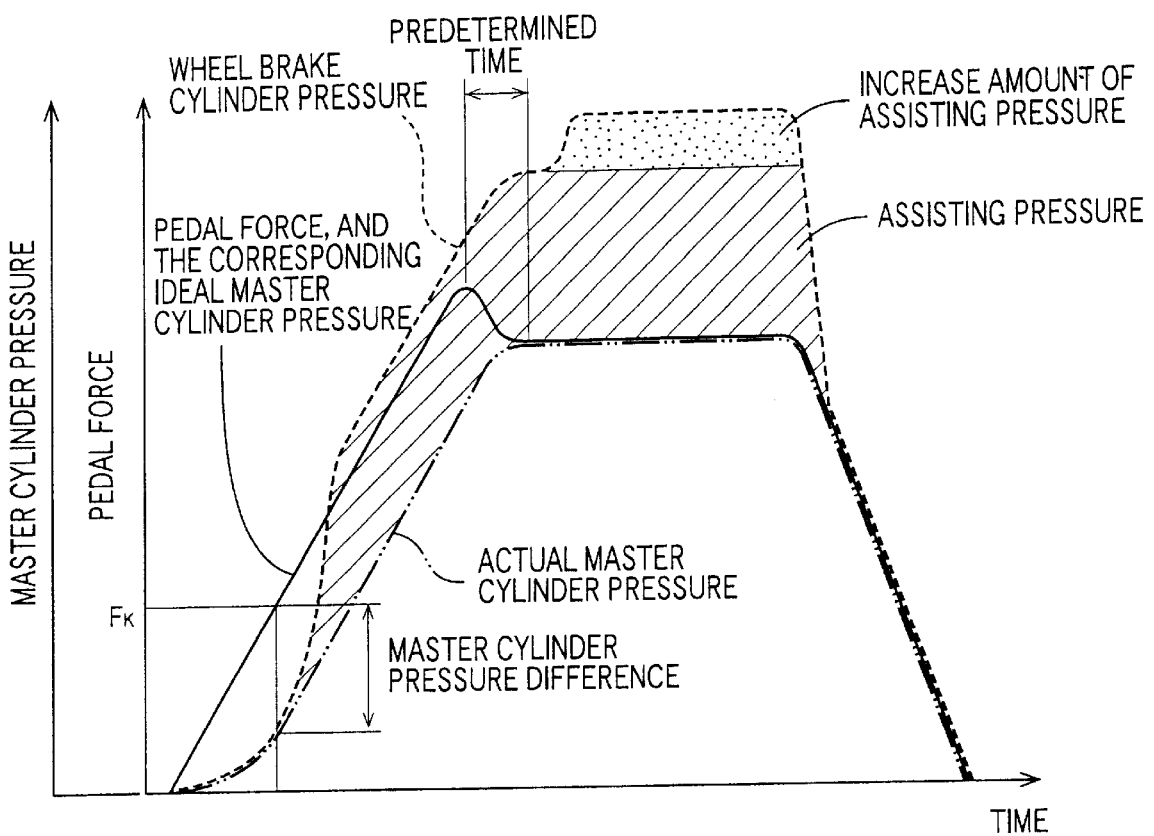
FIG. 10 is a graph for explaining another form of the assisting pressure control according to the assisting control routine.

According to the above arrangement, the amount of reduction of the braking force generated by the wheel brake cylinders 24 can be reduced to assure stable braking of the vehicle when the brake operating force F is reduced contrary to the vehicle operator's intention, for instance, when the brake pedal 18 which has once been depressed by the operator with a relatively large initial amount of the brake operating force F is returned by a reaction force to a position corresponding to a reduced amount of the brake operating force F, since the relatively large initial amount cannot be maintained by the vehicle operator. The graph of FIG. 10 shows an example in which the assisting pressure is increased when the operating force F of the brake pedal 18 is reduced, and the ideal master cylinder $P_{MCI}$ is accordingly reduced. In this case, the actual master cylinder pressure $P_{MCAC}$ is increased to the reduced ideal master cylinder pressure PMCI, and the assisting pressure to be added is then increased to prevent a reduction of the wheel brake cylinder pressure. If the assisting pressure were not increased, the wheel brake cylinder pressure is kept at the level which is higher than the actual master cylinder pressure $P_{MCAC}$ (equal to the reduced ideal value $P_{MCI}$) by only the non-increased assisting pressure. This level of the wheel brake cylinder pressure is lower than the level before the brake operating force F is reduced. In the present embodiment, however, the assisting pressure is increased as indicated by dotted area in FIG. 10, to maintain the wheel brake cylinder pressure at a level which is close to the level before reduction of the brake operating force F, that is, close to the level as if the brake pedal 18 were maintained at the initially operated position with the relatively large initial operating force F. The predetermined time used in step S20 and the predetermined threshold $\Delta F_{DOWN}$ used in step S21 are determined so as to make it possible to detect a decrease of the brake operating force F contrary to the vehicle operator's intention.

In the next cycle of execution of the routine, an affirmative decision (YES) is obtained in step S18, since the flag F6 was set to "1" in step S22 in which the amount of increase of the assisting pressure was determined. Accordingly, the control flow goes to step S24 to determine whether the brake operating force F is held constant. This determination is made for determining whether the decrease of the brake operating force F is a result of a releasing action of the brake pedal 18 toward the non-operated position, which was intended by the vehicle operator, or occurred contrary to the vehicle operator's intention. If the decrease of the brake operating force F occurred contrary to the operator's intention, the brake pedal 18 is subsequently held at a given position corresponding to the reduced brake operating force F given by the operator's foot, so that the brake operating force F is maintained at the reduced value. If the decrease of the brake operating force F was intended by the operator, the brake pedal 18 is further released toward the non-operated position, and the brake operating force F is not held constant, namely, is further decreased.

The determination in step S24 is effected by determining whether the brake operating force F represented by the output signal of the pedal force sensor 174 falls within a range determined by the braking operating force F detected when the amount of increase of the assisting pressure was determined in step S22, that is, whether the presently detected brake operating force F is substantially equal to the value stored in the critical-pedal-force memory 196. If the present brake operating force F is within the predetermined range, an affirmative decision (YES) is obtained in step S24, and the control flow goes to step S23 for continuously increasing the assisting pressure, since it was found that the brake operating force F was decreased contrary to the operator's intention.

If the presently detected brake operating force F is not held within the predetermined range, a negative decision (NO) is obtained in step S24, and the control flow goes to step S25 to set the flag F1, and then to step S26 to terminating the assisting control, since it was found that the brake operating force F was decreased as a result of the operator's intended releasing operation of the brake pedal 18. The operator's intended releasing operation of the brake pedal 18 means that the operator is no more willing to continue the abrupt brake application to the vehicle. Accordingly, the application of the assisting pressure is terminated when the brake pedal 18 is released by the operator. As a result, the actual master cylinder pressure $P_{MCAC}$, the ideal master cylinder pressure $P_{MCI}$ and the brake operating force F are reduced, and the wheel brake cylinder pressure is reduced by removal of the assisting pressure. In other words, the application of the assisting pressure is continued until the operator's intended releasing operation of the brake pedal 18 is detected in step S24. When the brake pedal 18 is in a releasing action, the actual master cylinder pressure $P_{MCAC}$ and the wheel brake cylinder pressure are reduced along a line along which the ideal master cylinder pressure is reduced. The actual master cylinder pressure $P_{MCAC}$ and the wheel brake cylinder pressure may be reduced in timed relationship with the reduction of the ideal master cylinder pressure $P_{MCI}$ such that the actual master cylinder pressure $P_{MCAC}$ and wheel brake cylinder pressure are higher than the ideal master cylinder pressure $P_{MCI}$.

Where the brake pedal 18 is maintained at a given position corresponding to the operating force F acting thereon, the amount of decrease $F_{DOWN}$ of the brake operating force F does not exceed the predetermined threshold $\Delta F_{DOWN}$ within the predetermined time, so that a negative decision (NO) is obtained in sep S21. In this case, the assisting pressure is not required to be increased, so that the control flow goes to step S28 to set the flag F7 to "1", and then to step S16 in which the assisting pressure is continuously added to the actual master cylinder pressure $P_{MCAC}$ (wheel brake cylinder pressure), without an increase of the assisting pressure. In this case, the wheel brake cylinder pressure is held at a level which is higher than the master cylinder pressure $P_{MCAC}$ by the assisting pressure, as indicated in FIG. 9. In the next cycle of execution of the routine, an affirmative decision (YES) is obtained in step S19 since the flag F7 was set to "1" in step S28, and the control flow goes to step S27 to determine whether the brake pedal 18 is in a releasing action toward the non-operated position. This determination is made in a manner similar to that in step S24. If the brake operating force F is held within the predetermined range, a negative decision (NO) is obtained in step S27, and the control flow goes to step S16. If the brake pedal 18 is being released, an affirmative decision (YES) is obtained in step S27, and the control flow goes to steps S25 and S26 to terminate the assisting control, so that the actual master cylinder pressure $P_{MCAC}$ and the wheel brake cylinder pressure are reduced along the line along which the ideal master cylinder pressure $P_{MCI}$ is reduced.

As described, when the brake pedal 18 is in a releasing action, the flag F1 is set to "1", irrespective of whether the assisting pressure is increased or not, so that steps S1 and S3 are repeatedly implemented to reduce the wheel brake cylinder pressure, without the application of an assisting pressure, until the brake pedal has been fully released. When the brake pedal 18 has been returned to the non-operated position, the negative decision (NO) is obtained step S1, and the control flow goes to step S2.

There will next be described an operation of the braking system where the requirement for an abrupt brake application to the vehicle is detected (where the affirmative decision "YES" is obtained in step S12) as a result of an increase of the brake operating force F beyond the predetermined second value $F_{K2}$ (due to an abrupt operation of the brake pedal 18) after the determination that the brake operating force F is larger than the predetermined first value $F_{K1}$ (after the affirmative decision "YES" was obtained in step S7) and after the first determination that an abrupt brake application is not required (after the negative decision "NO" was obtained in step S9).

In the present case, the flag F2 was not set to "1" in step S11 since the requirement for an abrupt brake application was not detected while the brake operating force F exceeded the predetermined first value $F_{K1}$, but the flag F3 was set to "1" in step S8 when the brake operating force F exceeded the predetermined first value $F_{K1}$. Accordingly, the affirmative decision (YES) is obtained in step S1, and the negative decision (NO) is obtained in steps S3, S4 and S5, so that the control flow goes to step S12. When the brake operating force F has exceeded the predetermined second value $F_{K2}$, the affirmative decision (YES) is obtained in step S12, and the control flow goes to step S13 to set the flag F4 to "1", and then to step S9 determine whether an abrupt brake application to the vehicle is required. If the requirement of an abrupt brake application is detected, an affirmative decision (YES) is obtained in step S9, and the control flow goes to step S9 and the subsequent steps, for applying an assisting pressure to the actual master cylinder pressure $P_{MCAC}$ for increasing the wheel brake cylinder pressure, in the same manner as described above with respect to the assisting control upon detection of an abrupt brake application while the brake operating force F is larger than the first value $F_{K1}$.

Figure 11:
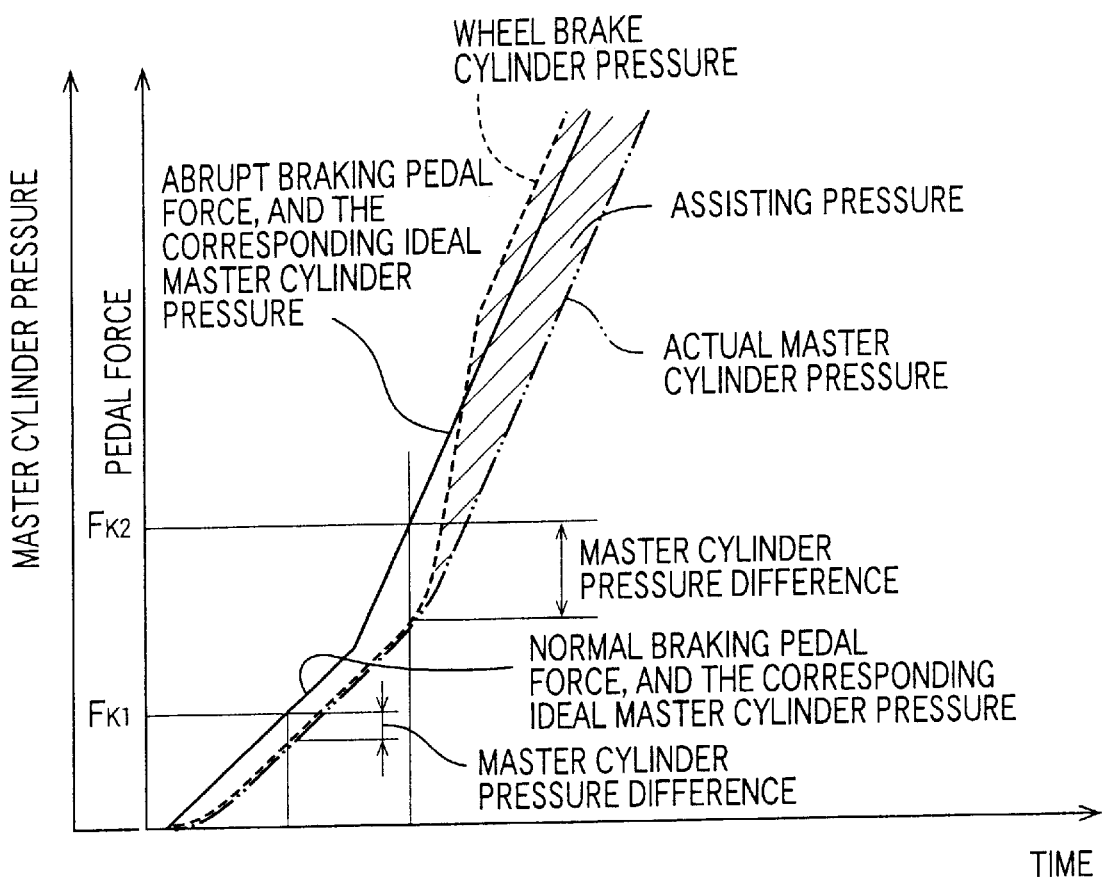
FIG. 11 is a graph for explaining a further form of the assisting pressure control.

As shown in FIG. 11, a normal brake is applied to the vehicle immediately after the brake pedal 18 is operated at a normal speed, namely, while an abrupt brake application is not required. In this condition wherein the brake operating force F and the ideal master cylinder pressure $P_{MCI}$ are increased at a relatively low rate, an increase of the actual master cylinder pressure $P_{MCAC}$ and an increase of the wheel brake cylinder pressure are slightly delayed with an increase in the ideal master cylinder pressure PMCI, but the actual master cylinder pressure $P_{MCAC}$ and the wheel brake cylinder pressure are increased while maintaining a relatively small difference between the actual and ideal values $P_{MCAC}$ and $P_{MCI}$ of the master cylinder pressure. When the brake pedal 18 is operated abruptly to apply an abrupt brake application to the vehicle after the first determination in step S9 as to whether an abrupt brake application is required, the brake operating force F and the ideal master cylinder pressure $P_{MCAC}$ are increased at a relatively high rate, and the master cylinder pressure difference $(P_{MCI}-P_{MCAC})$ is increased due to an increased operational delay of the booster 20. When the master cylinder pressure difference eventually exceeds the predetermined threshold $P_{TH}$, the affirmative decision (YES) is obtained in step S9, and the control flow goes to step S10 to initiate the application of an assisting pressure.

Since the predetermined threshold $P_{TH}$ is determined to be smaller than a master cylinder pressure difference which is expected to arise when the booster 20 becomes defective, as described above, the master cylinder pressure difference will exceed the threshold $P_{TH}$ when the booster 20 becomes defective. Therefore, when the booster 20 becomes defective, the assisting control is effected by the brake-cylinder pressure control device 140, to increase the wheel brake cylinder pressure by an assisting pressure determined based on the master cylinder pressure difference, in the same manner described above with respect to the abrupt brake application, so that the vehicle can be braked with a sufficient braking force even when the booster 20 is defective.

It will be understood from the foregoing description of the present embodiment of the invention that the brake-cylinder pressure control device 140 functions as an assisting-pressure applying device. It will further be understood that a portion of the ECU 160 assigned to implement steps S7, S9, S12 constitutes an output-delay detecting portion, which is considered to include a device for detecting an operational delay of the booster 20 at a predetermined point of time after the moment of initiation of a boosting operation of the booster 20, a device for detecting the operational delay when the input force of the booster 20 has increased to a predetermined value, and a device for detecting the operational delay on the basis of the output of the booster 20 in the form of the master cylinder pressure. It will also be understood that a portion of the ECU assigned to implement to step S16 constitutes an assisting-force applying portion for applying an assisting force corresponding to the master cylinder pressure difference, and that a portion of the ECU 160 assigned to implement step S16 for activating the brake-cylinder pressure control device 140 to operate the pump 106 and energize the solenoid coil 134 of the pressure control valve 120 when the affirmative decision is obtained in step S8 constitutes an activating device for activating the brake-cylinder pressure control device 140. It will further be understood that the assisting-pressure applying device, the output-delay detecting portion, the assisting-force applying device and the activating device, which have been described above, cooperate to constitute a brake-operating-force increasing device in the form of an abrupt braking control device.

In the braking system according to the first embodiment described above, a determination as to whether an abrupt brake application is required is effected at two opportunities during an operation of the brake pedal 18, that is, when the braking force F has exceeded the predetermined first value $F_{K1}$, and when the brake operating force F has exceeded the predetermined second value $F_{K2}$. However, the determination may be effected only once. Further, the assisting pressure may be determined on the basis of the negative pressure of the booster 20, more precisely, the negative pressure in the low-pressure chamber 34. An example of a braking system incorporating those modifications will be described by reference to FIGS. 13 and 14. The braking system according to this second embodiment is identical with the first embodiment except for the assisting control routine. In view of this, only the assisting control routine of the second embodiment will be described, and the description and illustration of the other aspects are dispensed with.

Figure 13:
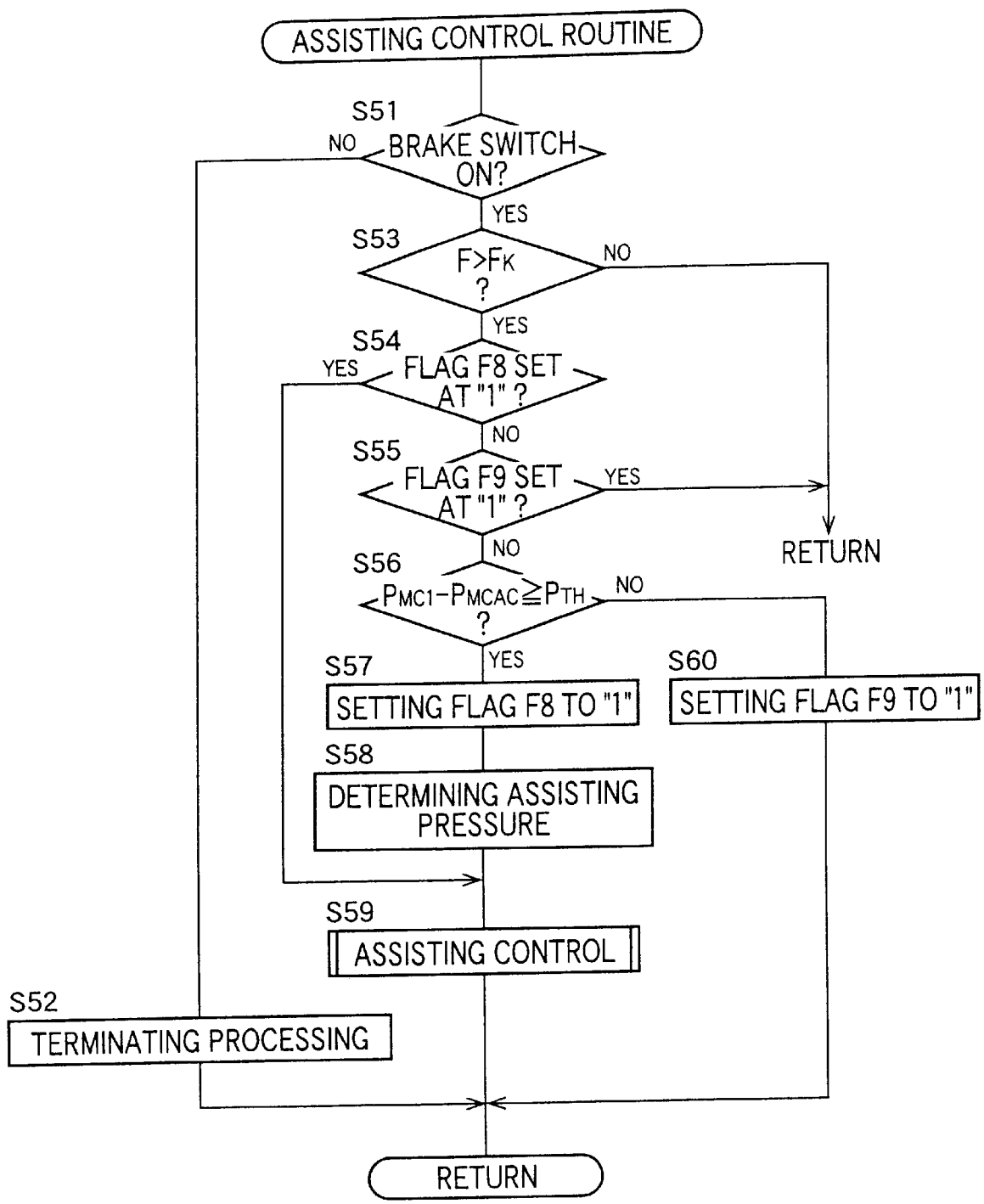
FIG. 13 is a flow chart illustrating an assisting control routine according to a control program stored in the ROM of a computer of an electronic control device of a braking system according to another embodiment of this invention.

The assisting control illustrated in the flow chart of FIG. 13 is initiated with step S51 to determine whether the brake switch 172 is in the ON state. When the brake switch 172 is in the OFF state with the brake pedal 18 placed at its non-operated position, a negative decision (NO) is obtained in step S51, and the control flow goes to step S52 to effect the process for terminating the routine, as in step S2 of the assisting control routine of FIG. 5 according to the first embodiment. When the brake switch 172 is turned on upon an operation of the brake pedal 18, an affirmative decision (YES) is obtained in step S51, and the control flow goes to step S53 to determine whether the brake operating force F is larger than a predetermined value $F_K$, which is suitably determined, for instance, equal to the first value $F_{K1}$ or the second value $F_{K2}$, or equal to a value intermediate between these values $F_{K1}$, $F_{K2}$. If a negative decision (NO) is obtained in step S53, one cycle of execution of the routine is terminated.

If the brake operating force F is larger than the predetermined value $F_K$, an affirmative decision (YES) is obtained in step S53, and the control flow goes to step S54 to determine whether a flag F8 is set at "1". This flag F8 is provided in the RAM 168. The flag F8 set at "1" indicates that an assisting control is required to be effected in response to a detected requirement for an abrupt brake application to the vehicle. When step S54 is implemented for the first time, a negative decision (NO) is obtained, and the control flow goes to step S55 to determine whether a flag F9 is set at "1". The flag F9 set at "1" indicates that an abrupt brake application is not required and that the assisting control is not to be effected.

If a negative decision (NO) is obtained in step S55, the control flow goes to step S56 to determine whether an abrupt brake application to the vehicle is presently required. The determination this step S55 is similar to that in step S9, namely, is effected by determining whether the difference between the ideal and actual values $P_{MCI}$ and $P_{MCAC}$ of the master cylinder pressure is larger than the predetermined threshold $P_{TH}$. If the brake pedal 18 is operated at a high speed for applying an abrupt brake to the vehicle, the master cylinder pressure difference is larger than the threshold $P_{TH}$, and an affirmative decision (YES) is obtained in step S56, so that the control flow goes to step S57 to set the flag F8 to "1".

Figure 14:
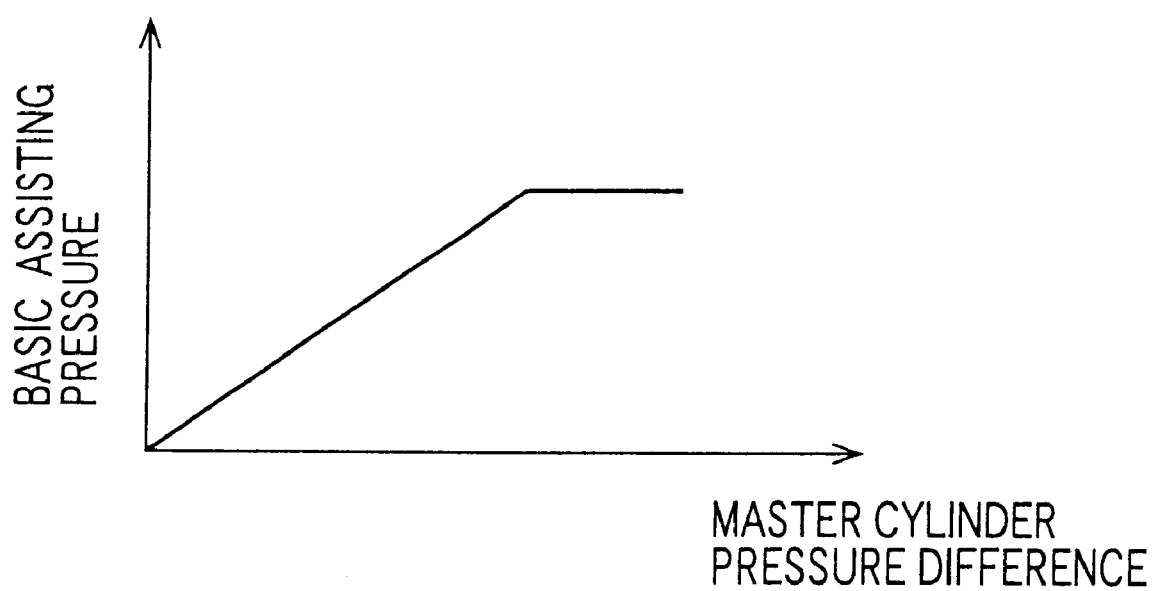
FIG. 14 is a graph indicating a relationship between a basic assisting pressure and a master cylinder pressure difference, which is used to determine the assisting pressure according to the assisting control routine illustrated in FIG. 13.

Step S57 is followed by step S58 to determine an assisting pressure and store the determined assisting pressure in the assisting-pressure memory 188. The assisting pressure is determined on the basis of the master cylinder pressure difference at the time of detection of an operational delay of the booster 20 larger than the predetermined upper limit, and on the basis of the negative pressure of the booster 20, namely, the negative pressure in the low-pressure chamber 34 as detected by the booster negative pressure sensor 180. The assisting pressure is determined such that the assisting pressure increases with an increase in the master cylinder pressure difference and with an increase in the pressure in the low-pressure chamber 34 toward the atmospheric level (with a decrease in the degree of vacuum in the low-pressure chamber 34, or with a decrease in the difference of the negative pressure in the chamber 34 from the atmospheric pressure). For instance, a basic assisting pressure is determined on the basis of the master cylinder pressure difference, and the assisting pressure is obtained by multiplying the basic assisting pressure by a coefficient determined by the negative pressure of the booster 20. As shown in FIG. 14, the basic assisting pressure increases with an increase in the master cylinder pressure difference, while the master cylinder pressure difference is smaller than a predetermined upper limit. While the basic assisting pressure is limited to a maximum value while the master cylinder pressure difference is larger than the upper limit, according to the relationship indicated in FIG. 14, the basic assisting pressure may be determined to increase linearly without a limitation even when the difference is considerably large. Further, the relationship of FIG. 14 used to determine the basic assisting pressure may be modified to a relationship similar to the relationship of FIG. 7 between the assisting pressure and the master cylinder pressure difference so that the basic assisting pressure is determined for the master cylinder pressure difference not smaller than the predetermined threshold $P_{TH}$. The coefficient indicated above is determined to be "1" when the pressure in the low-pressure chamber 34 is at the expected lowest level (when the difference of the booster negative pressure with respect to the atmospheric pressure is maximum), and increases with an increase in the pressure in the low-pressure chamber 34 toward the atmospheric level. The basic assisting pressure and the coefficient are determined on the basis of the master cylinder pressure and the booster negative pressure and according to predetermined relationships (e.g., the relationship of FIG. 14), which are represented by respective equations or data tables stored in the ROM 166. The assisting pressure is determined on the basis of the thus determined basic value and coefficient. The determined assisting pressure is stored in the assisting-pressure memory 188 of the RAM 168, as in the first embodiment.

Step S58 is followed by step S59 in which the brake-cylinder pressure control device 140 is activated to effect the assisting control for applying the assisting pressure determined in step S58, for increasing the wheel brake cylinder pressure to a level which is higher than the actual master cylinder pressure $P_{MCAC}$ by the assisting pressure.

In the next cycle of execution of the routine of FIG. 13, an affirmative decision (YES) is obtained in step S54 since the flag F8 was set to "1" in step S57. Accordingly, the control flow goes to step S59 while skipping steps S55–S58, so that the assisting control is continued. The assisting control is continued until the brake pedal 18 has been fully released. The assisting control is terminated when the releasing of the brake pedal 18 is detected.

Where an abrupt brake application is not required, and the master cylinder pressure difference is smaller than the threshold PTH, a negative decision (NO) is obtained in step S56, and the control flow goes to step S60 to set the flag F9 to "1". In the next cycle of execution of the routine, an affirmative decision (YES) is obtained in step S56 since the flag F9 was set in step S60, and one cycle of execution of the routine is terminated without implementing steps S55–S60. Namely, the assisting control is not effected. Thus, the determination as to whether an abrupt brake application is required is effected only once when the brake operating force F has exceeded the predetermined value $F_K$. If the negative decision is obtained in this single determination, the assisting control is not effected.

It will be understood from the above description of the second embodiment that a portion of the ECU 160 assigned to implement step S58 constitutes an assisting-force applying portion for applying an assisting force corresponding to the negative pressure in the booster 20.

It is noted that the assisting pressure may be directly determined on the basis of the master cylinder pressure difference and the negative pressure of the booster 20 and according to a predetermined relationship among these three parameters, which relationship is represented by a data table or map or an equation, which is stored in the ROM 166 of the computer 162.

In the first and second embodiments described above, the threshold value $P_{TH}$ used for determining whether an abrupt brake application is required or not is a fixed value irrespective of the booster negative pressure, namely, the negative pressure in the low-pressure chamber 34 of the booster 20. However, the threshold value $P_{TH}$ may be changed depending upon the booster negative pressure. Further, there is not an upper limit of the wheel brake cylinder pressure as increased by application of an assisting pressure, in the first and second embodiments. However, an upper limit may be provided for the wheel brake cylinder pressure. An example of a braking system incorporating those modifications will be described by reference to FIGS. 15 and 16. The braking system according to this third embodiment is identical with the preceding embodiments except for the assisting control routine, and the description and illustration of the other aspects are dispensed with.

Figure 15:
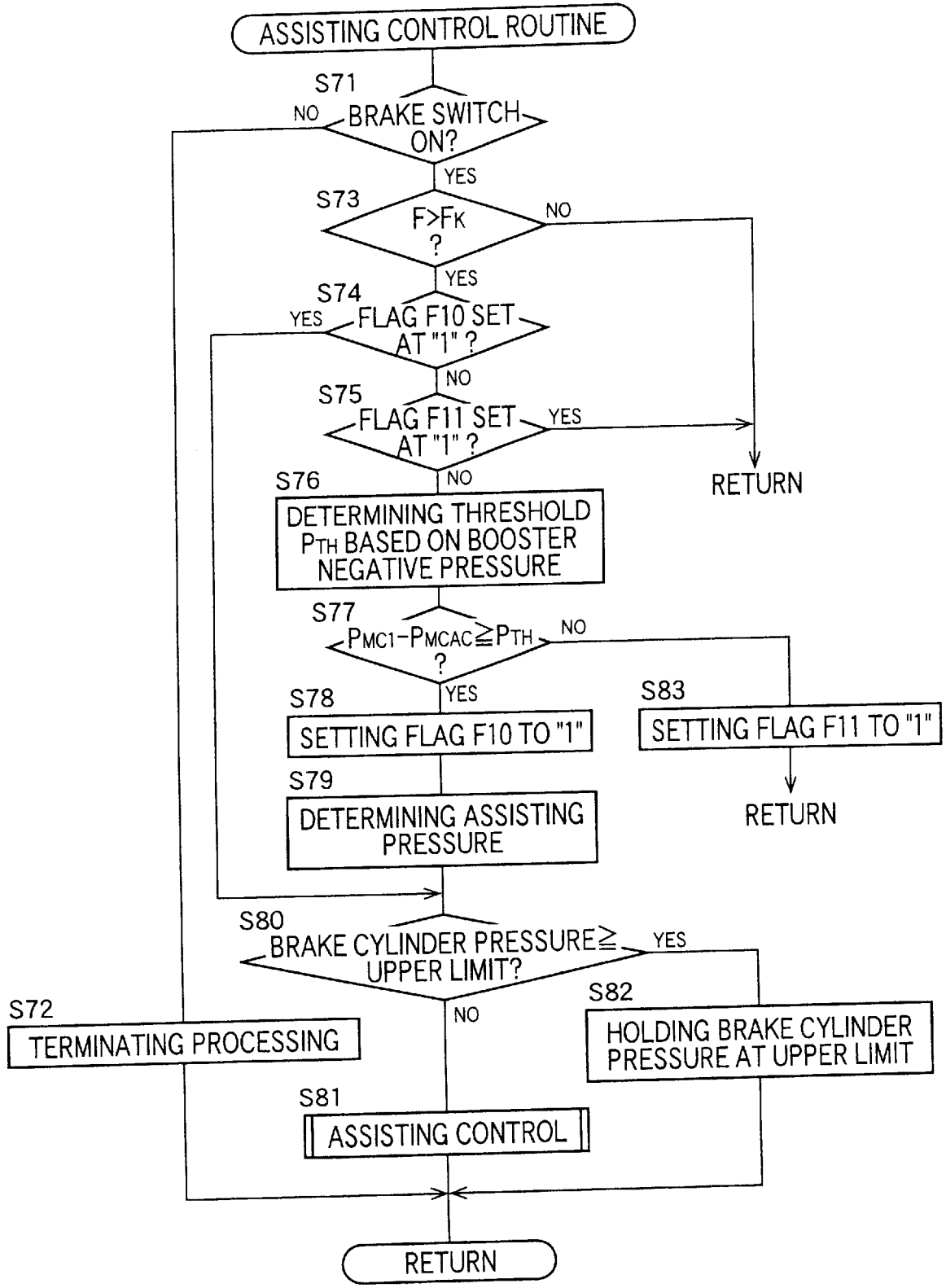
FIG. 15 is a flow chart illustrating an assisting control routine according to a control program stored in the ROM of a computer of an electronic control device of a braking system according to a further embodiment of this invention.
Figure 16:
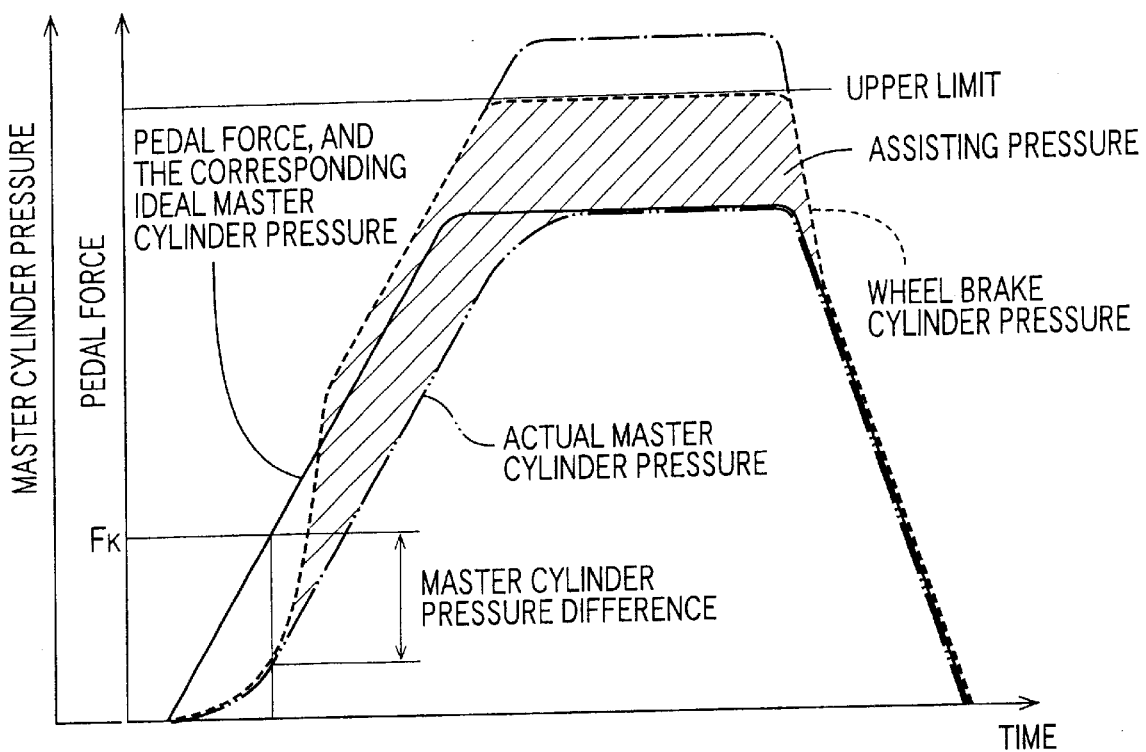
FIG. 16 is a graph for explaining an assisting pressure control according to the assisting control routine of FIG. 15.

Like the assisting control routine of FIG. 13, the assisting control routine of FIG. 15 according to the present third embodiment is adapted to effect only one determination as to whether an abrupt brake application is required, when the brake operating force has exceeded the predetermined value $F_K$. Steps S71–S75 of the routine of FIG. 15 are identical with steps S51–S55 of FIG. 13. When the requirement for an abrupt brake application is not detected, and flags F10 and F11 are not set at "1", the control flow goes to step S76 to determine the threshold value $P_{TH}$ on the basis of the negative pressure in the low-pressure chamber 34. The threshold value $P_{TH}$ is determined such that the threshold value $P_{TH}$ increases with an increase in the pressure in the low-pressure chamber 34 toward the atmospheric level, namely, with a decrease in the difference of the negative pressure in the chamber 34 from the atmospheric pressure. In this respect, it is noted that as the pressure in the low-pressure chamber 34 increases toward the atmospheric pressure, the difference between the pressures in the low-pressure and variable-pressure chambers 34, 36 decreases, so that the operational delay of the booster 20 accordingly increases. The threshold value $P_{TH}$ is determined on the basis of the booster negative pressure and according to a predetermined relationship between these two parameters, which relationship is represented by a data table or equation stored in the ROM 166 of the computer 162. The thus determined threshold $P_{TH}$ is stored in a suitable memory provided in the RAM 168.

Step S76 is followed by step S77 to determine whether an abrupt brake application is required. This determination is effected by determining whether the master cylinder pressure difference obtained by subtracting the actual master cylinder pressure $P_{MCAC}$ from the ideal value $P_{MCI}$ corresponding to the brake operating force F is larger than the threshold value $P_{TH}$ determined in step S76. If the difference $(P_{MCI} - P_{MCAC})$ is smaller than the threshold $P_{TH}$, a negative decision (NO) is obtained in step S77, and the control flow goes to step S83 to set the flag F11. Subsequently, steps S71 and S73–S75 are repeatedly implemented until the brake pedal 18 has been released.

When an abrupt brake application is required and the master cylinder pressure exceeds the threshold value $P_{TH}$, on S77 the other hand, an affirmative decision (YES) is obtained in step S77, and the control flow goes to step S78 to set the flag F10 to "1". Step S78 is followed by step S79 to determine the assisting pressure in the same manner as in step S58, of the second embodiment, for example, and store the determined assisting pressure in the assisting-pressure memory 188. Step S79 is followed by step S80 to determine whether the wheel brake cylinder pressure has been increased to a predetermined upper limit. This determination is effected by determining whether a sum of the actual master cylinder pressure $P_{MCAC}$ detected by the master cylinder pressure sensor 176 and the assisting pressure is equal to or higher than the upper limit. The upper limit is determined so as to permit the wheel brake cylinders 24 to produce a sufficient braking force and to prevent an excessive rise of the wheel brae cylinder pressure which would cause a damage or abnormality of any elements of the brakes including the wheel brake cylinders 24. According to the present third embodiment, an increase in the wheel brake cylinder pressure is limited to the predetermined upper limit, for preventing an excessive rise of the wheel brake cylinder pressure upon application of the assisting pressure, which would take place particularly when the brake pedal 18 is operated with a considerably large operating force F, for instance.

When the wheel brake cylinder pressure is lower than the upper limit a negative decision (NO) is obtained in step S80, and the control flow goes to step S81 to effect the assisting control, so that the wheel brake cylinder pressure is made higher than the actual master cylinder pressure by the assisting pressure. Steps S71, S73, S74, S80 and S81 are repeatedly implemented to continue the assisting control as long as the wheel brake cylinder pressure is not higher than the upper limit, until the brake pedal 18 has been returned to the non-operated position.

When the wheel brake cylinder pressure has been increased to the upper limit as a result of an increase in the brake operating force F and a consequent increase of the actual master cylinder pressure, an affirmative decision (YES) is obtained in step S80, and the control flow goes to step S82 in which the wheel brake cylinder pressure is held at the upper limit. Namely, the assisting pressure is determined to be a difference between the upper limit and the actual master cylinder pressure, and the thus determined assisting pressure is added to the wheel brake cylinder pressure. Thus, the assisting pressure applied in step S82 is lower than that determined in step S79, so that the wheel brake cylinder pressure is not increased and is held at the predetermined upper limit. The wheel brake cylinder pressure is held constant without reducing the assisting pressure, if the operating force F of the brake pedal 18 is held constant. If the brake operating force F is continuously increased even after the wheel brake cylinder pressure has reached the upper limit, the assisting pressure is reduced with an increase of the brake operating force F. When the wheel brake cylinder pressure becomes lower than the upper limit as a result of a decrease of the brake operating force F, the assisting control in step S80 is effected. When the brake pedal 18 has been fully released, the negative decision is obtained ins step S71, and the assisting control routine is terminated.

It will be understood from the above description of the third embodiment that a portion of the ECU 160 assigned to implement step S76 constitutes a threshold determining portion for determining a threshold value of a difference between the actual and ideal values of the output of the booster 20, more particularly, the threshold value $P_{TH}$ of the master cylinder pressure difference.

The braking systems according to the preceding embodiments may be modified to effect the assisting control if the output of the booster 20 is not larger than a predetermined value when the input has exceeded a predetermined value. An example of a braking system incorporating this modification will be described by reference to FIG. 17. This braking system according to a fourth embodiment of the invention uses a pedal force switch and a master cylinder pressure switch in place of the pedal force sensor 174 and the master cylinder pressure sensor 176. The pedal force switch generates a first signal when the brake operating force F is larger than a predetermined threshold, and a second signal when the brake operating force F is not larger than the threshold. For instance, the threshold of the brake operating force F may be the predetermined first value $F_{K1}$ used in the first embodiment. The pedal force switch is arranged to generate an OFF signal when the brake operating force F is not larger than the value $F_{K1}$, and an ON signal when the brake operating force F is larger than the value $F_{K1}$. The master cylinder pressure switch generates a first signal when the actual master cylinder pressure is higher than a predetermined threshold, and a second signal when the actual master cylinder pressure is not higher than the threshold. In the present embodiment, the threshold of the actual master cylinder pressure is determined to be slightly lower than the ideal master cylinder pressure corresponding to the threshold of the brake operating force F. The master cylinder pressure switch is arranged to generate an OFF signal when the actual master cylinder pressure is not higher than the threshold, and an ON signal when the actual master cylinder pressure is higher than the threshold. The output signals of the pedal force switch and the master cylinder pressure switch are applied to the computer 162 of the ECU 160.

The assisting control routine executed in the present fourth embodiment will be described by reference to the flow chart of FIG. 17. The routine is initiated with step S91 to determine whether the brake switch 172 is in the ON state. If a negative decision (NO) is obtained in step S91, the control flow goes to step S92 to effect the process for terminating the routine. If the brake switch 172 is turned on with an operation of the brake pedal 18, an affirmative decision (YES) is obtained in step S91, and the control flow goes to step S93 to determine whether the pedal force switch is in the ON state. When the brake operating force F is not larger than the threshold and the pedal force switch is in the OFF state, a negative decision (NO) is obtained in step S93, and the control flow goes to step S92. When the brake operating force F has exceeded the threshold and the pedal force switch is turned on, an affirmative decision (YES) is obtained in step S93, and the control flow goes to step S94 to determine whether a flag F12 is set at "1". The flag F12 set at "1" indicates that the assisting control is required to be effected after determination of an assisting pressure.

When the flag F12 is not set at "1", the control flow goes to step S95 to determine whether a flag F13 is set at "1". The flag F13 set at "1" indicates that the assisting control is not required to be effected. If a negative decision (NO) is obtained in step S95, the control flow goes to step S96 to determine whether the master cylinder pressure switch is in the OFF state.

When the brake pedal 18 is operated to apply an abrupt brake to the vehicle, the rate of increase of the brake operating force F is higher than when the brake pedal 18 is operated to apply a normal brake to the vehicle, and an increase of the actual master cylinder pressure is considerably delayed with respect to an increase of the ideal master cylinder pressure, so that the actual master cylinder pressure when the brake operating force has exceeded the threshold is not higher than the threshold. Accordingly, the master cylinder pressure switch is still held in the OFF state. In this case, therefore, an affirmative decision (YES) is obtained in step S96, and the control flow goes to step S97 to set the flag F12 to "1", and then to step S98 to determine the assisting pressure. For instance, the assisting pressure is determined by multiplying a predetermined constant pressure by a coefficient which varies with the booster negative pressure. The determined assisting pressure is stored in the assisting-pressure memory 188. Step S98 is followed by step S99 in which the assisting pressure is applied to increase the wheel brake cylinder pressure to a level which is higher than the actual master cylinder pressure by the assisting pressure.

Figure 17:
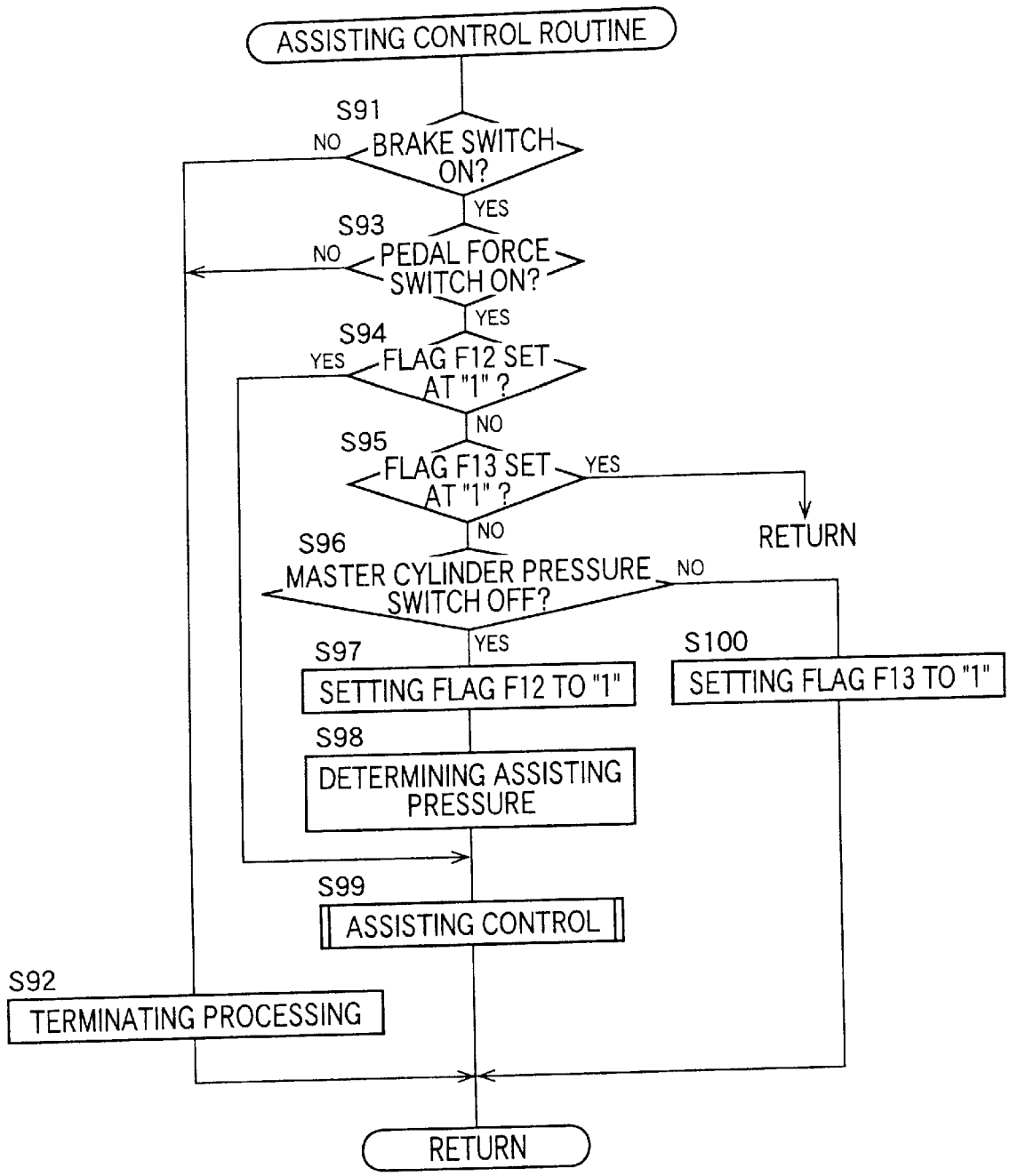
FIG. 17 is flow chart illustrating an assisting control routine according to a control program stored in the ROM of a computer of an electronic control device of a braking system according to a still further embodiment of this invention.

In the next cycle of execution of the routine of FIG. 17, an affirmative decision (YES) is obtained in step S94, since the flag F12 was set to "1" in step S97. Accordingly, the control flow goes to step S99 to effect the assisting control while skipping steps S95–S98. Thus, the determination as to whether an abrupt brake application is required is effected only once when the brake operating force F has exceeded the threshold. The assisting pressure is kept constant irrespective of an increase of the brake operating force F, so that the wheel brake cylinder pressure is held higher than the actual master cylinder pressure by the constant assisting pressure. The assisting control or the application of the assisting pressure is terminated when the pedal force switch or brake switch 172 is turned off as a result of the releasing action of the brake pedal 18.

If the master cylinder pressure switch is in the ON state when the pedal force switch is turned ON, a negative decision (NO) is obtained in step S96, and the control flow goes to step S100 to set the flag F13 to "1". In this case, one cycle of execution of the routine is terminated. In the next cycle of execution of the routine, an affirmative decision (YES) is obtained in step S95 since the flag F12 was set to "1" in step S100, whereby the application of the assisting pressure is not effected. While the brake pedal 18 is normally operated at a lower rate of increase of the brake operating force F than during an abrupt brake application, the delay in the increase of the actual master cylinder pressure with respect to the increase of the ideal value (brake operating force F) is not so large, so that the actual master cylinder pressure when the brake operating force F has exceeded the threshold is equal to or higher than the threshold, and the master cylinder pressure switch is placed in the ON state. This ON state of the master cylinder pressure switch indicates that an abrupt brake application is not presently required and that the application of an assisting pressure is not necessary.

The braking systems according to the embodiments described above are all adapted to effect the assisting control when an abrupt brake application to the vehicle is required. However, the braking systems may be modified to effect the assisting control for the purpose of preventing or reducing the amount of shortage or insufficiency of the vehicle braking force or brake operating force (with respect to the brake operating force F), rather than or in addition to permitting the abrupt brake application to the vehicle. An example of the braking system incorporating this modification will be described by reference to FIGS. 18–23. The braking system according to this fifth embodiment is identical with the preceding embodiments, except for the assisting control routine illustrated in the flow chart of FIG. 18, and the description and illustration of the other aspects are dispensed with. The same reference signs as used in FIGS. 1–12 will be used in FIGS. 18–23 to identify the corresponding elements.

To begin with, the braking system according to the present fifth embodiment will be briefly described. Each of the determination as to whether an abrupt brake application is required and the determination as to whether the vehicle braking force is insufficient is effected only one when the brake operating force F has exceeded a predetermined threshold value. Each of these two determinations is made by determining whether the difference between the actual and ideal values $P_{MCAC}$ and $P_{MCI}$ of the master cylinder pressure is equal to or larger than a predetermined threshold $P_{TH}$. Two different threshold values $P_{TH1}$ and $P_{TH2}$ are used for the two determinations.

Figure 19:
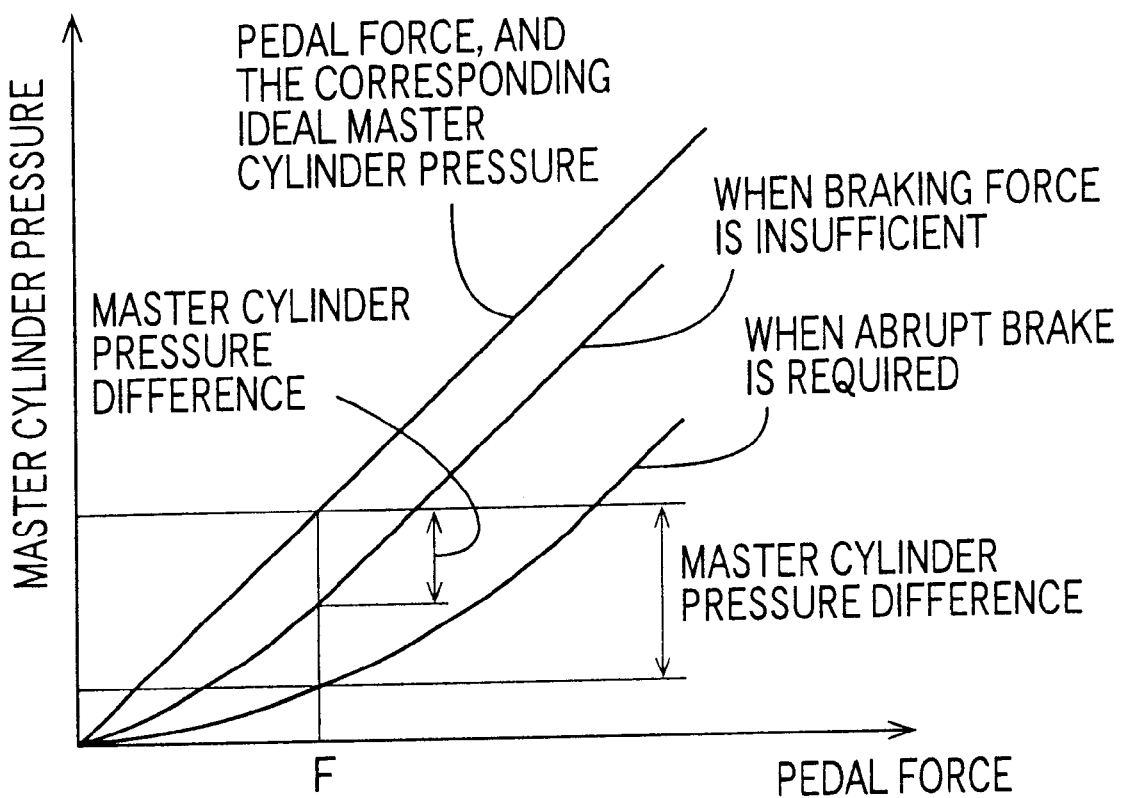
FIG. 19 is view for explaining a determination of two master cylinder pressure differences in the assisting control routine of FIG. 18.

When an abrupt brake application to the vehicle is required, the rate of increase of the brake operating force F is higher than that when a normal brake application is required. As indicated in FIG. 19, the amount of delay of the increase of the actual master cylinder pressure with respect to the increase of the ideal value is larger when the abrupt brake application is required than when the vehicle braking force is insufficient. Accordingly, the difference between the actual and ideal values of the master cylinder pressure corresponding to a given value of the brake operating force F is larger when the abrupt brake application is required than when the braking force is insufficient, as is also apparent from FIG. 19. Therefore, the requirement for an abrupt brake application and the insufficiency of the braking force can be detected distinctively from each other, by comparing the master cylinder pressure difference with the two different threshold values $P_{TH1}$ and $P_{TH2}$. The first threshold value $P_{TH1}$ for detecting the requirement for an abrupt brake application is larger than the second threshold value $P_{TH2}$ for detecting the insufficiency of the braking force, and is determined to permit an operational delay of the booster 20 when an abrupt brake application is required, but not to permit an operational delay of the booster 20 when the braking force is insufficient. Described more specifically, the first threshold value P is determined to be larger than the master cylinder pressure difference expected to arise when the braking force is insufficient, but is smaller than the master cylinder pressure difference expected to arise when the abrupt brake application is required. On the other hand, the second threshold value $P_{TH2}$ which is smaller than the first threshold value $P_{TH1}$ is determined to permit the detection of the insufficiency of the braking force. More specifically, the second threshold value $P_{TH2}$ is determined to be larger than the master cylinder pressure difference expected to arise when the braking force is insufficient. The second threshold value $P_{TH2}$ is determined while taking into account a delay in the flow of the atmosphere into the variable-pressure chamber 36 and other factors which may cause the operational delay of the booster 20. This arrangement permits the determination that an abrupt brake application is required, if the master cylinder pressure difference is not smaller than the first threshold value $P_{TH1}$, and the determination that the braking force is insufficient, if the master cylinder pressure difference is smaller than the first threshold value $P_{TH1}$ but is not smaller than the second threshold value $P_{TH2}$. Thus, the operational delay of the booster 20 when an abrupt brake application is required and the operational delay when the braking force is insufficient can both be detected on the basis of the master cylinder pressure as compared with the threshold values $P_{TH1}$, $P_{TH2}$. In other words, the operational delays of the booster 20 are detected on the basis of the master cylinder pressure difference, to detect the requirement for an abrupt brake application and the insufficiency of the braking force.

When the requirement for an abrupt brake application to the vehicle is detected, the assisting pressure is determined and is added to the wheel brake cylinder pressure (actual master cylinder pressure) so that the wheel brake cylinder pressure is made higher than the ideal master cylinder pressure. When the insufficiency of the braking force is detected, the assisting pressure is added to the wheel brake cylinder pressure so that the wheel brake cylinder pressure is made higher than the ideal master cylinder pressure.

Referring to the flow chart of FIG. 18, there will be described in detail the assisting control routine according to the fifth embodiment of this invention.

Figure 18:
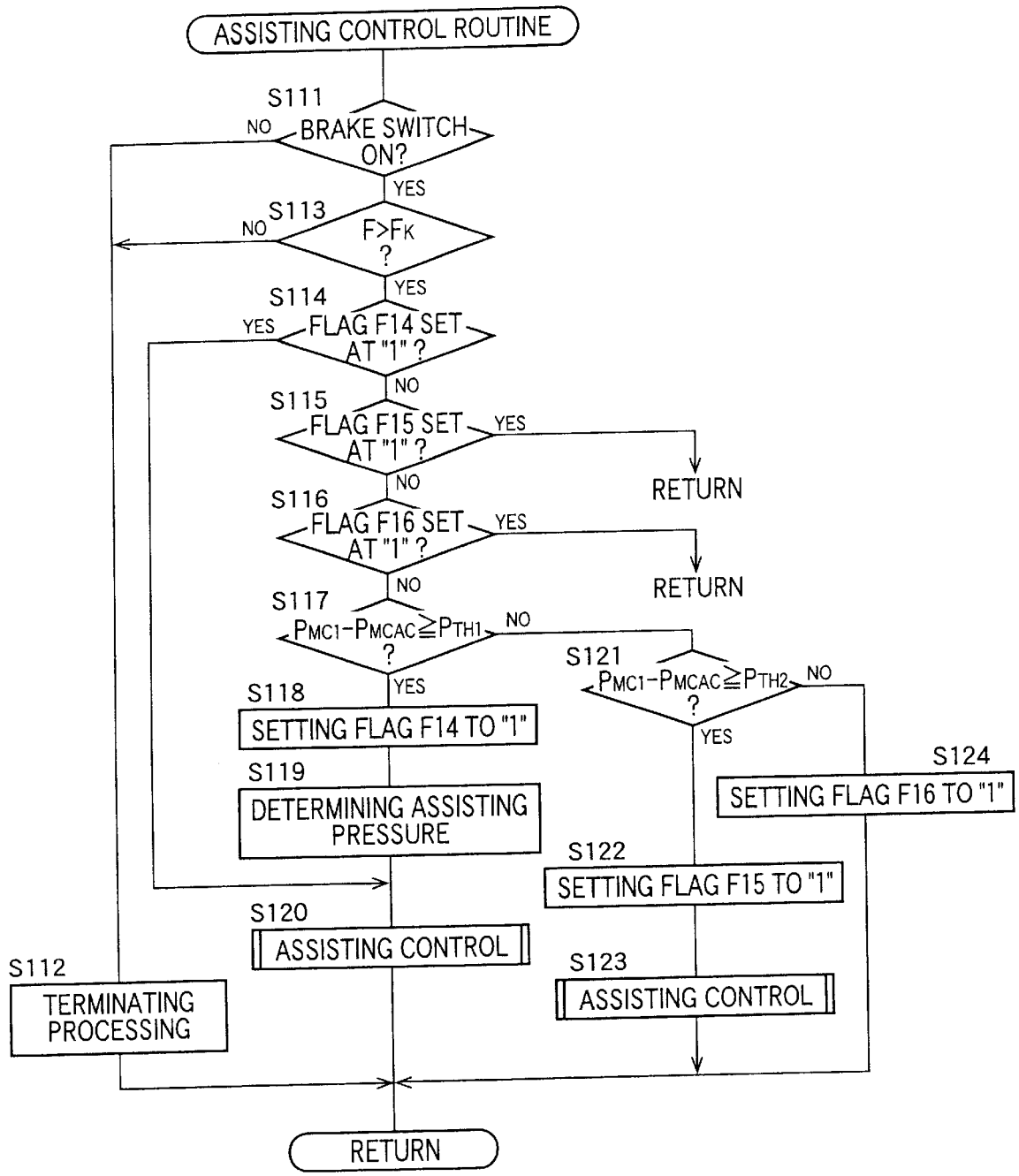
FIG. 18 is a flow chart illustrating an assisting control routine according to a control program stored in the ROM of a computer of an electronic control device of a braking system according to a yet further embodiment of this invention.

The assisting control routine of FIG. 18 is initiated with step S111 to determine whether the brake switch 172 is in the ON state. When the brake pedal 18 is placed at the non-operated position, a negative decision (NO) is obtained in step S111, and the control flow goes to step S112 to effect the processing for terminating the routine. If the brake pedal 18 is in operation, an affirmative decision (YES) is obtained in step S111, and the control flow goes to step S113 to determine whether the brake operating force F is larger than the predetermined threshold value $F_K$. If the brake operating force F is not larger than the threshold value $F_K$, the control flow goes to step S112.

When the brake operating force F has exceeded the threshold value $F_K$, an affirmative decision (YES) is obtained in step S113, the control flow goes to step S114 to determine whether a flag F14 is set at "1". This flag F14 set at "1" indicates that an abrupt brake application to the vehicle is presently required and that the application of an assisting pressure is necessary. If a negative decision (NO) is obtained in step S114, the control flow goes to step S115 to determine whether a flag F15 is set at "1". This flag F15 set at "1" indicates the detection that the braking force is insufficient. If a negative decision (NO) is obtained in step S114, the control flow goes to step S116 to determine whether a flag F16 is set at "1". This flag F16 set at "1" that neither the requirement for an abrupt brake application nor the insufficiency of the braking force has been detected and that the application of an assisting pressure is not necessary.

If a negative decision (NO) is obtained in sep S116, the control flow goes to step S117 to determine whether the master cylinder pressure difference is equal to or larger than the first threshold value $P_{TH1}$. If an affirmative decision (YES) is obtained in step S117, the control flow goes to step S118 to set the flag F14 to "1", and then to step S119 to determine the assisting pressure. Step S119 is followed by step S120 to effect the application of the assisting pressure to the wheel brake cylinders 24. The determination and application of the assisting pressure are effected in the same manner as in the first embodiment of FIGS. 1–12. With the flag F14 set at "1", steps S111, S113, S114 and S120 are subsequently repeatedly implemented until the brake pedal 18 has been released or the brake operating force F has been reduced down to the threshold value $F_K$.

When the master cylinder pressure difference is smaller than the first threshold value $P_{TH1}$, a negative decision (NO) is obtained in step S117, and the control flow goes to step S121 t determine whether the master cylinder pressure difference is equal to or larger than the second threshold value $P_{TH2}$, namely, whether the braking force is insufficient. If the master cylinder pressure difference is smaller than the second threshold value $P_{TH2}$, this means that the braking force is not insufficient, either. In this case, a negative decision (NO) is obtained in step S121, and the control flow goes to step S124 to set the flag F16. Subsequently, therefore, steps S111 and S113–S116 are repeatedly implemented until the brake pedal 18 has been released or the operating force F has been reduced down to the threshold value $F_K$.

If the master cylinder pressure difference is not smaller than the second threshold value PTH2, an affirmative decision (YES) is obtained in step S121, and the control flow goes to step S122 to set the flag F15 to "1", and then step S123 to effect the application of an assisting pressure so that the wheel brake cylinder pressure is equal to the ideal master cylinder pressure $P_{MCI}$. Described in detail, the amount of electric current to be applied to the solenoid coil 134 of the pressure control device 120 is determined so that the wheel brake cylinder pressure is made higher than the actual master cylinder pressure $P_{MCAC}$ by an amount equal to the difference ($P_{MCI}$–$P_{MCAC}$) between the actual and ideal values. The thus determined amount of electric current is applied to the solenoid coil 134. Then, the pump motor 107 is started to operate the pump 106, and the pressurized fluid delivered from the pump 106 is supplied to the wheel brake cylinders 24 while the pressure of the fluid is controlled by the pressure control valve 120. Thus, the assisting pressure to be added to the wheel brake cylinder pressure corresponds to the amount of insufficiency of the braking pressure due to the operational delay of the booster 20, and is equal to the difference of the actual master cylinder pressure $P_{MCAC}$ from the ideal value $P_{MCI}$. Accordingly, the braking force (brake operating force) is increased by an amount corresponding to the assisting pressure, so that the braking force is increased in an ideal relationship with the brake operating force F, which ideal relationship is the same as the ideal relationship between the brake operating force F and the master cylinder pressure, even in the presence of a delay in the increase of the actual master cylinder pressure $P_{MCAC}$ with respect to the ideal value $P_{MCI}$ due to the operational delay of the booster 20. If necessary, the inflow control valve 150 is opened so that the pump 107 is supplied with the fluid from the master cylinder 22. The assisting pressure is increased with an increase in the master cylinder pressure difference, to effectively compensate for the insufficiency of the braking force due to the operational delay of the booster 20.

Figure 20:
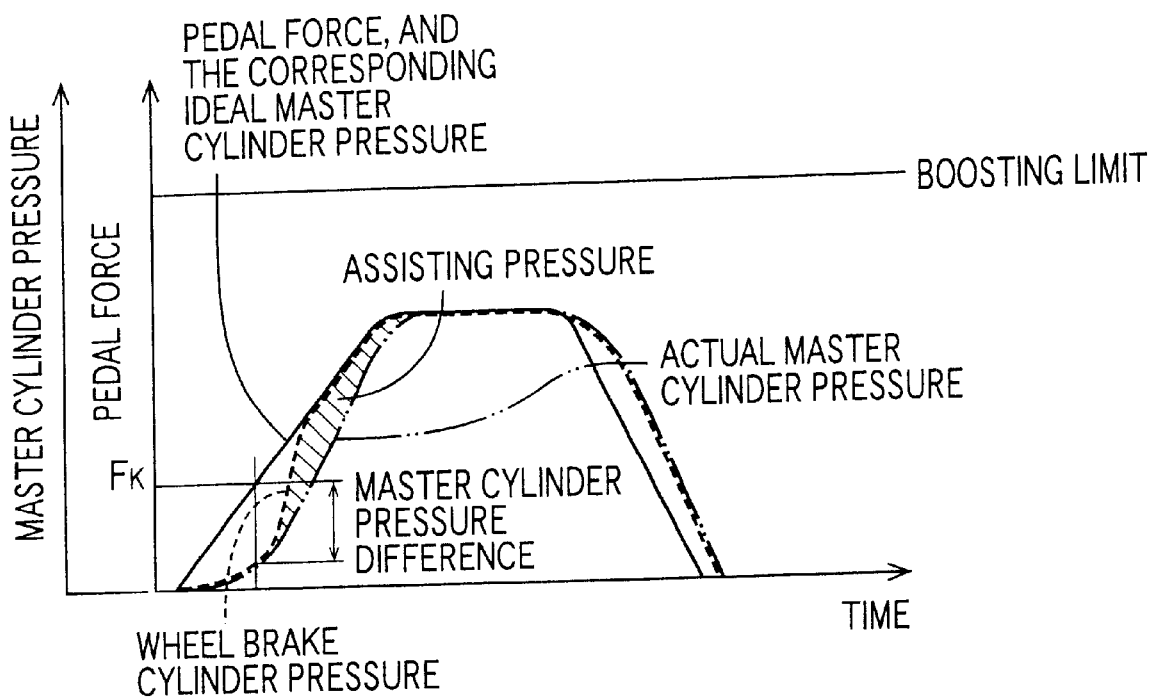
FIG. 20 is a graph for explaining one form of the assisting pressure control according to the assisting control routine of FIG. 18 when the brake operating force is insufficient.

As described above, the determination as to whether the braking force is insufficient is effected when the brake operating force F has been increased above the predetermined threshold value $F_K$. If the braking force is insufficient, the assisting pressure is added to the wheel brake cylinder pressure, to at least reduce the amount of insufficiency of the braking force, for effectively minimizing the delay in the braking effect. In an example of FIG. 20 wherein the operating force F of the brake pedal 18 is held at a constant value larger than the threshold value $F_K$ and is then reduced to zero with a releasing action of the brake pedal 18, without a further increase of the operating force F, the application of an assisting pressure to the wheel brake cylinder pressure is initiated when the master cylinder pressure difference has increased to the second threshold value $P_{TH2}$ due to an excessive operational delay of the booster 20, so that the wheel brake cylinder pressure is made equal to the ideal master cylinder pressure $P_{MCI}$. In FIG. 20, hatched area indicates the assisting pressure generated by the brake-cylinder pressure control device 140. While the operating force F of the brake pedal 18 is held constant, the operational delay of the booster 20 is gradually reduced, and the actual master cylinder pressure $P_{MCAC}$ is eventually made equal to the ideal value $P_{MCI}$. When the brake pedal 18 is released in this condition, the actual master cylinder pressure $P_{MCAC}$ and the wheel brake cylinder pressure are reduced with some delay with respect to the reduction of the ideal master cylinder pressure $P_{MCI}$.

Figure 21:
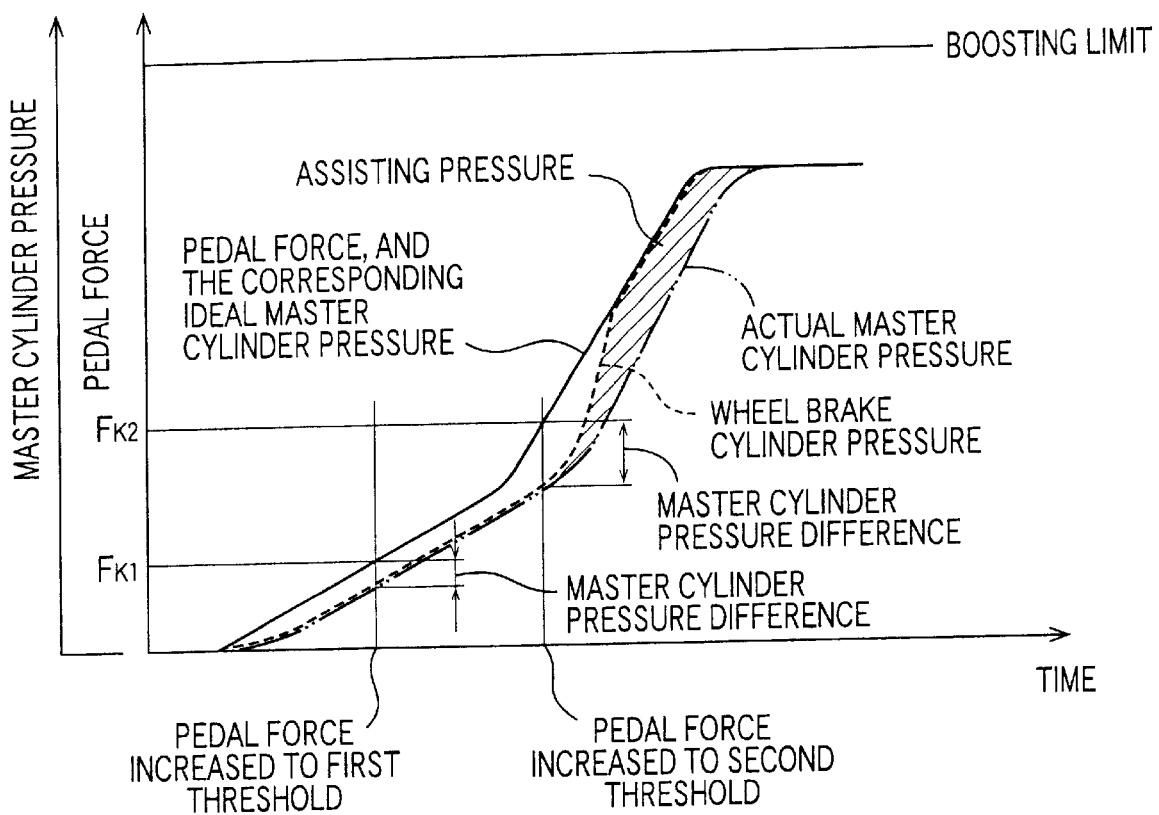
FIG. 21 is a graph for explaining another form of the assisting pressure control according to the assisting control routine of FIG. 18 when the brake operating force is insufficient.

FIG. 21 shows another example wherein the master cylinder pressure difference is smaller than the second threshold value PTH2, with a relatively small amount of operational delay of the booster 20, and neither the requirement for an abrupt brake application nor the insufficiency of the braking force is detected. In this case, an assisting pressure is not applied to the wheel brake cylinders 24. In the present fifth embodiment, each of the determination as to whether an abrupt brake application is required and the determination as to whether the braking force is insufficient, may be made twice, as in the first embodiment of FIGS. 1–12. In this case, the determination is made first when the brake operating force F has exceeded the first threshold value $F_{K1}$, and then when the brake operating force F has exceeded the second threshold value $F_{K2}$. There is a case where the braking force is not insufficient when the brake operating force F has exceeded the first threshold value $F_{K1}$, but becomes insufficient when the brake operating force F has exceeded the second threshold value $F_{K2}$. In this case, the assisting control is effected to add an assisting pressure to the wheel brake cylinder pressure, as indicated in FIG. 21, so that the wheel brake cylinder pressure is increased to the ideal master cylinder pressure $P_{MCI}$.

Figure 22:
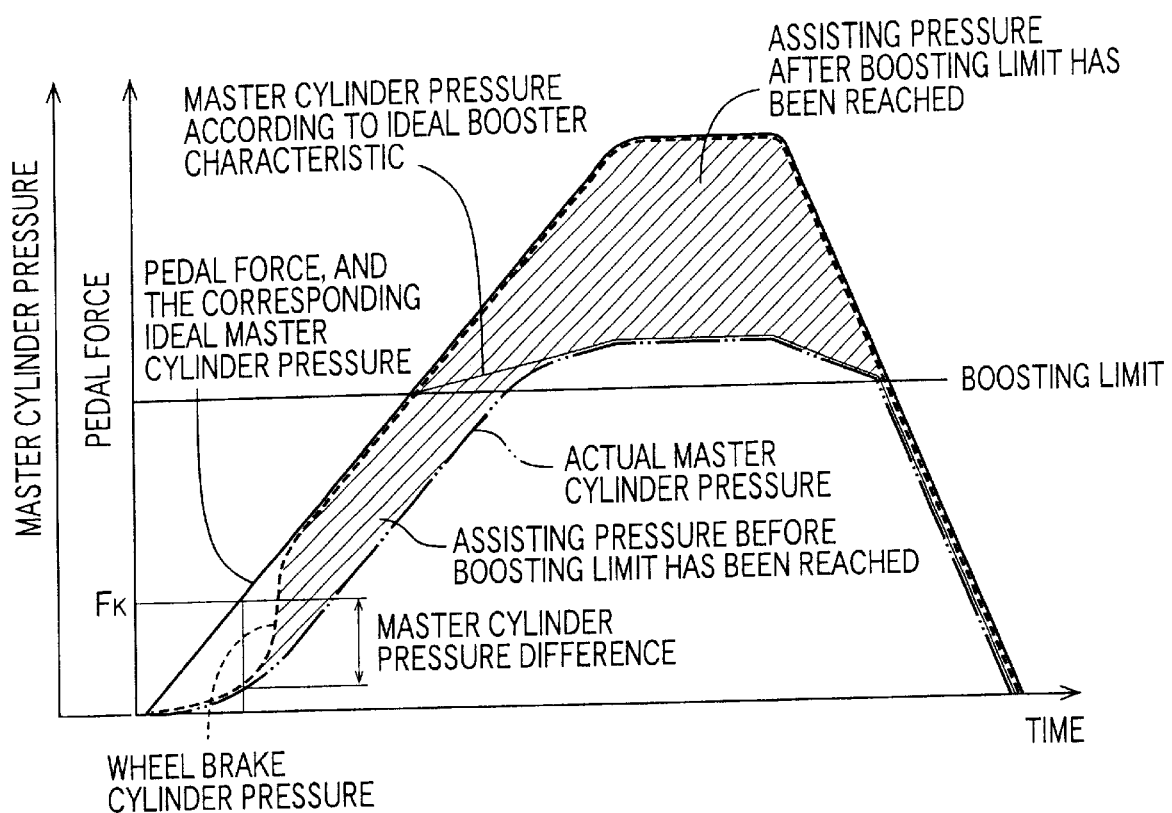
FIG. 22 is a graph for explaining a further form of the assisting pressure control according to the assisting control routine of FIG. 18 when the brake operating force is insufficient.

When the boosting limit of the booster 20 has been reached during a continued increase of the operating force F of the brake pedal 18 after the initiation of the assisting control upon detection of insufficiency of the braking force when the operating force F has exceeded the threshold value $F_K$, the booster 20 is no longer capable of boosting the input force, and the difference between the actual and ideal values $P_{MCAC}$ and $P_{MCI}$ of the master cylinder pressure is increased, as shown in FIG. 22. However, the application of the assisting pressure to the wheel brake cylinders 24 so as to increase the wheel brake cylinder pressure to the ideal master cylinder pressure PMCI makes it possible to maintain the ideal relationship between the brake operating force F and the wheel brake cylinder pressure even after the boosting limit of the booster 20 has been reached, so that the insufficiency of the braking force can be overcome even after the boosting limit has been reached.

Figure 23:
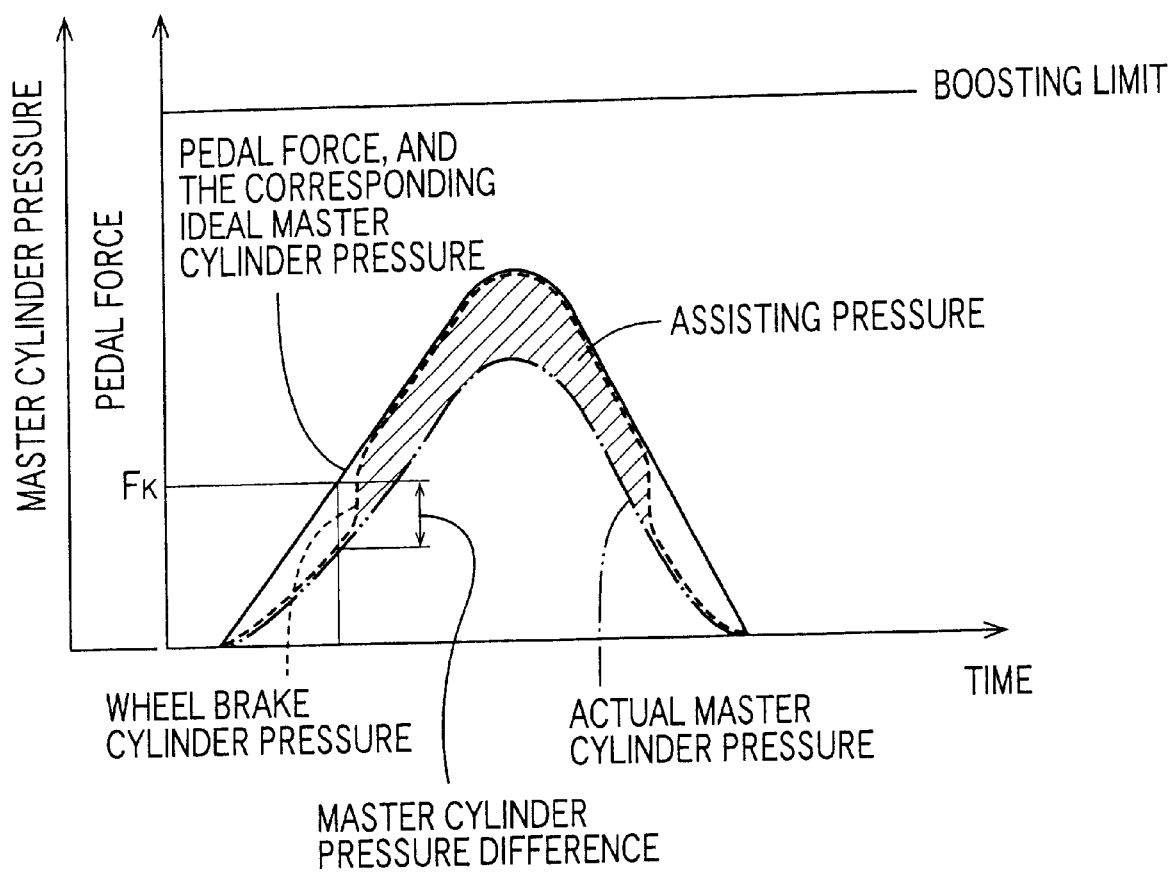
FIG. 23 is a graph for explaining a still further form of the assisting pressure control according to the assisting control routine of FIG. 18 when the brake operating force is insufficient.

When the vehicle operator releases the brake pedal 18, the master cylinder pressure according to the ideal characteristic of the booster 20 is reduced, and the actual and ideal values of the master cylinder pressure and the wheel brake cylinder pressure are reduced along the ideal characteristic line. The actual master cylinder pressure PMCAC and the wheel brake cylinder pressure may be reduced such that these pressures are higher than the value according to the ideal characteristic of the booster 20.

Where the assisting control is effected in step S123 during a releasing action of the brake pedal 18, the actual and ideal values of the master cylinder pressure and the wheel brake cylinder pressure are reduced along the line of the ideal characteristic of the booster 20, so that the assisting pressure is not substantially applied to the wheel brake cylinders 24. If necessary, however, the assisting control may be effected by the brake-cylinder pressure control device 140 during the releasing action of the brake pedal 18. FIG. 23 shows an example wherein the operating force F of the brake pedal 18 is not held constant during the assisting control initiated by the brake-cylinder pressure control device 140 due to an excessive operational delay of the booster 20, and the brake pedal 18 is released before the actual master cylinder pressure has become equal to the ideal value. In this case, the ideal master cylinder pressure $P_{MCI}$ is higher than the actual value $P_{MCAC}$, and the assisting control is effected to increase the wheel brake cylinder to the ideal master cylinder pressure. In this respect, it is noted that continuing the assisting control even after initiation of the releasing action of the brake pedal 18 is more likely to meet the vehicle operator's intention than terminating the assisting control upon initiation of the releasing action. For this reason, the assisting control is continued until the brake pedal 18 has been fully released or until the operating force F has been reduced to the threshold value $F_K$. In the example of FIG. 23, the assisting control is terminated when the operating force F has been reduced to the threshold value $F_K$.

It will be understood from the foregoing description of the present fifth embodiment of the invention that a portion of the ECU 160 assigned to implement steps S113, S117, S121 constitutes an output-delay detecting portion, which is considered to include a device for detecting an operational delay of the booster 20 at a predetermined point of time after the moment of initiation of a boosting operation of the booster 20, a device for detecting the operational delay when the input force of the booster 20 has increased to a predetermined value, and a device for detecting the operational delay on the basis of the output of the booster 20 in the form of the master cylinder pressure. It will also be understood that a portion of the ECU assigned to implement to steps S119 and S120 constitutes an assisting-force applying portion for applying an assisting force corresponding to the master cylinder pressure difference, or an ideal assisting-force applying portion for applying an assisting force so as to establish an ideal relationship between the input of the booster 20 and the braking force (brake operating force), and that the assisting-force applying portion and the output-delay detecting portion cooperate to constitute an abrupt-braking control device. It will further be understood that a portion of the ECU 160 assigned to implement step S123 for continuing the application of an assisting pressure after the boosting limit of the booster 20 has been reached constitutes a post-boosting-limit assisting-force applying portion for continuing the application of the assisting pressure after the boosting limit has been reached. It will also be understood that the output-delay detecting portion and the assisting-force applying device cooperate to constitute a braking delay reducing device.

The assisting pressure can be added to the wheel brake cylinder pressure by providing an assisting-force applying device, which is disposed between the booster and the master cylinder and arranged to add an assisting force to the output force of the booster. An example of a braking system including this assisting-force applying device will be described by reference to FIGS. 24 and 25.

Figure 24:
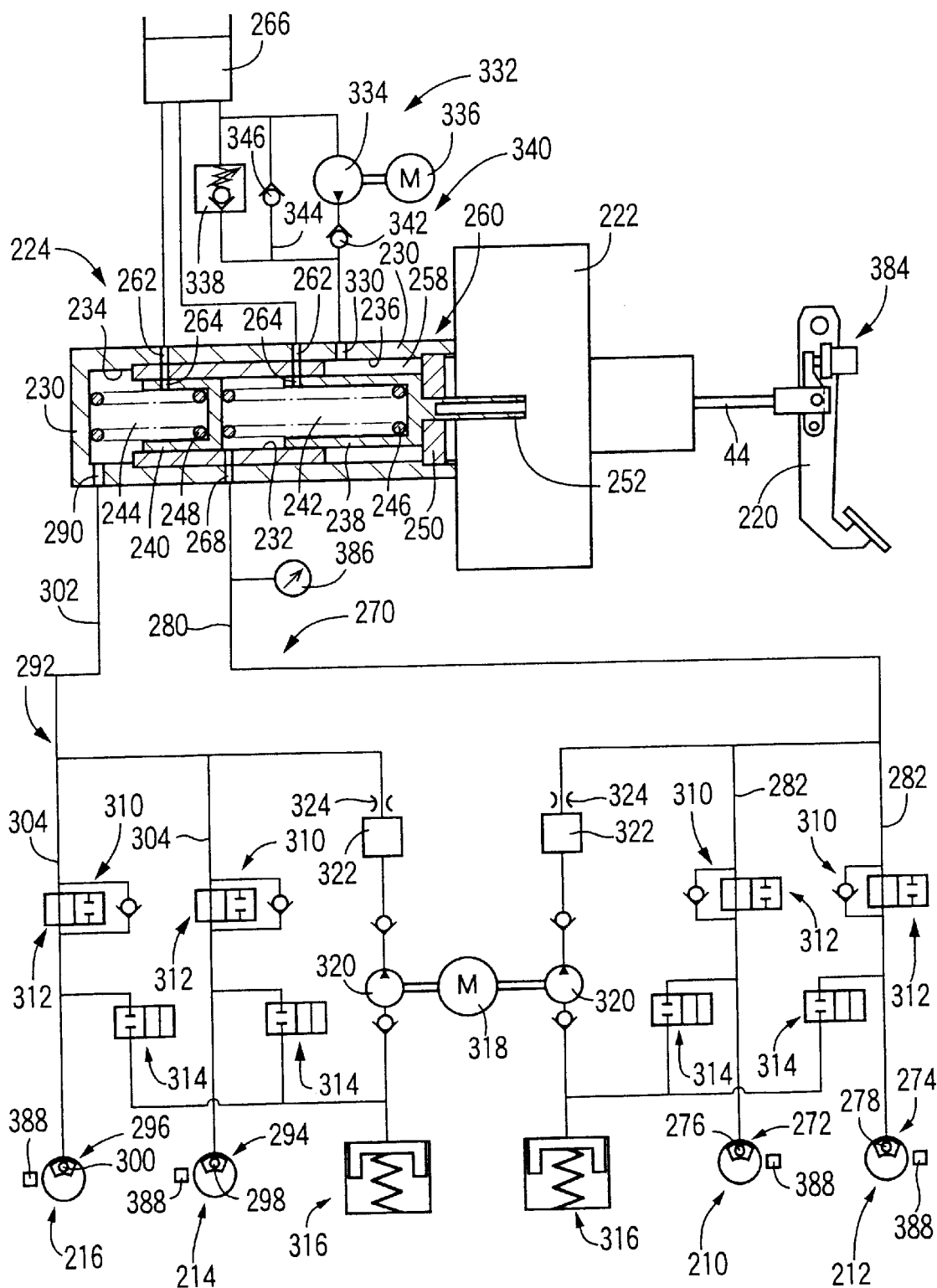
FIG. 24 is a schematic view showing a braking system constructed according to a yet further embodiment of this invention.

The present braking system of FIGS. 24 and 25 according to the sixth embodiment of this invention is provided for a four-wheel vehicle having a front left wheel 210, a front right wheel 212, a rear left wheel 214 and a rear right wheel 216, and a brake operating member in the form of a brake pedal 220. The brake pedal 220 is operatively connected to a master cylinder 224 of tandem type through a vacuum booster 222 (hereinafter referred to simply as "booster 222"). The booster 222 has the same construction as the booster 20 provided in the first embodiment, and detailed description and illustration of the booster 222 are dispensed with.

The master cylinder 224 has a housing 230 of a hollow cylindrical structure which is open at one of its opposite axial end and closed at the other axial end. The housing 230 has three round holes 232, 234, 236 having different diameters, which are arranged in series and concentrically with each other. In the round hole 232 having the smallest diameter, there are sidably and fluid-tightly fitted a first pressurizing piston 238 and a second pressurizing piston 240 arranged in series with each other. These first and second pressurizing pistons 238, 240 cooperate with the housing 230 to define a first pressurizing chamber 242 and a second pressurizing chamber 244 on the front side of the respective pistons 238, 240. Each of the first and second pressurizing pistons 238, 240 has a hollow cylindrical structure which is open at one of its opposite axial ends and closed at the other axial end. The pressurizing pistons 238, 240 are normally held at their fully retracted positions of FIG. 24 under biasing actions of respective elastic members in the form of compression coil spring 246, 248 disposed in the respective first and second pressurizing chambers 242, 244.

The open end of the housing 230 is fluid-tightly closed by a closure member 250 removably fixed to the open end portion of the housing 230 by a suitable fixing member such as a retainer ring. The fully retracted position of the first pressurizing piston 238 is determined by abutting contact with the closure member 250, and that of the second pressurizing piston 240 is determined by the fully retracted position of the first pressurizing piston 238, and initial length and load of the spring 246 which are established by a suitable member.

A hollow cylindrical piston rod 252 extends from the rear end face of the first pressurizing piston 238 through the closure member 250 into the housing of the booster 222, such that the piston rod 252 is substantially fluid-tightly and slidably movable relative to the closure member 250. The booster 222 includes a power piston, and a booster piston rod whose end portion is axially sidably fitted in the end portion of the piston rod 252. A force acting on a power piston of the booster 222 is transmitted to the piston rod 252 through the booster piston rod, so that masses of the working fluid in the first and second pressurizing chambers 242, 244 are pressurized to substantially the same pressure.

The closure member 250 cooperates with the housing 230 and the first pressurizing piston 238 to define an assisting chamber 258 between the closure member 250 and the piston 238. A fluid pressure generated in this assisting chamber 258 acts on the first pressurizing piston 238 in its advancing direction, so that the fluid in the first pressurizing chamber 242 is accordingly pressurized, and as a result, the second pressurizing piston 240 is advanced by the fluid pressure generated in the first pressurizing chamber 242. In the present sixth embodiment, a portion of the first pressurizing piston 238 which partially defines the assisting chamber 258 serves as an assisting piston, and the closure member 250 and portions of the housing 230 and piston 238 which partially define the assisting chamber 258 cooperate to serve as an assisting cylinder. Thus, the first pressurizing piston 238 is considered to also serve as the assisting piston, and the housing 230 is considered to partially define the assisting chamber 258 as well as the first and second pressurizing chambers 242, 244. It will be understood that the assisting piston and the assisting cylinder constitute an assisting cylinder portion 260.

The housing 230 has two reservoir ports 262, and each of the first and second pressurizing pistons 238, 240 has a communication passage 264. When the first and second pressurizing pistons 238, 240 are placed in their fully retracted positions, the first and second pressurizing chambers 242, 244 are held in communication with a reservoir 266 through the respective reservoir ports 262 and the respective communication passages 264. When the two pistons 238, 240 are advanced a small distance from the fully retracted positions of FIG. 24, the two reservoir ports 262 are closed, so that the fluid in the two pressurizing chambers 242, 244 can be pressurized by further advancing movements of the two pistons 238, 240.

The housing 230 further has a brake-cylinder port 268 through which the first pressurizing chamber 242 is connected through a main fluid passage 270 to wheel brake cylinders 276, 278 of front wheel brakes 272, 274 provided for braking the front left and right wheels 210, 212, respectively. The main fluid passage 270 consists of a common passage 280 extending from the first pressurizing chamber 242, and two branch passages 282 connecting the common passage 280 and the wheel brake cylinders 276, 278.

The housing 230 has another brake-cylinder port 290 through which the second pressurizing chamber 244 is connected through a main fluid passage 292 to wheel brake cylinders 298, 300 of rear wheel brakes 294, 296 provided for braking the rear left and right wheels 214, 216, respectively. The main fluid passage 292 consists of a common passage 302 extending from the second pressurizing chamber 244, and two branch passages 304 connecting the common passage 302 and the wheel brake cylinders 294, 296. Thus, the braking system of the present embodiment has a front brake-application sub-system for the front wheels 210, 212, and a rear brake-application sub-system for the rear wheels 214, 216.

The present braking system includes a pressure control valve device 310 provided for each of the wheel brake cylinders 276, 278, 298, 300, to effect an anti-lock braking pressure control for each wheel. Like the pressure control valve device 102 described above, the pressure control valve device 310 includes a pressure-increasing valve 312 which is a normally open solenoid-operated shut-off valve, and a pressure-reducing valve 314 which is a normally closed solenoid-operated shut-off valve. By selectively opening and closing these pressure-increasing and pressure-reducing valves 312, 314, the fluid pressure in each wheel brake cylinder 276, 278, 298, 300 can be selectively increased, held and reduced, as needed. The fluid which has been discharged from the wheel brake cylinders 276, 278, 298, 300 through the pressure-reducing valves 314 into the reservoir 316 is pumped up by an anti-lock control pump 320 driven by a pump motor 318, so that the fluid is returned from the reservoir 316 to the main fluid passages 270, 292 by an operation of the pump 320. Reference signs 322, 324 respectively denote a damper chamber and an orifice, which are provided for reducing a pressure pulsation of the pressurized fluid delivered from the anti-lock control pump 320. Since the present invention does not directly relate to the anti-lock braking pressure control, no further explanation on the anti-lock braking pressure control is deemed necessary.

The housing 230 further has a pressure-increasing port 330 through which the assisting chamber 258 is held in fluid communication with an assisting pressure control device 332. This assisting pressure control device 332 includes an assisting pump 334 which is a gear pump, an electric motor 336 for driving the assisting pump 334, and a pressure control valve 338. The assisting pump 334 and the pump motor 336 constitute a hydraulic pressure source, while the assisting pressure control device 332 cooperates with the assisting cylinder portion 260 to constitute an assisting-force applying device 340. The assisting pump 334 is provided to pressurize the fluid received from the reservoir 266, and deliver the pressurized fluid to the assisting chamber 258. To the delivery side of the assisting pump 334, there is connected a check valve 342 which prevents a flow of the fluid in a direction from the assisting chamber 258 toward the assisting pump 334.

The assisting pressure control device 332 has a by-pass passage 344 which by-passes the assisting pump 334 and the pressure control valve 338. A check valve 346 is provided in this by-pass passage 344. The check valve 346 permits a flow of the fluid in a direction from the reservoir 266 toward the assisting chamber 258, but inhibits a flow of the fluid in the reverse direction. When the brake pedal 220 is operated at a high speed, the fluid is fed from the reservoir 266 to the assisting chamber 258 through the check valve 346, for preventing generation of a negative pressure in the assisting chamber 258.

The pressure control valve 338, which has the same construction as the pressure control valve 120 provided in the preceding embodiments, will be only briefly described, and detailed description and illustration of this pressure control valve 338 are dispensed with. The pressure control valve 120 is provided to increase the wheel brake cylinder pressure to a level which is higher than the actual master cylinder by an amount corresponding to the amount of an electric current applied to the solenoid coil 134. However, the pressure control valve 338 is provided to control the fluid pressure in the assisting chamber 258 to a level corresponding to the amount of an electric current applied to the solenoid coil of the valve 338.

When the solenoid coil of the pressure control valve 338 is in the de-energized or OFF state, the valve member is kept apart from the valve seat, permitting the fluid flows between the assisting chamber 258 and the reservoir 266 in the opposite directions. When the first pressurizing piston 238 is moved by an operation of the brake pedal 220 in this OFF state, the pressure control valve 338 permits the fluid flows into and from the assisting chamber 258 according to a change in the volume of the assisting chamber 258 due to the movement of the piston 238. Thus, the pressure control valve 338 is a normally open shut-off valve.

In the energized or ON state of the solenoid coil of the pressure control valve 338, the valve member is seated on the valve seat with a movement of the valve member by a magnetic force generated by energization of the coil, so that the pressure control valve 338 is held in the closed state as long as the fluid pressure in the assisting chamber 258 is lower than a given level. Described in detail, the valve member begins to be moved away from the valve seat when the fluid pressure in the assisting chamber 258 has been increased to the given level, that is, when the attraction force acting on the valve member due to the magnetic force becomes smaller than a sum of a force acting on the valve member due to the fluid pressure in the assisting chamber 258, and the elastic force of a spring which biases the valve member in a direction away from the valve seat. As a result, the pressurized fluid delivered from the assisting pump 334 is released to the reservoir 266, to prevent a further increase in the fluid pressure in the assisting chamber 258. Thus, the fluid pressure in the assisting chamber 250 is linearly increased with an increase in the attraction force acting on the valve member, namely, with an increase in the amount of electric current applied to the solenoid coil.

The present braking system includes an electronic control unit 370 (hereinafter referred to as "ECU 370"), which includes a computer 372 incorporating a processing unit (PU) 374, a read-only memory (ROM) 376, a random-access memory (RAM) 378, and an input/output port (I/O port) 380, as shown in FIG. 25. To the I/O port 380, there are connected a brake switch 382, a pedal force sensor 384, a master cylinder pressure sensor 386, wheel speed sensors 388 and a booster negative pressure sensor 390. To the I/O port 380, there are also connected through driver circuits 394 various actuators such as the pressure-increasing valves 312, pressure-reducing valves 314, pump motor 318, solenoid coil of the pressure control valve 338 and pump motor 336. The driver circuits 394 and the computer 372 constitute the ECU 370.

The brake switch 382, pedal force switch 384, master cylinder pressure sensor 386, wheel speed sensors 388 and booster negative pressure sensor 390 are similar in construction to the brake switch 172, pedal force sensor 174, master cylinder pressure sensor 176, wheel speed sensors 178 and booster negative pressure sensor 180, respectively.

The ROM 376 of the computer 372 stores control programs for executing various control routines such as an assisting control routine and an anti-lock braking pressure control routine. The PU 374 operates to execute those control routines according to the control programs stored in the ROM 376, while utilizing a temporary data storage function of the RAM 382. The assisting control routine is executed activate the assisting-force applying device 340, so as to pressurize the fluid in the assisting chamber 258, for applying to the pressurizing pistons 238, 240 a force which is different from the output force of the booster 222. Like the assisting control routine in the first embodiment of FIGS. 1–11, the assisting control routine in the present sixth embodiment may be formulated to apply an assisting pressure to the wheel brake cylinders 272, 274, 298, 300, when the brake pedal 220 is operated for applying an abrupt brake to the vehicle. In this case, the assisting pressure is applied to the wheel brake cylinders through the assisting chamber 250, and the assisting pressure is determined in step S10 of FIG. 5 so as to apply an abrupt brake to the vehicle, and the assisting-force applying device 340 is activated in step S16 to apply the determined assisting pressure to assisting chamber 250. By applying the assisting pressure to the assisting chamber 258, the first pressurizing piston 238 receives a force which is larger than the output force received from the booster 222, so that the actual master cylinder pressure is increased to increase the wheel brake cylinder pressure by an amount corresponding to the assisting pressure applied to the assisting chamber 258. In step S22, the amount of increase of the assisting pressure is determined. In step S23, the increased assisting pressure is applied to the assisting chamber 258.

The assisting pressure is applied to the assisting chamber 258 when an abrupt brake application to the vehicle is required, namely, when an excessively large amount of operational delay of the booster 222 is detected. The assisting pressure is determined so that the wheel brake cylinder pressure is higher than the ideal master cylinder pressure, and is sufficient for applying the required abrupt brake application to the vehicle. The amount of increase of the master cylinder pressure and the wheel brake cylinder pressure is determined on the basis of a difference between the ideal master cylinder pressure and the actual master cylinder pressure (which would be established if the assisting pressure were not applied to the assisting chamber 258), so that the actual master cylinder pressure is made higher than the ideal value. In this respect, it is noted that the pressure-receiving area of the first pressurizing piston 238 which partially defines the assisting chamber 258 is smaller than the pressure-receiving area of the same which partially defines the first pressurizing chamber 242, by an amount corresponding to the cross sectional area of the piston rod 252. Therefore, the amount of increase of the wheel brake cylinder pressure is not equal to the assisting pressure as applied to the assisting chamber 258. The assisting pressure to be applied to the assisting pressure chamber 258 is determined by multiplying the determined amount of increase of the wheel brake cylinder pressure by a ratio (>1) of the pressure-receiving area of the piston 238 which partially defines the first pressurizing chamber 242 to the pressure-receiving area of the piston 238 which partially defines the assisting chamber 258. The amount of electric current to be applied to the solenoid coil of the pressure control valve 338 is determined so as to apply the determined assisting pressure to the assisting chamber 258, and the determined amount of electric current is applied to the solenoid coil. At the same time, the pump motor 336 is operated to operate the assisting pump 334, so that the determined assisting pressure is applied to the assisting chamber 258, whereby the first pressurizing piston 238 receives a force which is larger than the output force of the booster 222 by an amount corresponding to the assisting pressure. Accordingly, the wheel brake cylinder pressure is made higher than the level which is established by only the output of the booster 222, so that the abrupt brake is applied to the vehicle as desired by the vehicle operator.

It is to be understood that the braking system of FIGS. 24–25 including the assisting-force applying device 340 for applying to the first pressurizing piston 238 a force larger than the output force of the booster 222 may be modified to execute the assisting control routine according to any one of the second, third, fourth and fifth embodiments shown in FIGS. 13–23, for adding an assisting pressure to the wheel brake cylinder pressure, when an abrupt brake application to the vehicle is required or when the braking force is insufficient.

In the embodiments of FIGS. 13–23, the determination as to whether an abrupt brake application is required, and/or the determination as to whether the braking force is insufficient (in the fifth embodiment of FIGS. 13–23) may be effected two or more times. In the fifth embodiment of FIGS. 13–23, the determination as to whether the braking force is insufficient may be effected only once, so that the assisting control is continued without a further determination, until the brake pedal 220 has been released. Alternatively, the assisting control is terminated when the actual master cylinder pressure has become substantially equal to the ideal value, and is initiated again when the insufficiency of the braking force is detected thereafter at any one of a plurality of determinations at different values of the brake operating force F.

Further, the assisting control for adding an assisting pressure to the wheel brake cylinder upon detection of insufficiency of the braking force may be modified such that once the assisting pressure is determined based on the master cylinder pressure difference (and also the negative pressure of the booster, if desired), the assisting pressure is kept constant irrespective of a change in the amount of insufficiency of the braking force. The threshold of the master cylinder pressure difference may be determined depending upon the negative pressure of the booster.

Where the constant assisting pressure is added to the wheel brake cylinder pressure when the braking force is insufficient, the assisting control may be effected such that the wheel brake cylinder pressure is held equal to the ideal master cylinder pressure after the boosting limit of the booster has been reached. For instance, the critical value of the master cylinder pressure at which the boosting limit has been reached is determined on the basis of the negative pressure of the booster detected by the booster negative pressure sensor, and the fact that the boosting limit has been reached is detected by comparing the actually detected master cylinder pressure with the determined critical value, as disclosed in JP-A-10-236294, In the embodiments of FIGS. 13–17, the determination of the assisting pressure on the basis of the negative pressure of the booster 20 is not essential. The assisting pressure may be determined on the basis of only the difference between the actual and ideal values of the master cylinder pressure, or may be a predetermined constant value.

In the first embodiment of FIGS. 1–12, the determination as to whether an abrupt brake application to the vehicle is required is effected when the brake operating force F has exceeded the predetermined first value, and when the brake operating force F has exceeded the predetermined second value. However, the determination as to whether an abrupt brake application is required may be effected from time to time after the requirement for the abrupt brake application is once detected when the brake operating force F has exceeded a predetermined value, so that the assisting control is effected each time the requirement is detected. This modification is equally applicable to the determination as to whether the braking force is insufficient.

In the first embodiment of FIGS. 1–12, the same threshold value $P_{TH}$ of the master cylinder pressure difference for the determination as to whether an abrupt brake application is required is used when the brake operating force F has exceeded the first value $F_{K1}$ and when the brake operating force F has exceeded the second value $F_{K2}$. However, different threshold values may be used corresponding to the different values $F_{K1}$ and $F_{K2}$. Generally, a booster has an operational delay due to an inertia immediately after initiation of its boosting operation, and an operational delay due to a decrease in the difference between the pressures in the low-pressure and variable-pressure chambers during the boosting operation. Suppose the pressure in the low-pressure chamber of the booster is sufficiently low, the threshold of the master cylinder pressure difference used for the determination when the brake operating force F has exceeded the comparatively large value $F_{K2}$ is desirably smaller than that used for the determination effected when the brake operating force F has exceeded the comparatively small value $F_{K1}$.

Further, the fifth embodiment of FIGS. 18–23 may be modified to effect only the determination as to whether the braking force is insufficient, and only the application of an assisting pressure upon detection of insufficiency of the braking force.

In the illustrated embodiments described above, the negative pressure of the booster is detected by the booster negative pressure sensor 180, 390. However, the negative pressure of the booster may be estimated by an estimating device. For instance, the estimating device is adapted to the negative pressure of the booster on the basis of the negative pressure in the intake manifold of the vehicle engine, and the operating state of the braking system, for instance, the master cylinder pressure, or a rate of increase of the master cylinder pressure. Alternatively, the estimating device is adapted to estimate the booster negative pressure on the basis of at least two of the operating force and stroke of the brake operating member and the master cylinder pressure. Further alternatively, the negative pressure of the booster can be estimated on the basis of a rate of change of the master cylinder pressure, or a rate of change of the operating force of the brake operating member.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A braking system for braking a wheel of an automotive vehicle, including a brake for braking said wheel and an operating device operable to produce an output corresponding to an input thereof, for activating said brake according to said output, and wherein said output of said operating device is delayed with respect to said input depending upon an operating condition of the braking system, said braking system comprising:

a brake-operating-force increasing device operable on the basis of a delay of said output of said operating device with respect to said input, to increase an operating force of said brake to a value which is larger than a value corresponding to said output of said operating device.

2. A braking system according to claim 1, wherein said brake-operating-force increasing device includes an abrupt braking control device operable to increase the operating force of said brake to a value larger than a value corresponding to said input of said operating device.

3. A braking system according to claim 2, further comprising a brake operating member manually operable with an operating force, and wherein said operating device includes a booster which receives said operating force of said brake operating member as said input and boosts said input into said output, and said abrupt braking control device is operable to increase the operating force of said brake to a value larger than a value corresponding to said operating force of said brake operating member.

4. A braking system according to claim 1, further comprising a brake operating member manually operable with an operating force, and wherein said operating device includes a booster which receives said operating force of said brake operating member as said input and boosts said input into said output, and said brake-operating-force increasing device includes a braking-delay reducing device operable to increase the operating force of said brake such that said operating force of said brake approaches to a value corresponding to said operating force of said brake operating member.

5. A braking system according to claim 1, wherein said brake-operating-force increasing device includes an output-delay detecting portion operable to detect said delay of said operating device on the basis of actual values of said input and said output of said operating device.

6. A braking system according to claim 5, wherein said output-delay detecting portion includes a portion operable to detect said delay of said operating device on the basis of a relationship between said input and said output of said operating device at a predetermined point of time after a moment of initiation of an operation of said operating device.

7. A braking system according to claim 5, wherein said output-delay detecting portion includes an activating device which is operable to initiate an operation of said brake-operating-force increasing device when said activating device has detected that a difference between an ideal value of said output of said operating device which corresponds to an actual value of said input according to a static ideal relationship between said input and said output and an actual value of said output corresponding to said actual value of said input is not smaller than a predetermined threshold value.

8. A braking system according to claim 7, wherein said operating device is a vacuum booster operable to boost an input thereof into an output thereof by utilizing a negative pressure, and said output-delay detecting portion includes a threshold determining portion for determining said threshold value of said difference such that said threshold value is larger when a difference of a negative pressure from an atmospheric pressure is relatively small than when said difference of said negative pressure from said atmospheric pressure is relatively large.

9. A braking system according to claim 1, wherein said brake-operating-force increasing device includes an assisting-force applying portion operable to apply an assisting force to said brake for increasing said operating force of said brake to a value which is larger than a value corresponding to said output of said operating device by an amount of said assisting force.

10. A braking system according to claim 9, wherein said assisting-force applying portion is operable to control said assisting force to be applied to said brake such that said assisting force is larger when a deviation of an actual relationship between actual values of said input of said operating device from an ideal relationship between said input and said output is relatively larger than when said deviation is relatively small.

11. A braking system according to claim 9, wherein said operating device is a vacuum booster operable to boost an input thereof into an output thereof by utilizing a negative pressure, and said assisting-force applying portion is operable to control said assisting force to be applied to said brake such that said assisting force is larger when a difference of a negative pressure from an atmospheric pressure is relatively small than when said difference of said negative pressure from said atmospheric pressure is relatively large.

12. A braking system according to claim 9, wherein said assisting-force applying portion is operable to apply said assisting force to said brake when an amount of decrease of said input of said operating device within a predetermined time after a moment when said input has been increased to a maximal value is not smaller than a predetermined threshold.

13. A braking system according to claim 12, wherein said assisting-force applying portion is operable to control said assisting force to be applied to said brake such that said assisting force is larger when said amount of decrease of said input of said operating device within said predetermined time is relatively large than when said amount of decrease is relatively small.

14. A braking system according to claim 5, wherein said output-delay detecting portion is operable to detect said delay of said operating device when said input of said operating device has been increased to a predetermined value.

15. A braking system according to claim 14, wherein said predetermined value of said input includes at least a first value and a second value larger than said first value.

16. A braking system according to claim 9, wherein said assisting-force applying portion includes an ideal assisting-force applying portion operable to apply said assisting force to said brake for thereby increasing said operating force of said brake by an amount of said assisting force, so as to establish an ideal relationship between said input and said operating force of said brake, which ideal relationship corresponds to an ideal relationship between said input and said output of said operating device.

17. A braking system according to claim 9, wherein said operating device is a vacuum booster operable to boost an input thereof into an output thereof by utilizing a negative pressure, and said assisting-force applying portion includes a post-boosting-limit assisting-force applying portion operable after a boosting limit of said vacuum booster has been reached, to apply said assisting force to said brake so that said operating force of said brake has a same relationship with said input of said vacuum booster, as that before said boosting limit has been reached.

18. A braking system according to claim 1, wherein said operating device is a vacuum booster operable to boost an input thereof into an output thereof by utilizing a negative pressure, said braking system further comprising a master cylinder operable by said output of said vacuum booster to deliver a pressurized fluid to said brake for operating said brake with the operating force corresponding to a pressure of said pressurized fluid.

19. A braking system according to claim 18, wherein said brake-operating-force increasing device includes an assisting-force applying device operable to apply an assisting force to said brake for increasing said operating force of said brake to a value which is larger than a value corresponding to said output of said vacuum booster by an amount corresponding to said assisting force.

20. A braking system according to claim 19, wherein said brake includes a wheel brake cylinder operable with a pressurized fluid for braking said wheel, and said assisting-force applying device includes a brake-cylinder-pressure control device operable to apply an assisting pressure to said wheel brake cylinder for increasing a pressure of said pressurized fluid delivered to said wheel brake cylinder, by an amount of said assisting pressure, so that said operating force of said brake is increased by the amount of said assisting force.

21. A braking system according to claim 20, wherein said master cylinder includes a pressurizing piston, and said brake-cylinder-pressure control device includes an assisting-pressure applying portion which is disposed between said vacuum booster and said master cylinder and which is operable to apply said assisting pressure to said pressurizing piston so that said pressurizing piston receives said assisting force based on said assisting pressure, in addition to said output of said vacuum booster.

22. A braking system according to claim 21, wherein said assisting-force applying device includes:
    an assisting cylinder portion including an assisting cylinder, and an assisting piston fluid-tightly and slidably received in said assisting cylinder and cooperating with said assisting cylinder to define an assisting chamber which receives said assisting pressure so that the pressure of the pressurized fluid to be delivered from said master cylinder to said wheel brake cylinder is increased by a amount corresponding to said assisting pressure; and
    an assisting pressure control device including a hydraulic pressure source, and a pressure control valve for controlling a pressure of a pressurized fluid delivered from said hydraulic pressure source and applying the controlled pressure to said assisting chamber as said assisting pressure so that the pressure of the pressurized fluid of said wheel brake cylinder is increased by the amount corresponding to said assisting pressure.

23. A braking system according to claim 20, wherein said brake-cylinder-pressure control. device is disposed between said master cylinder and said wheel brake cylinder, and is operable to increase the pressure of said wheel brake cylinder to a value higher than the pressure of the pressurized fluid delivered from said master cylinder.

24. A braking system according to claim 23, wherein said brake-cylinder-pressure control device includes:
    a pump operable to deliver a pressurized fluid and connected to a fluid passage connecting said master cylinder and said wheel brake cylinder; and
    a pressure control valve disposed in a portion of said fluid passage between said master cylinder and a point of connection of said fluid passage to said pump, said pressure control valve being operable to control the pressure of the pressurized fluid in the other portion of said fluid passage, so that the pressure of said wheel brake cylinder is higher than the pressure of the pressurized fluid as delivered from said master cylinder by an amount corresponding to said assisting force.

* * * * *